(12) United States Patent
Ravasz et al.

(10) Patent No.: US 11,468,644 B2
(45) Date of Patent: Oct. 11, 2022

(54) AUTOMATIC PROJECTION TYPE SELECTION IN AN ARTIFICIAL REALITY ENVIRONMENT

(71) Applicant: Meta Platforms Technologies, LLC, Menlo Park, CA (US)

(72) Inventors: Jonathan Ravasz, London (GB); Etienne Pinchon, London (GB); Adam Tibor Varga, London (GB); Jasper Stevens, London (GB); Robert Ellis, London (GB); Jonah Jones, London (GB); Evgenii Krivoruchko, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/016,217

(22) Filed: Sep. 9, 2020

(65) Prior Publication Data

US 2021/0090341 A1 Mar. 25, 2021

Related U.S. Application Data

(63) Continuation of application No. 16/578,236, filed on Sep. 20, 2019, now Pat. No. 11,189,099.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/01* (2013.01); *G06F 3/017* (2013.01); *G06V 20/00* (2022.01)

(58) Field of Classification Search
CPC ....... G06T 19/006; G02B 27/01; G06F 3/017; G06K 9/00624
(Continued)

(56) References Cited

U.S. PATENT DOCUMENTS 6,842,175 B1 1/2005 Schmalstieg et al.
7,701,439 B2 4/2010 Hillis et al.
(Continued)

FOREIGN PATENT DOCUMENTS

WO 2018235371 A1 12/2018

OTHER PUBLICATIONS

International Search Report and Written Opinion, PCT Patent Application PCT/US2020/051763, dated Feb. 3, 2021, 11 pages.
(Continued)

*Primary Examiner* — Hai Tao Sun
(74) *Attorney, Agent, or Firm* — Potomac Law Group, PLLC

(57) ABSTRACT

The present technology relates to artificial reality systems. Such systems provide projections a user can create to specify object interactions. For example, when a user wishes to interact with an object outside her immediate reach, she can use a projection to select, move, or otherwise interact with the distant object. The present technology also includes object selection techniques for identifying and disambiguating between objects, allowing a user to select objects both near and distant from the user. Yet further aspects of the present technology include techniques for interpreting various bimanual (two-handed) gestures for interacting with objects. The present technology further includes a model for differentiating between global and local modes for, e.g., providing different input modalities or interpretations of user gestures.

18 Claims, 45 Drawing Sheets

(51) Int. Cl.
*G06V 20/00* (2022.01)
*G06F 3/01* (2006.01)

(58) Field of Classification Search
USPC .......................................................... 345/633
See application file for complete search history.

(56) References Cited

U.S. PATENT DOCUMENTS

| | | | |
|---|---|---|---|
| 8,558,759 | B1 | 10/2013 | Prada Gomez et al. |
| 8,947,351 | B1 | 2/2015 | Noble |
| 9,117,274 | B2 | 8/2015 | Liao et al. |
| 9,292,089 | B1 | 3/2016 | Sadek |
| 9,477,368 | B1 | 10/2016 | Filip et al. |
| 9,817,472 | B2 | 11/2017 | Lee et al. |
| 10,220,303 | B1 | 3/2019 | Schmidt et al. |
| 10,248,284 | B2 | 4/2019 | Itani et al. |
| 10,473,935 | B1 | 11/2019 | Gribetz et al. |
| 10,521,944 | B2 | 12/2019 | Sareen et al. |
| 2008/0089587 | A1 | 4/2008 | Kim et al. |
| 2010/0306716 | A1 | 12/2010 | Perez |
| 2011/0267265 | A1 | 11/2011 | Stinson |
| 2012/0069168 | A1 | 3/2012 | Huang et al. |
| 2012/0143358 | A1 | 6/2012 | Adams et al. |
| 2012/0188279 | A1 | 7/2012 | Demaine |
| 2012/0206345 | A1 | 8/2012 | Langridge |
| 2012/0218183 | A1 | 8/2012 | Givon et al. |
| 2012/0275686 | A1 | 11/2012 | Wilson et al. |
| 2012/0293544 | A1 | 11/2012 | Miyamoto et al. |
| 2013/0063345 | A1 | 3/2013 | Maeda |
| 2013/0125066 | A1 | 5/2013 | Klein et al. |
| 2013/0147793 | A1 | 6/2013 | Jeon et al. |
| 2013/0182902 | A1 | 7/2013 | Holz |
| 2013/0265220 | A1 | 10/2013 | Fleischmann et al. |
| 2014/0125598 | A1 | 5/2014 | Cheng et al. |
| 2014/0236996 | A1 | 8/2014 | Masuko et al. |
| 2014/0357366 | A1 | 12/2014 | Koganezawa et al. |
| 2014/0375691 | A1 | 12/2014 | Kasahara |
| 2015/0035746 | A1 | 2/2015 | Cockburn et al. |
| 2015/0054742 | A1 | 2/2015 | Imoto et al. |
| 2015/0062160 | A1 | 3/2015 | Sakamoto et al. |
| 2015/0153833 | A1 | 6/2015 | Pinault et al. |
| 2015/0160736 | A1 | 6/2015 | Fujiwara |
| 2015/0169076 | A1 | 6/2015 | Cohen et al. |
| 2015/0181679 | A1 | 6/2015 | Liao et al. |
| 2015/0206321 | A1 | 7/2015 | Scavezze et al. |
| 2015/0220150 | A1 | 8/2015 | Plagemann et al. |
| 2015/0261659 | A1 | 9/2015 | Bader et al. |
| 2016/0110052 | A1 | 4/2016 | Kim et al. |
| 2016/0147308 | A1 | 5/2016 | Gelman et al. |
| 2016/0170603 | A1 | 6/2016 | Bastien et al. |
| 2016/0378291 | A1 | 12/2016 | Pokrzywka |
| 2017/0060230 | A1* | 3/2017 | Faaborg .................. G06F 3/012 |
| 2017/0109936 | A1 | 4/2017 | Powderly et al. |
| 2017/0139478 | A1 | 5/2017 | Jeon et al. |
| 2017/0192513 | A1 | 7/2017 | Karmon et al. |
| 2017/0262063 | A1 | 9/2017 | Blenessy et al. |
| 2017/0278304 | A1 | 9/2017 | Hildreth et al. |
| 2017/0287225 | A1* | 10/2017 | Powderly .............. G06F 3/0346 |
| 2017/0296363 | A1 | 10/2017 | Yetkin et al. |
| 2017/0364198 | A1 | 12/2017 | Yoganandan et al. |
| 2018/0059901 | A1 | 3/2018 | Gullicksen |
| 2018/0107278 | A1 | 4/2018 | Goel et al. |
| 2018/0113599 | A1 | 4/2018 | Yin |
| 2018/0303446 | A1 | 10/2018 | Schweizer |
| 2018/0307303 | A1 | 10/2018 | Powderly et al. |
| 2018/0322701 | A1 | 11/2018 | Pahud et al. |
| 2018/0335925 | A1* | 11/2018 | Hsiao ...................... G06F 3/013 |
| 2018/0357780 | A1 | 12/2018 | Young et al. |
| 2019/0050071 | A1* | 2/2019 | Liu ......................... G06F 3/017 |
| 2019/0057531 | A1 | 2/2019 | Sareen et al. |
| 2019/0094981 | A1 | 3/2019 | Bradski et al. |
| 2019/0107894 | A1 | 4/2019 | Hebbalaguppe et al. |
| 2019/0213792 | A1 | 7/2019 | Jakubzak et al. |
| 2019/0258318 | A1 | 8/2019 | Qin et al. |
| 2019/0278376 | A1 | 9/2019 | Kutliroff et al. |
| 2019/0279424 | A1 | 9/2019 | Clausen et al. |
| 2019/0286231 | A1 | 9/2019 | Burns et al. |
| 2019/0347865 | A1 | 11/2019 | Hackett et al. |
| 2019/0362562 | A1 | 11/2019 | Benson |
| 2019/0369391 | A1 | 12/2019 | Cordesses et al. |
| 2019/0377416 | A1 | 12/2019 | Alexander |
| 2020/0082629 | A1 | 3/2020 | Jones et al. |
| 2020/0097077 | A1 | 3/2020 | Nguyen et al. |
| 2020/0097091 | A1 | 3/2020 | Chou et al. |
| 2020/0129850 | A1 | 4/2020 | Ohashi |
| 2020/0218423 | A1* | 7/2020 | Ohashi ..................... G09G 5/36 |
| 2020/0225736 | A1 | 7/2020 | Schwarz et al. |
| 2020/0225758 | A1 | 7/2020 | Tang et al. |
| 2020/0226814 | A1 | 7/2020 | Tang et al. |
| 2021/0076091 | A1* | 3/2021 | Shohara ........... H04N 21/42204 |

OTHER PUBLICATIONS

Hincapie-Ramos, J.D. et al. "GyroWand: IMU-based raycasting for augmented reality headmounted displays." Proceedings of the 3rd ACM Symposium on Spatial User Interaction, Aug. 2015, pp. 89-98.

Schweigert, R. et al. "EyePointing: A gaze-based selection technique." Proceedings of Mensch and Computer, Sep. 8, 2019, pp. 719-723.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting", <www.techfak.uni-bielefeld.de/~tpfeiffe/lehre/VirtualReality/interaction/ray_casting.html> [accessed Apr. 7, 2020], 2 pages.

"Unity Gets Toolkit for Common AR/VR interactions" <youtu.be/ZPhv4qmT9EQ> [accessed Apr. 7, 2020]. Unity XR Interaction Toolkit Preview Dec. 19, 2019.

Pfeuffer, et al., "Gaze+ Pinch Interaction in Virtual Reality," ACM, 2017, SUI '17, Brighton, United Kingdom, Oct. 16, 2017, 10 pages.

Argelaguet F., et al., "A Survey of 3D Object Selection Techniques for Virtual Environments," Computers & Graphics, 2013, vol. 37, No. 3, pp. 121-136.

Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.

Miardanbegi D., et al., "Eyesee Through: Unifying Tool Selection and Application in Virtual Environments," In 2019 IEEE Conference on Virtual Reality and 3D User Interfaces (VR), 2019, pp. 474-483.

Mine M.R., et al., "Moving Objects in Space: Exploiting Proprioception in Virtual-Environment Interaction," In Proceedings of the 24th Annual Conference on Computer Graphics and Interactive Techniques, 1997, pp. 19-26.

\* cited by examiner

AUTOMATIC PROJECTION TYPE SELECTION IN AN ARTIFICIAL REALITY ENVIRONMENT

CROSS-REFERENCE TO RELATED APPLICATIONS

This application is a continuation of U.S. patent application Ser. No. 16/578,236 filed Sep. 20, 2019, titled "GLOBAL AND LOCAL MODE VIRTUAL OBJECT INTERACTIONS." This application is also related to U.S. patent application Ser. No. 16/583,069 filed Sep. 25, 2019, titled "PROJECTION CASTING IN VIRTUAL ENVIRONMENTS;" U.S. patent application Ser. No. 16/578,236 filed Sep. 20, 2019, titled "PROJECTION CASTING IN VIRTUAL ENVIRONMENTS;" U.S. patent application Ser. No. 16/578,240 filed Sep. 20, 2019, titled "THREE-STATE GESTURE VIRTUAL CONTROLS;" U.S. patent application Ser. No. 16/578,251 filed Sep. 20, 2019, titled "PROGRESSIVE DISPLAY OF VIRTUAL OBJECTS;" and U.S. patent application Ser. No. 16/578,260 filed Sep. 20, 2019, titled "VIRTUAL INTERACTIONS AT A DISTANCE;" all of which are herein incorporated by reference in their entireties.

TECHNICAL FIELD

The present disclosure is directed to object interaction in an artificial reality environment.

BACKGROUND

In an artificial reality environment, some or all of the objects a user sees and interacts with are "virtual objects," i.e., representations of objects generated by a computing system that appear in an environment. Virtual objects in an artificial reality environment can be presented to the user by a head-mounted display, a mobile device, a projection system, or another computing system. Often, users can interact with virtual objects using controllers and/or gestures. For example, user "interactions" with virtual objects can include selecting, moving, rotating, resizing, actuating controls, changing colors or skins, defining interactions between real or virtual objects, setting virtual forces to act on virtual objects, or any other action on or change to an object that a user can imagine. In some systems, a user can also interact with "real objects" that exist independent of the computer system controlling the artificial reality environment. For example, a user can select a real object and add a virtual overlay to change the object's color or some other way the object is presented to the user, cause it to affect other virtual objects, etc. As used herein, unless otherwise specified, an "object" can be a real or virtual object.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
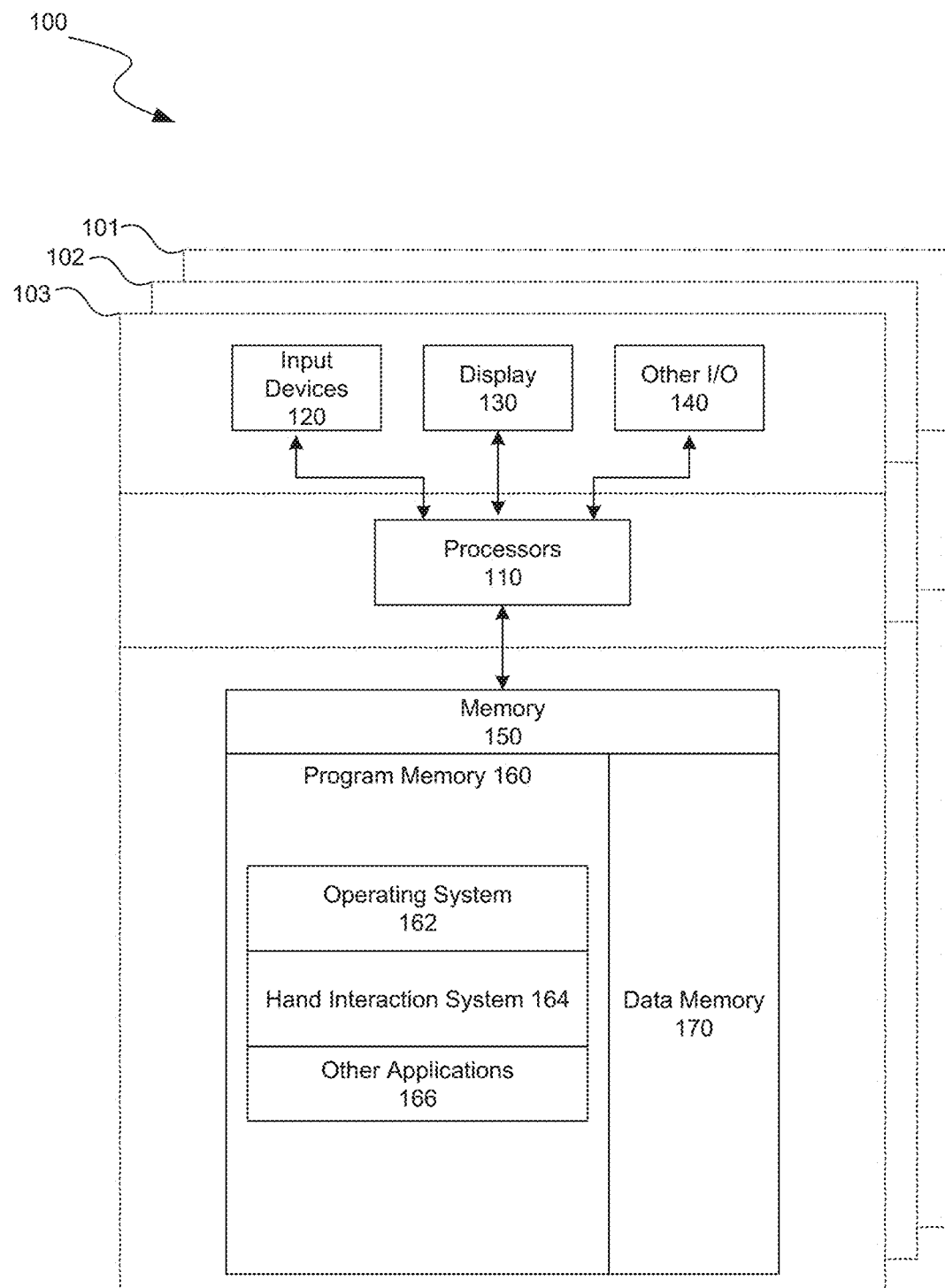
FIG. 1 is a block diagram illustrating an overview of devices on which some implementations of the present technology can operate.

Embodiments for interacting with objects in an artificial reality environment are described herein. In an artificial reality environment, users may want to perform indirect interactions where the cause and effect of the interaction are spatially separated. The present technology provides projections that a user can create to perform object interactions. For example, when a user wishes to interact with an object outside her immediate reach, she can use a projection to select, move, or otherwise interact with the distant object. The present technology also includes object selection techniques for identifying and disambiguating between target objects, allowing a user to select objects both near and distant from the user. Yet further aspects of the present technology include techniques for interpreting various bimanual (two-handed) gestures for increased functionality and control when interacting with objects. The present technology further includes a model for differentiating between global and local modes for, e.g., providing different input modalities or interpretations of user gestures.

A projection is an indication in two dimensions (e.g., a line or "ray") or an area in three dimensions (e.g., a cylinder, sphere, cone, pyramid, etc.) which can specify objects with which a user wishes to interact. For example, a hand interaction system can identify as target objects one or more objects that intersect a projection. Interpreting hand and body gestures to correctly interact with objects outside a user's immediate reach can be difficult due to inaccuracies in tracking hand and body positions and postures. These difficulties are compounded due to the exponential effect that small hand movements have on a projection position as the projection extends outward from the user. To increase projection stability, the hand interaction system can control a projection position based on an origin point and a control point. The hand interaction system can set a line extending from the origin point through the control point as the center of a projection. In various implementations, the origin point can be a tracked part of a user's body, such as a dominant eye, a hip, or a shoulder, and the control point can be a part of a user's hand such as fingertips, a palm, a wrist, or a fist. In some implementations, the origin point can change based on context such as where the user is directing her gaze or an angle of the projection center line.

The hand interaction system can provide various projection types. A ray projection can be a single line extending, e.g., from a user's hand into the artificial reality environment. A ray projection can provide very accurate interactions but with low precision, particularly at a distance. A sphere projection can be a ray projection with a sphere at the end of it and a cylinder projection can be a cylinder extending, e.g., from a user's hand, into the artificial reality environment. A cone or pyramid projection can be a cone or pyramid with the tip extending, e.g., from a user's hand or eye, and the projection increasing exponentially in coverage area as the projection extends into the artificial reality environment. Due to their coverage of a larger area than a ray projection, projections such as cylinders, spheres, cones, and pyramids can be easier to use to correctly indicate an object with which a user wishes to interact, but generally with less accuracy.

In some situations, a projection can intersect with more objects than those with which a user wishes to interact. For example, a user may wish to select only some of a tight cluster of objects. In other situations, a projection can fail to intersect objects with which a user wishes to interact. For example, a projection can be configured not to pass through objects and a user may wish to select an object occluded by another object. The hand interaction system can include various bimanual (two-handed) techniques for disambiguating between selected objects or extending the coverage of a projection. In some implementations, the hand interaction system can specify a "hook" at a point on a ray projection. The distance on the ray projection between the user's dominant hand and the hook can be based on another gesture, such as the distance between the user's dominant and non-dominant hand or a distance between two of the user's fingers. In other implementations, the hand interaction system can control the shape of a projection based on another gesture. For example, the hand interaction system can change the diameter of a cylinder, sphere, or a base of a cone projection based on another gesture, such as the distance between the user's dominant and non-dominant hand or a distance between two of the user's fingers.

In various implementations, the hand interaction system can also detect additional object interaction gestures such as a cut, a cut-click, a lasso, or a frame gesture. In some implementations, these gestures can use a ray projection configured with an origin point at the user's dominant eye and a control point on her hand, so it appears to the user as if she is "drawing" into the environment. A cut gesture is where a user moves a projection to intersect with one or more objects. The hand interaction system can select each object that intersects with the projection. A cut-click gesture is where a user moves a projection to intersect with one or more actionable controls (e.g., a button). The hand interaction system can actuate each control that intersects with the projection. A lasso gesture is where the hand interaction system identifies a lasso movement such as by comparing a user movement to previously observed gestures (e.g., using a machine learning model) or by identifying that a user has made a closed shape gesture. The hand interaction system can identify a projection (e.g., a distorted cone) with a point extending from a user's eye and the distorted cone shape defined by the lasso gesture. The hand interaction system can select objects that intersect with the distorted cone. A frame gesture is where the hand interaction system identifies a frame input such as by identifying that a user has defined the edges of a rectangle with the thumb and index finger of both hands or by pulling apart opposite corners of the rectangle. The hand interaction system can identify a projection (e.g., a pyramid) with a point extending from a user's eye and the pyramid walls defined by the rectangle. The hand interaction system can select objects that intersect with the pyramid.

The hand interaction system can also identify whether the user is attempting to interact with objects in various operational modes, e.g., a global mode or a local mode. A global mode can be for manipulating objects within an environment, e.g., selecting objects, controlling object placement in the virtual environment, etc. A local mode can be for interacting with interfaces of one or more selected objects, e.g., pressing buttons on the objects, interacting with menus or other controls associated with the objects, etc. In various implementations, the user can explicitly select between global and local modes (e.g., with a gesture or button press) or global/local mode selection can be implicit (e.g., based on a user's gaze). In some implementations, an input modality can be automatically changed based on which operational mode is activated. For example, in global mode, inputs can be switched to projection casting, such as ray, cylinder, sphere, or cone projections. In local mode, inputs can be switched to other modalities, such as by mapping controls associated with selected objects to fingers on the user's hand, where a particular detected movement of the mapped finger controls actuation of the corresponding control. In some implementations, actions that can be taken with respect to an object can be divided into being performable in a particular operational mode. The hand interaction system can match a gesture to an action in the set of actions defined for the currently activated mode. For example, when in global mode, a gesture dragging downward from an upper right corner of a virtual chess board can be interpreted as an intention to rotate the chess board. However, the same gesture, when in local mode, can be interpreted as moving a rook from the upper right corner square forward an amount corresponding to the length of the gesture.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing XR systems for selecting and interacting with objects in artificial reality environments. However, these XR systems are inaccurate, imprecise, and provide limited functionality. Existing XR systems often require separate controller devices for input and often fail to correctly interpret user gestures in relation to objects in the artificial reality environment. The existing XR systems are frustrating and time-consuming for users to operate. The hand interaction system and processes described herein overcome these problems associated with conventional XR interaction techniques and are expected to provide users with greater control over object interactions, offer more functionality, and are more natural and intuitive than interactions in existing XR systems. Despite being natural and intuitive, the XR systems and processes described herein are rooted in computerized artificial reality systems, instead of being an analog of traditional object interactions. For example, existing object interaction techniques fail to describe projection positioning based on multiple body parts or gestures, much less provide for users to resize and customize such projections. Furthermore, existing XR systems do not provide effective selection and disambiguation techniques, nor do they provide options for switching input modalities or interpreting user input based on a user intention mode (e.g., global and local modes).

Several implementations are discussed below in more detail in reference to the figures. FIG. 1 is a block diagram illustrating an overview of devices on which some implementations of the disclosed technology can operate. The devices can comprise hardware components of a computing system 100 that interpret hand gestures for interacting with objects in an artificial reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, hand interaction system 164, and other application programs 166. Memory 150 can also include data memory 170 that can include, e.g., projection descriptors, gesture identifiers (e.g., trained machine learning models) and/or gesture paths, mappings between gestures and actions, mappings between actions and user intention modes, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
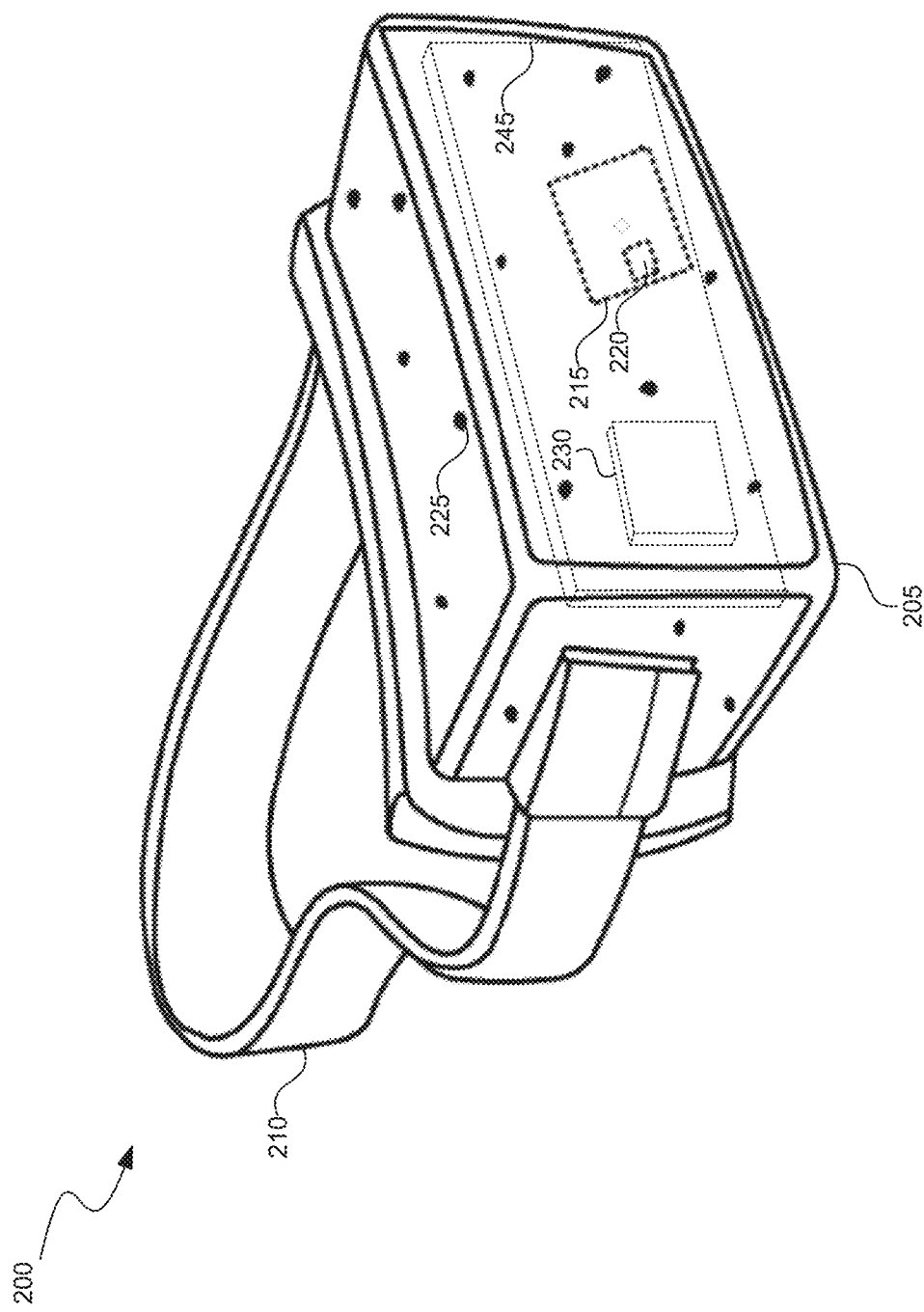
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
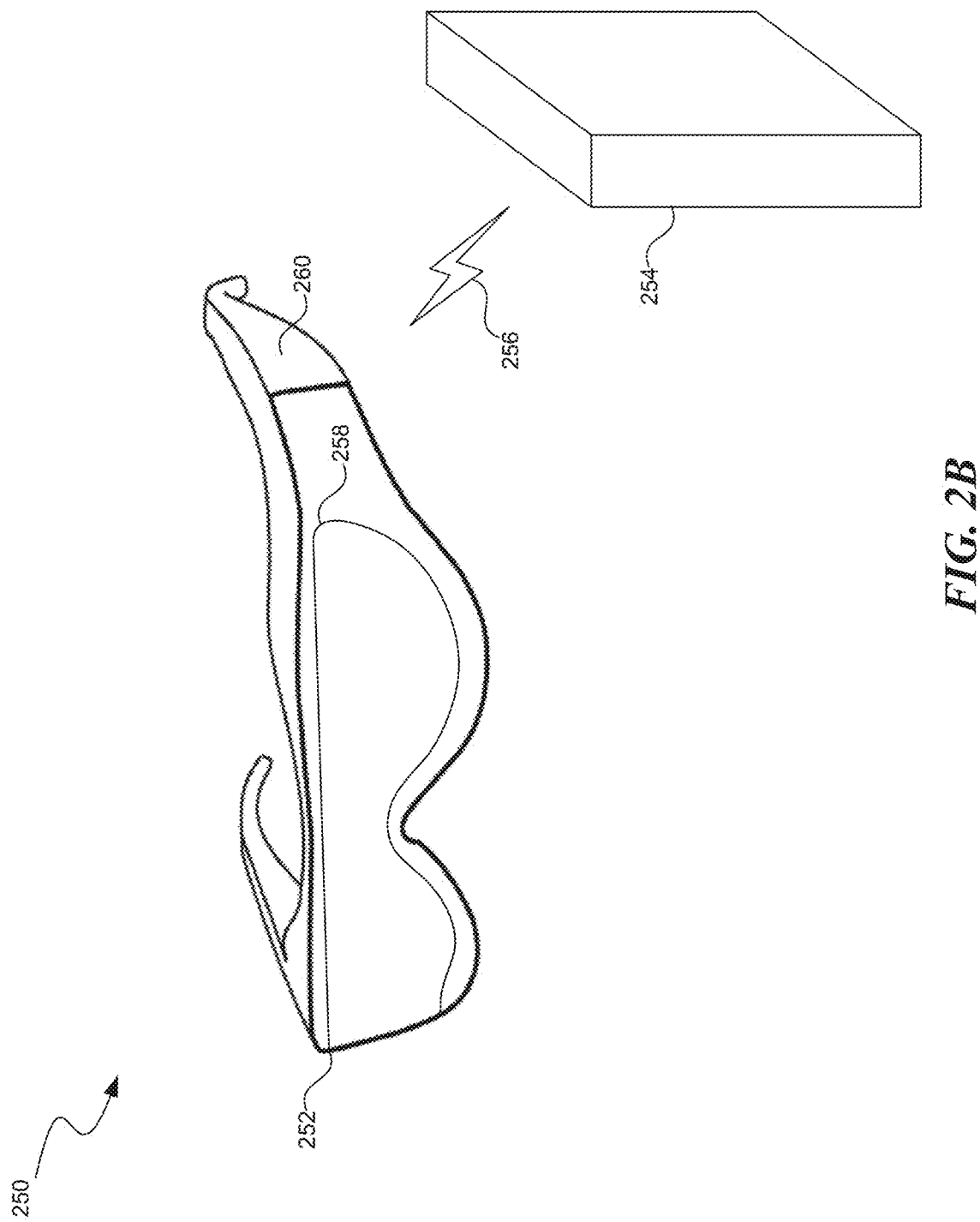
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
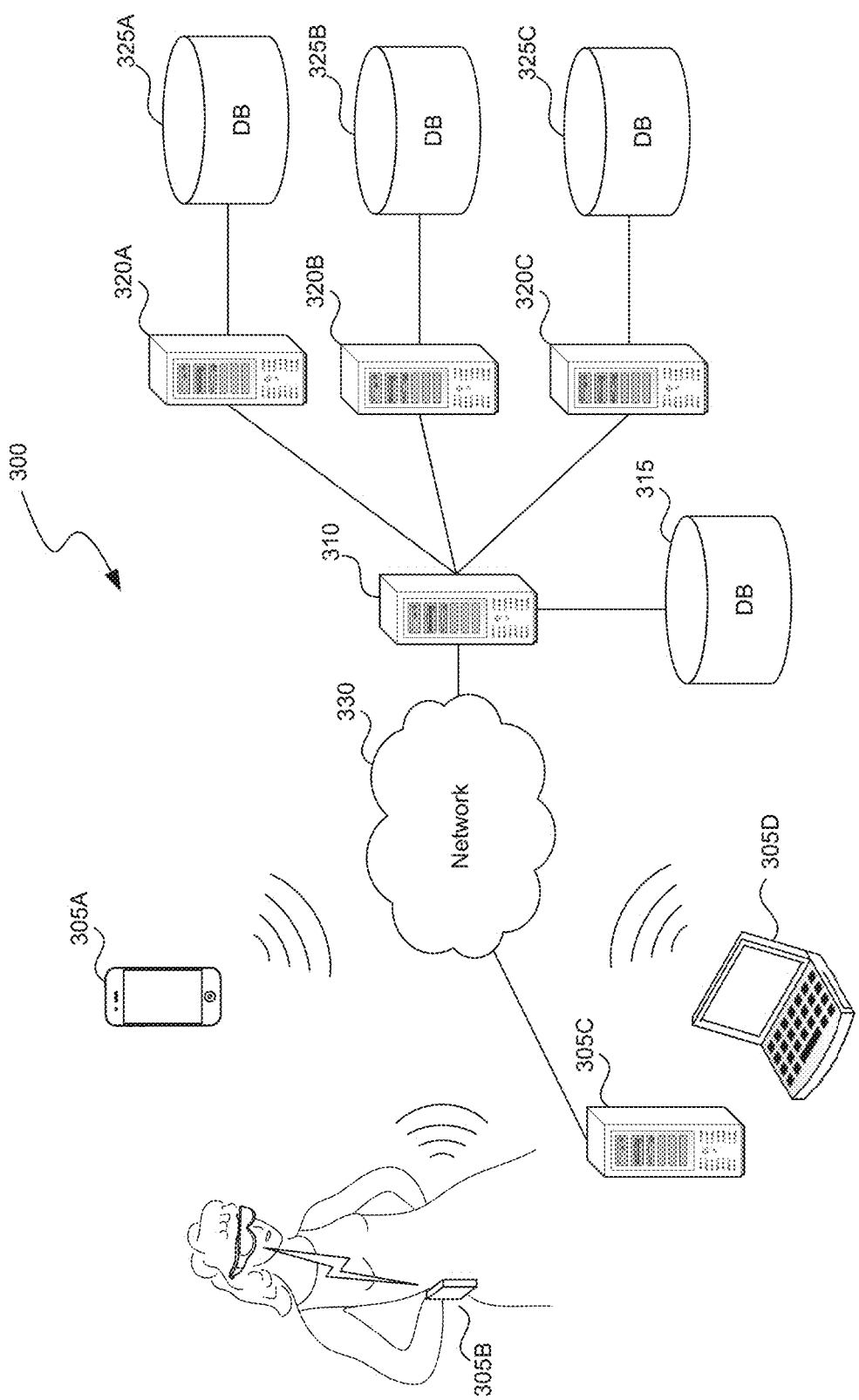
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
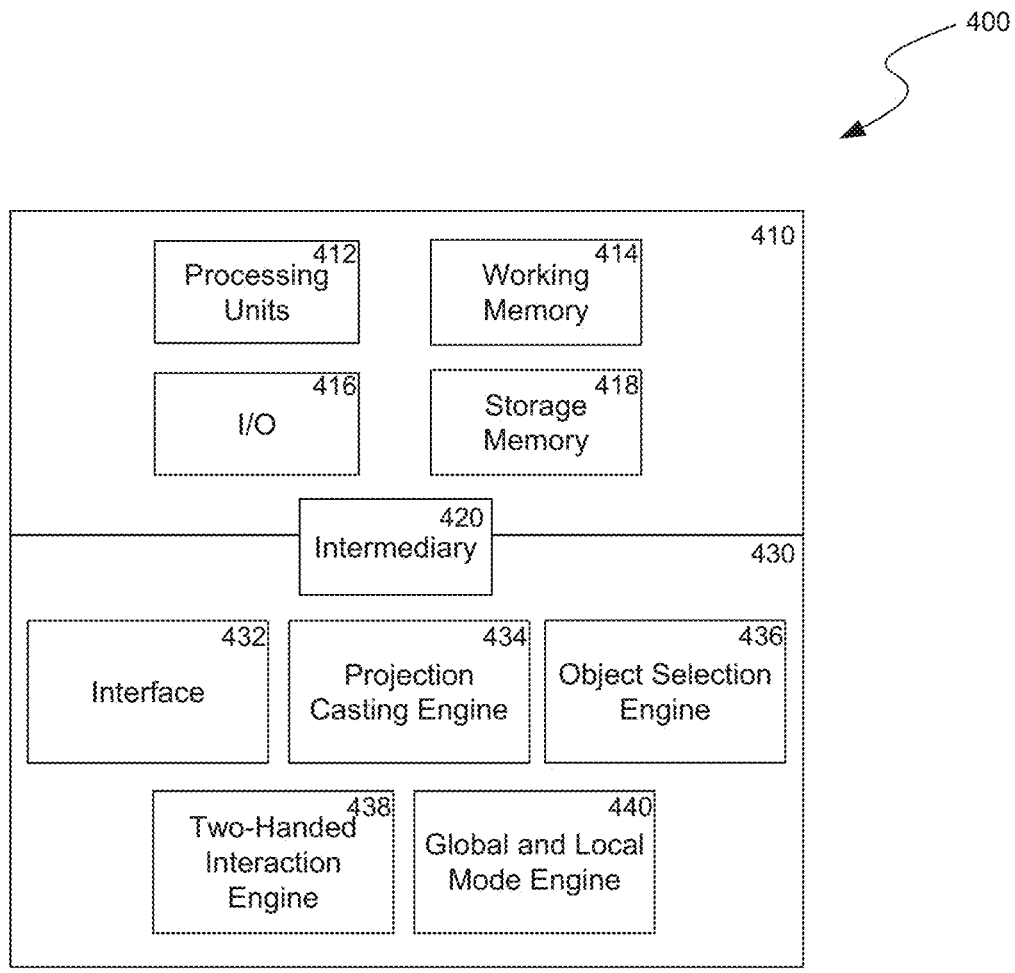
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software and/or hardware configured to perform operations for recognizing gestures and interpreting them to interact with objects in an artificial reality environment. Specialized components 430 can include, for example, projection casting engine 434, object selection engine 436, two-handed interaction engine 438, global and local mode engine 440, and components and APIs which can be used for providing user interfaces, transferring data, and controlling the specialized components, such as interface 432. In some implementations, components 400 can be in a computing system that is distributed across multiple computing devices or can be an interface to a server-based application executing one or more of specialized components 430.

Projection casting engine 434 can create various types of projections such as ray projections (as described in more detail below in relation to FIGS. 12 and 13), sphere or cylinder projections (as described in more detail below in relation to FIGS. 14 and 15), or cone projections (as described in more detail below in relation to FIGS. 16 and 17). In some implementations, projection casting engine 434 can select a projection type based on a current context (as described in more detail below in relation to FIG. 18).

Projection casting engine 434 can also control projection positions based on multiple tracked body parts, such as part of a hand as a control point and another point on a user's body, such as an eye, shoulder, or hip, as an origin point (as described in more detail below in relation to FIGS. 5-9). For example, the projection casting engine 434 can set a beginning point for a projection at, or offset from, a control point and can determine a line connecting the origin point and the control point as the center line for the projection. In some implementations, the projection casting engine 434 can move the origin for a projection according to origin transition factors such as the user's gaze direction, an angle of the projection, or a position of target objects (as described in more detail below in relation to FIGS. 10 and 11).

Object selection engine 436 can identify interactions that select multiple objects. In some implementations, object selection engine 436 can identify a cut gesture where a user draws a line that appears to the user as intersecting with multiple objects (as described in more detail below in relation to FIGS. 19 and 20). In some implementations, object selection engine 436 can identify a cut-click gesture where a user draws a line that appears to the user as intersecting with multiple objects, and the system actuates those objects (as described in more detail below in relation to FIGS. 21 and 22). In some implementations, object selection engine 436 can identify a lasso gesture that forms, from the user's perspective, a shape around multiple objects which the system selects (as described in more detail below in relation to FIGS. 23 and 24). In some implementations, object selection engine 436 can identify a frame gesture from a user specifying two opposite corners of the rectangle, and the system can then select objects that appear to be within the rectangle from the user's point of view (as described in more detail below in relation to FIGS. 25 and 26).

Two-handed interaction engine 438 can identify gestures performed by two hands (or different parts of the same hand) or gestures where a second hand (or different part of a first hand) modifies results of a gesture performed by a first hand (or a first part of the first hand). In some implementations, two-handed interaction engine 438 can identify a hook gesture in which a point on a ray projection is identified as a hook. The hook can define which objects the ray selects or otherwise interacts with. The position of the hook along the ray can be specified based on the distance between the two user's hands or the distance between two fingers on the same hand. Hook gestures are described in more detail below in relation to FIGS. 27-29. In some implementations, two-handed interaction engine 438 can identify a trombone gesture in which a diameter of a cone, cylinder, or sphere projection is based on the distance between the two user's hands or the distance between two fingers on the same hand. Trombone gestures are described in more detail below in relation to FIGS. 30-34. In some implementations, two-handed interaction engine 438 can facilitate a bimanual interaction where a user selects an object using a gesture with a first hand, a menu is presented in association with the first hand for interacting with the selected object, and the user can interact with the object with her second hand. Menus attached to a selection hand are described in more detail below in relation to FIGS. 35-38.

Global and local mode engine 440 can identify whether the hand interaction system is in a global or local mode, e.g., based on an explicit user command or a context, such as how long a user has had a consistent gaze directed toward an object. In some implementations, global and local mode engine 440 can switch input modalities for global and local modes (as described in more detail below in relation to FIGS. 39 and 40). In some implementations, global and local mode engine 440 can interpret ambiguous input based on whether the hand interaction system is in global or local mode (as described in more detail below in relation to FIGS. 41 and 42).

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Projection Casting with Origin and Control Point

When using a controller to point at and select objects in an artificial reality environment, it is easy to set and track a single point on the controller from which a straight line can be defined. Existing controller-based selection techniques are not directly transferrable to bare hands, as there are inherent differences between how people approach using a tool versus their own body. When a user's hands are the input method, it is much more difficult to track a single point as a projection source. Furthermore, unlike a rigid controller surface, a user's hands tend to make many small movements which can cause a projection originating from the user's hand to jump around and these movements are amplified as the projection extends further from the user. These natural hand tremors and tracking issues can interfere with projection casting and cause inaccuracies in object selection.

To increase accuracy of projection casting based on hand tracking, projection positions can be defined using both a primary control point (e.g., part of a user's hand) and a secondary origin point that is outside of the user's bare hands to anchor the projection. Projections based on a combination of these two positions results in a more stable and precise casting experience. Various origin points can be used and can provide different typical input speed, precision, and ergonomics depending on the size, distance, vertical position and density of the target objects. In various implementations, origin points can include a user's dominant eye, a point between the user's eyes, another point on the user's head, the user's hip, the user's shoulder, or a context variable point, e.g., between the user's hip and shoulder. Each of the various origin points can be paired with various control points such as the tips of a user's finger when making a particular gesture, a user's palm, a user's wrist, or a center of a user's fist. When casting a projection, the projection can be cast outward from the user, starting from the control point and oriented to be centered on a line that passes through both the origin point and the control point.

Figure 5:
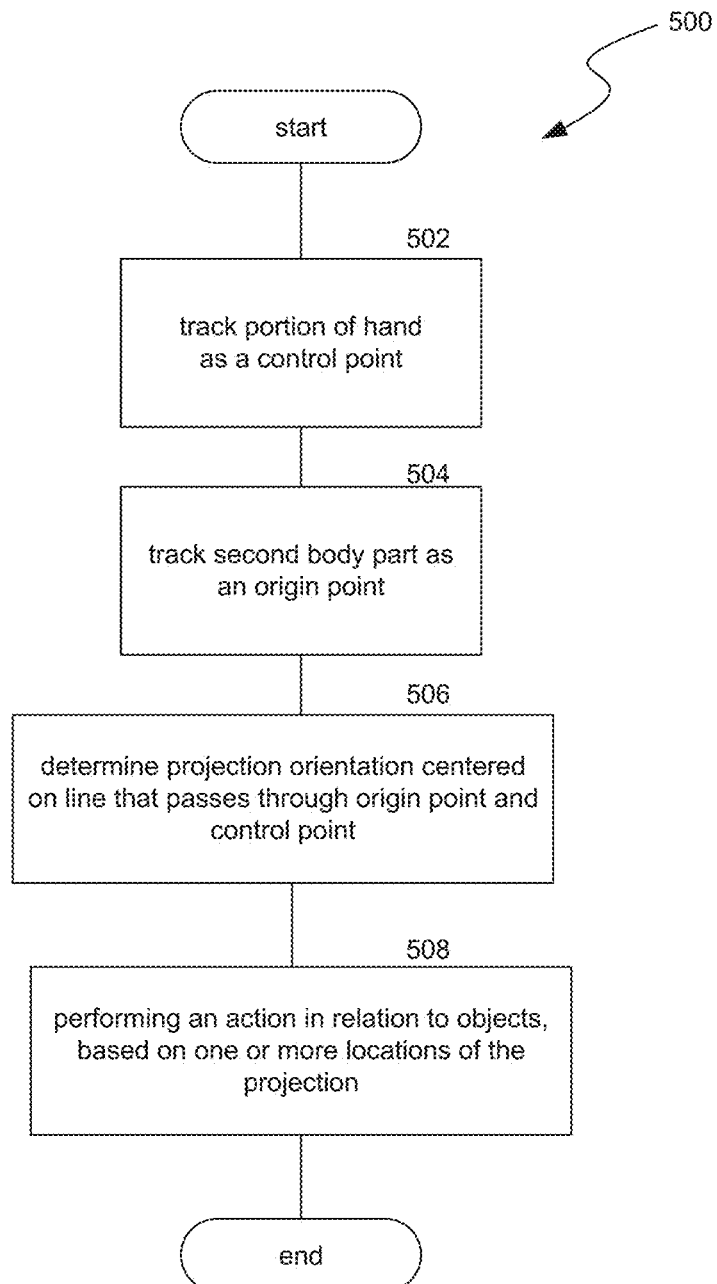
FIG. 5 is a flow diagram illustrating a process used in some implementations of the present technology for casting a projection with an origin point and a control point.

FIG. 5 is a flow diagram illustrating a process 500 used in some implementations of the present technology for casting a projection with an origin point and a control point. At block 502, process 500 can track a portion of a hand as a control point. For example, a control point can be the tips of a user's finger, a user's palm, a user's wrist, or a center of a user's fist. In some implementations, the control point can be identified in response to a user making a particular gesture, such as forming her fingers into a "pinch." In some cases, the control point can be offset from a tracked portion of the user. For example, the control point can be an offset from the user's palm or wrist. This helps eliminate jitter that would occur in instances that use finger tips, i.e. when the control point would move when forming the gesture. Instead, a point offset six inches forward of the wrist moves less when forming such a gesture with the fingers. In some implementations, a control point can be based on other body parts, such as a point on the user's head or a portion of a foot.

At block 504, process 500 can track a second body part as an origin point. In various implementations, and origin point can be based on a position of a user's eye, shoulder, hip, etc. In some implementations, the eye, shoulder or hip used can be the one on the user's dominant side. The user's dominant eye, for example, can be determined based on which hand a user tends to employ the most, a user stating which hand or eye is dominant (e.g., in an onboarding procedure), observances of how the user has positioned herself in relation to past stimulus, visual tests provided to the user, etc. In some implementations, the origin point can move depending on circumstances such as where the user's gaze is directed, an angle of a projection user is creating, or a selection from a machine learning model. Adjusting an origin point is discussed in greater detail below in relation to FIGS. 10 and 11.

The origin point and control point can be tracked, at block 502 and 504, by analyzing images from a camera, e.g., integrated with an XR headset or in an external sensor. For example, a machine learning model can be used to analyze images from such a camera and to generate 3D position data for a model of the user's hands or other various body parts. In some implementations, additional or alternative methods can be applied, such as by using position or IMU tracking sensors in the headset, in a bracelet, in a glove, or other wearable device.

At block 506, process 500 can determine a projection orientation that is centered on a line the passes through A) the origin point determined at block 502 and B) the control point determined at block 504. As discussed below, the projection can be one of various types such as a ray, sphere, cylinder, cone, pyramid, etc. The projection can extend outward from the user starting at the control point or offset from the control point.

At block 508, process 500 can perform an action in relation to real or virtual objects, based on one or more locations of the projection. For example, actions can include any interaction such as selection of objects, moving or rotating objects, interacting with controls (e.g., pressing buttons, pulling or pushing controls), etc. In some cases, the action can be based on multiple locations of the projection, e.g., as the user moves the control point and/or origin point, causing corresponding movement of the projection. For example, as a user moves her palm, which is tracked as the control point with her shoulder as the corresponding origin point, a ray projection cast outward from the user's palm can intersect with multiple objects, each of which can be selected.

Figure 6:
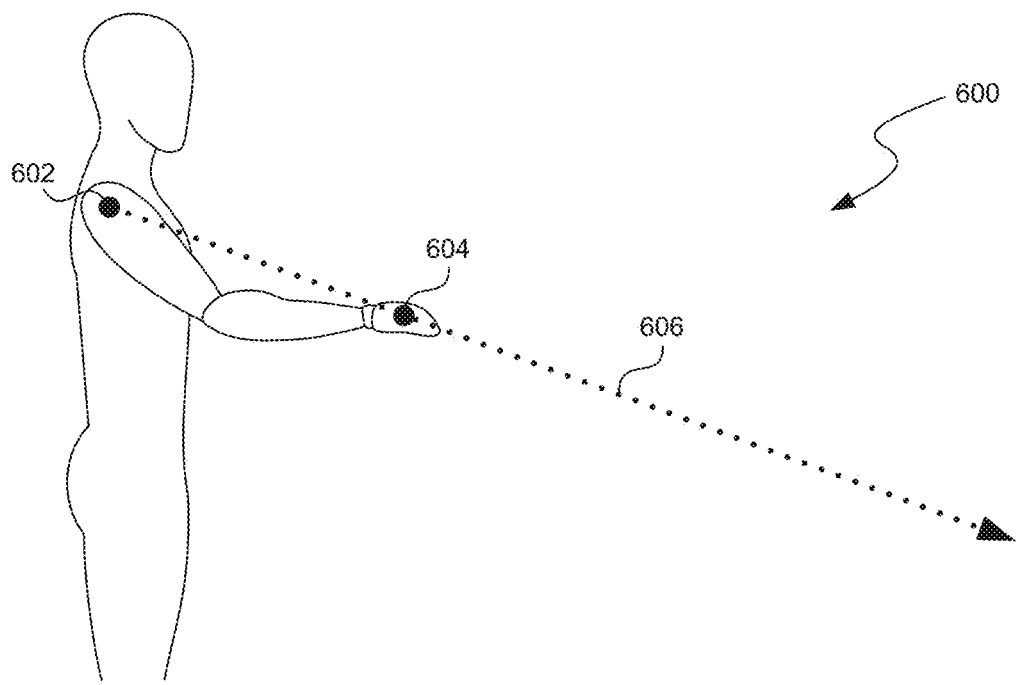
FIG. 6 is a conceptual diagram illustrating an example ray projection with a shoulder origin point and palm control point.
Figure 7:
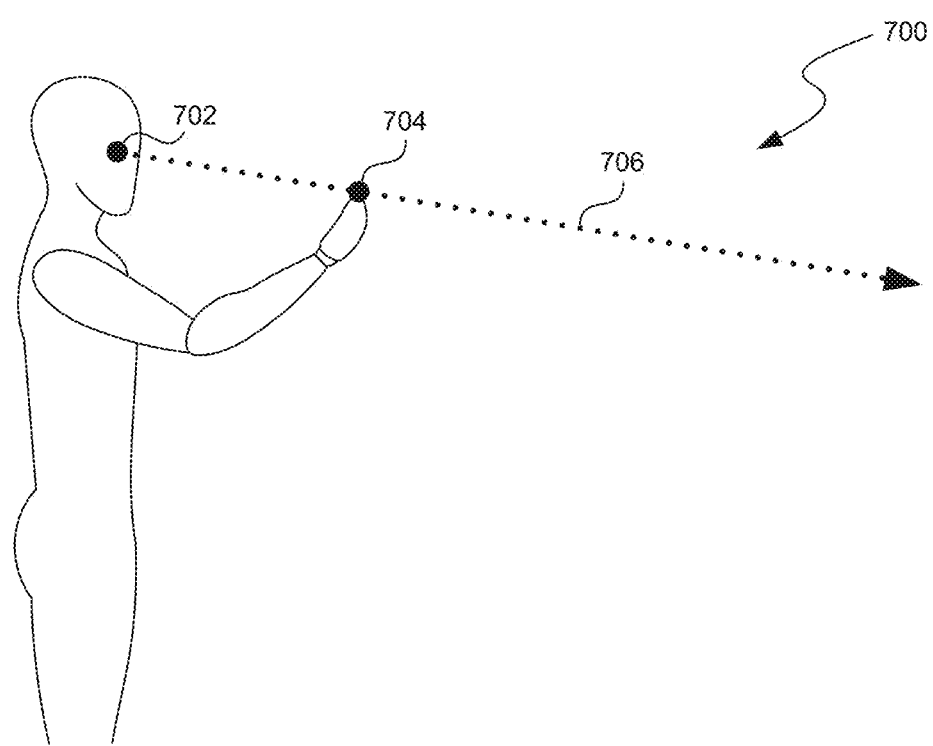
FIG. 7 is a conceptual diagram illustrating an example ray projection with a dominant eye origin point and a fingertip control point.
Figure 8:
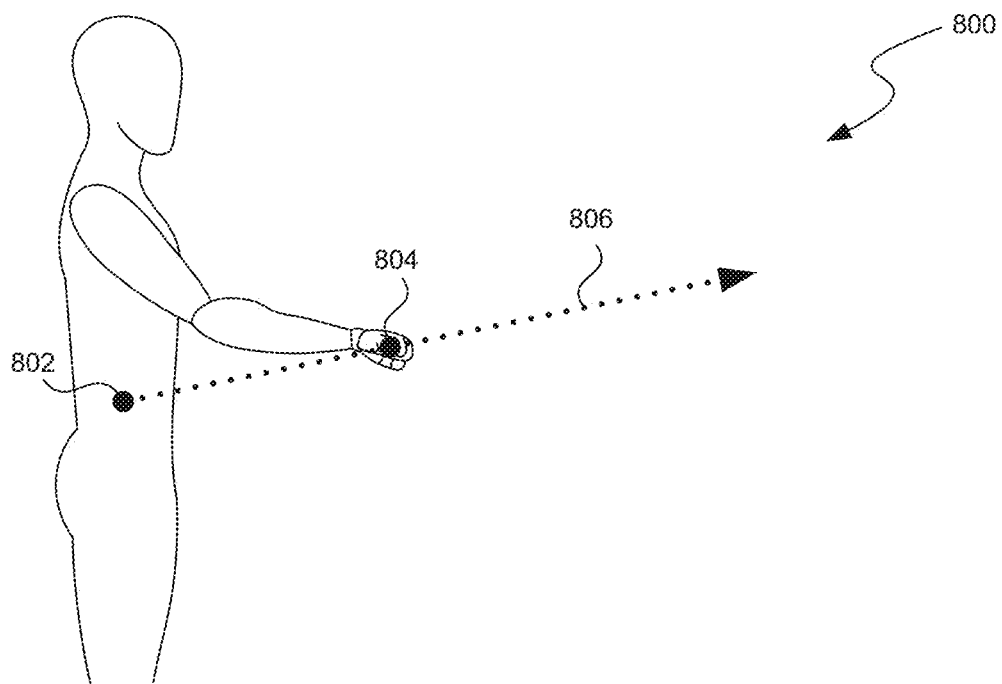
FIG. 8 is a conceptual diagram illustrating an example ray projection with a hip origin point and a first control point.
Figure 9:
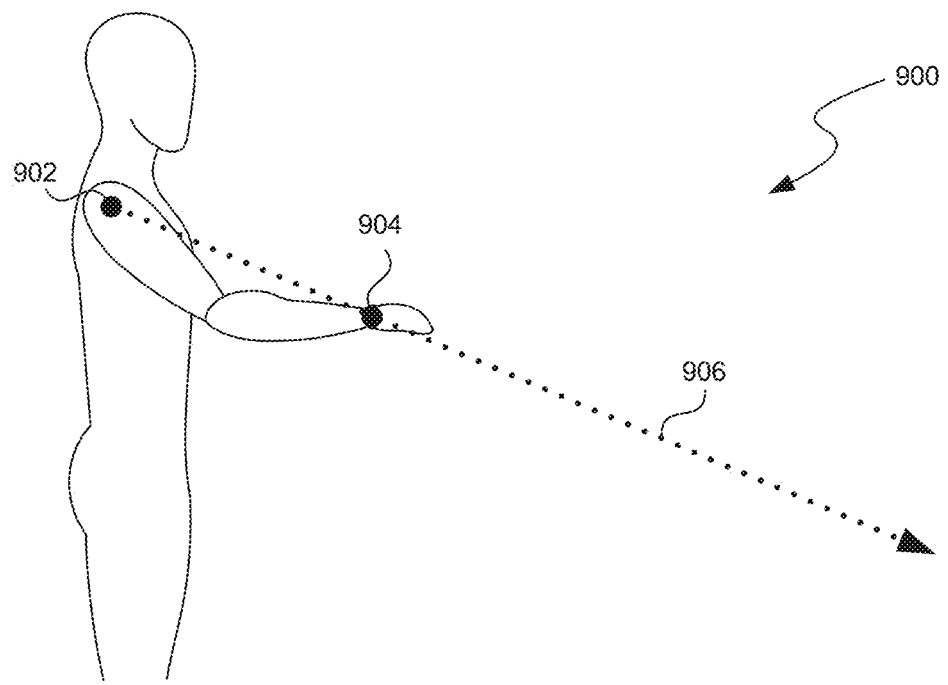
FIG. 9 is a conceptual diagram illustrating an example ray projection with a shoulder origin point and a wrist control point.

FIG. 6 is a conceptual diagram illustrating an example 600 of a ray projection 606 with a shoulder origin point 602 and palm control point 606. FIG. 7 is a conceptual diagram illustrating an example 700 of a ray projection 706 with a dominant eye origin point 702 and a fingertip control point 704. FIG. 8 is a conceptual diagram illustrating an example 800 of a ray projection 806 with a hip origin point 802 and a first control point 804. FIG. 9 is a conceptual diagram illustrating an example 900 of a ray projection 906 with a shoulder origin point 802 and a wrist control point 804. In each example 600, 700, 800, or 900, as the user moves her tracked origin point (shoulder, eye, or hip) and/or tracked control point (wrist, palm, or fingertips), corresponding movement to projection 606, 706, 806, or 906 will occur.

Different origin points can work better in different contexts. For example, higher origin points afford easier access to lower targets, while lower origin points enable easier access towards higher targets. In some implementations, the hand interaction system can identify conditions and move the origin point accordingly. In various implementations, the origin point can snap between different origin points or can move at a given speed on a path between origin points.

Figure 10:
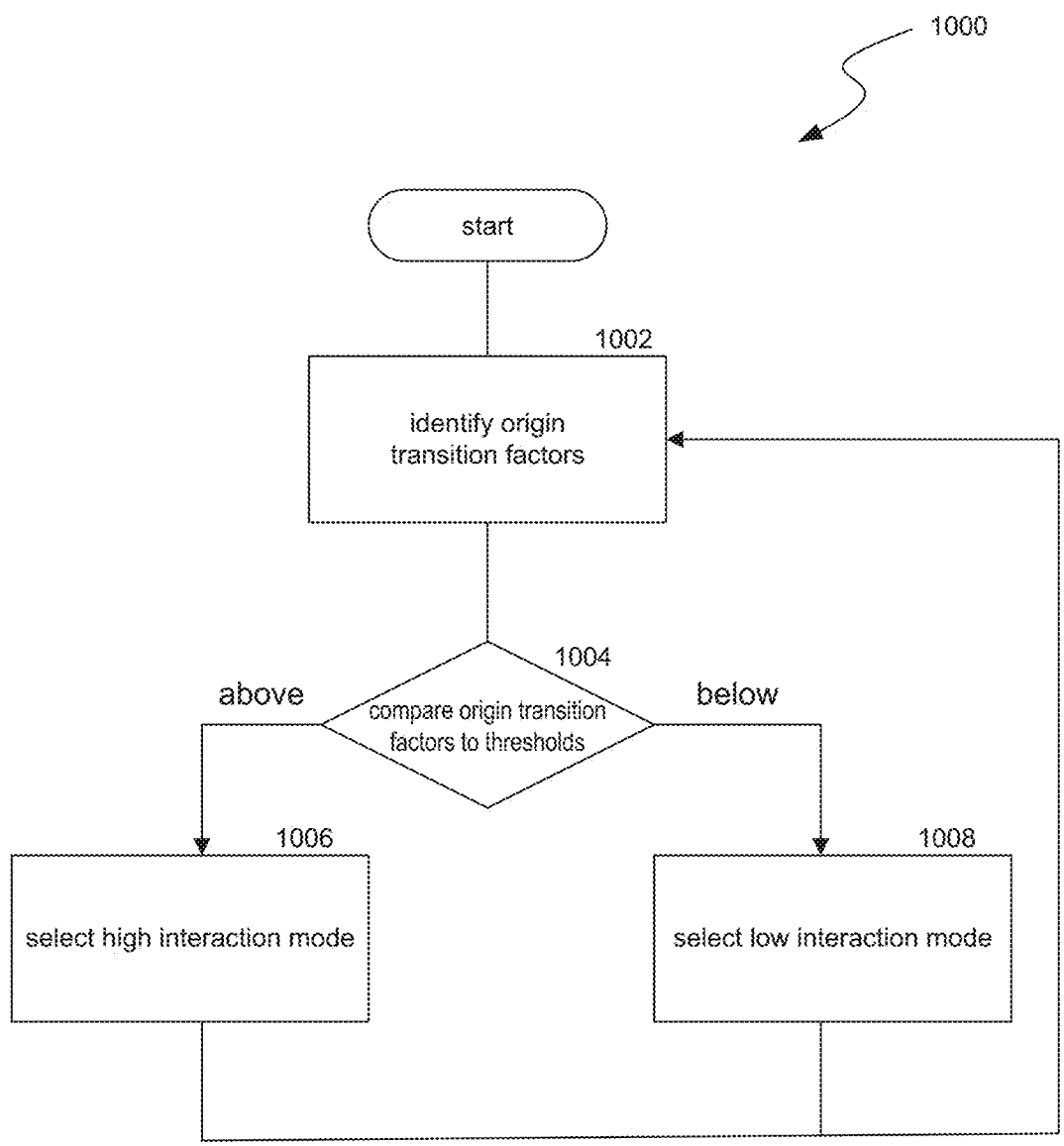
FIG. 10 is a flow diagram illustrating a process used in some implementations of the present technology for adjusting a projection origin point.

FIG. 10 is a flow diagram illustrating a process 1000 used in some implementations of the present technology for adjusting a projection origin point. At block 1002, process 1000 can identify a gaze direction and/or other origin transition factors. In various implementations, the origin transition factors can be one or more of: a user's gaze, horizontal angle of a current projection, location of target objects in relation to the current origin point; etc. For example, process 1000 can determine an angle of a centerline of a current projection. As another example, process 1000 can determine that a current projection selects objects and that those objects are above or below a threshold plane.

At block 1004, process 1000 can compare origin transition factors determined at block 1002 to thresholds to determine if the origin point should be set higher or lower. For example, when the user's gaze is above a threshold angle from their body, a high interaction mode can be selected and when the user's gaze is below the threshold angle from their body, a low interaction mode can be selected. As another example, process 1000 can determine that an angle of a centerline of a current projection is greater than a threshold angle (e.g., pointing upward) and can select a high interaction mode or can determine that the angle of the centerline of the current projection is less than a threshold angle (e.g., pointing downward) and can select a low interaction mode. As yet another example, process 1000 can determine that a current projection selects objects that are above a threshold plane and can select a high interaction mode or can determine that the current projection selects objects that are below a threshold plane and can select a low interaction mode.

At block 1006, process 1000 can select a high interaction mode where the origin point is transitioned toward a low location such as the user's hip. In some implementations, high interaction mode can make interactions with objects above a certain plane easier. In some implementations, the transition can be a snap of the origin point to the low location. In some implementations, there is a path specified between two points (a high and a low point) on the user's body, such as the user's shoulder and hip. Process 1000 can at block 1006 begin moving the origin point at a set pace toward the low end of the path, unless origin point is already at the lowest spot on the path.

At block 1008, process 1000 can select a low interaction mode where the origin point is transitioned toward a high location, such as the user's eye or shoulder. In some implementations, low interaction mode can make interactions with objects below a certain plane easier. In some implementations, the transition can be a snap of the origin point to the high location. In some implementations, there is a path specified between two points (a high and a low point) on the user's body, such as the user's eye and hip. Process 1000 can, at block 1008, begin moving the origin point at a set pace toward the high end of the path, unless the origin point is already at the highest spot on the path.

Process 1000 can repeat, returning to block 1002, as new origin transition factors are determined.

Figure 11C:
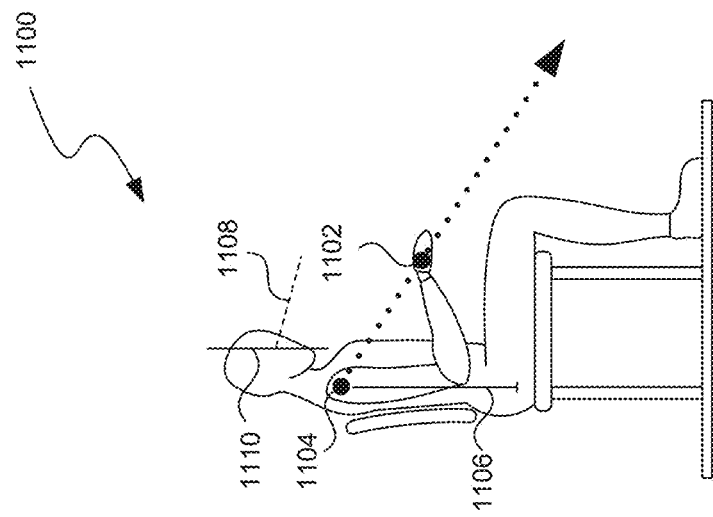
FIGS. 11A, 11B and 11C are conceptual diagrams illustrating an example of adjusting a projection origin between a hip and a shoulder.
Figure 11B:
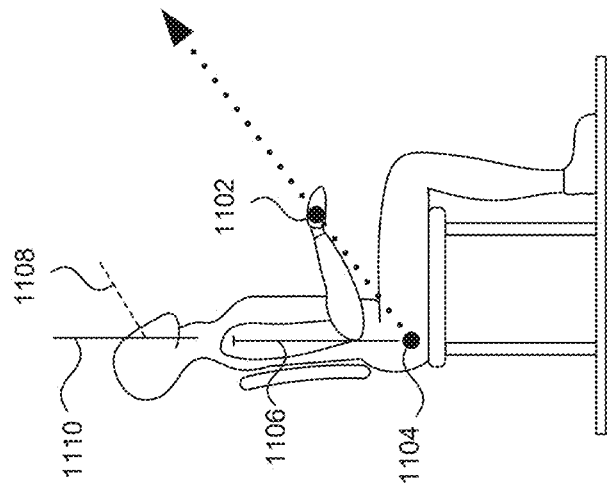
Figure 11A:
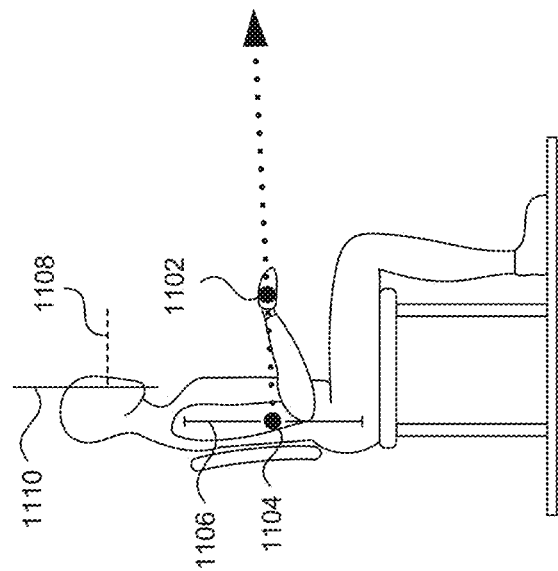

FIGS. 11A, 11B and 11C are conceptual diagrams illustrating an example of adjusting an origin point 1104 for a ray projection that is also being controlled by a control point 1102, where the origin point 1104 moves along on a path 1106 between a hip and a shoulder. In example 1100, the movement of the origin point 1104 is based on the user's eye gaze 1108. The point along path 1106 where the origin is set is based on a linear relationship of a proportion of the path with the angle formed by the user's eye gaze and a plane 1110, which is perpendicular with the floor.

In FIG. 11A, the user's eye gaze 1108 is perpendicular with the plane 1110 and the origin point 1104 is set so the ray between origin point 1104 and control point 1102 is perpendicular to path 1106. In FIG. 11B, the user's eye gaze 1108 has traveled upward beyond a maximum upward angle, so the origin point 1104 is set at the lowest point on path 1106. In FIG. 11C, the user's eye gaze 1108 has traveled downward below a minimum downward angle, so the origin point 1104 is set at the highest point on path 1106. In example 1100, the transitions between these points occurs at a set speed, moving the origin point 1104 smoothly along path 1106.

Virtual Object Interaction at a Distance with Projection Types

There are a number of difficulties with existing XR systems when interacting with objects, particularly when those objects are outside the immediate reach of the user. For example, many existing hand tracking systems are imprecise, causing virtual models of the user's hand to be either jittery or to lag behind the actual position of the user's hand. In addition, users' hands tend to exhibit tremors and other small movements, which translate into big projection position changes when the projection is cast over a large distance. Yet another difficulty, known as the Heisenberg effect, is the movement that often occurs in a pointing device (hand, mouse, stylus, etc.) when a user performs an input with the pointing device (makes a gesture, clicks a button, etc.) In many instances involving interactions at a distance, these difficulties can be overcome by using a suitable projection casting type. A non-exhaustive list of casting types includes a ray projection, a sphere projection, a cylinder projection, a cone projection, and a pyramid projection.

A ray projection, for purposes of this disclosure, is a single line extending from a control point or an offset from the control point. A ray projection has little ambiguity as to a user's target object. However, the small target size can make interactions fragile—users can find it difficult to point at individual objects, particularly small ones that are outside the user's reach.

A sphere projection, for purposes of this disclosure, is a ray projection with a sphere attached to the end. In some implementations, a user can control the length of the ray and/or the diameter of the sphere. In other implementations, the diameter of the sphere and/or length of the ray can be fixed. In yet other implementations the length of the ray can be set so that the sphere intersects with the object(s) nearest the user along the ray. A cylinder projection is similar to a sphere projection, except that the sphere is translated along the entire length of the ray, forming a cylinder extending from the projection control point. Sphere and cylinder projections tend to improve selection accuracy, as compared to ray projections, for interactions with objects just outside the user's reach (e.g., 1-3 feet).

A cone projection, for purposes of this disclosure, is a cone extending from the projection control point and growing larger in diameter as the cone extends away from the user. In some implementations, the degree to which the diameter changes as the cone projection extends away from the user can be fixed. In other implementations, a user can control the diameter of the cone, as discussed below in relation to FIGS. 30-34. A pyramid projection can be similar to a cone projection but can use a rectangular base instead of a circular one.

In some cases when at least part of a projection is three-dimensional such as a sphere, cylinder, cone, or pyramid, the target object(s) of the projection can be objects that the projection partially intersects, objects that the projection fully encompasses, or objects that the projection encompasses by at least a threshold amount (e.g., 30%, 50%, or 80%). In some implementations where a projection target can be multiple objects, secondary selection techniques can be used to differentiate between which objects the user intends to target. For example, individual objects that intersect with a projection can be mapped to fingers on a user's hand, and movement of the mapped fingers (e.g., tapping finger to thumb) can cause the corresponding mapped object to be added or removed from a set of target objects. As another example, another input modality such as a user's gaze can differentiate which intersected objects become target objects.

Figure 12:
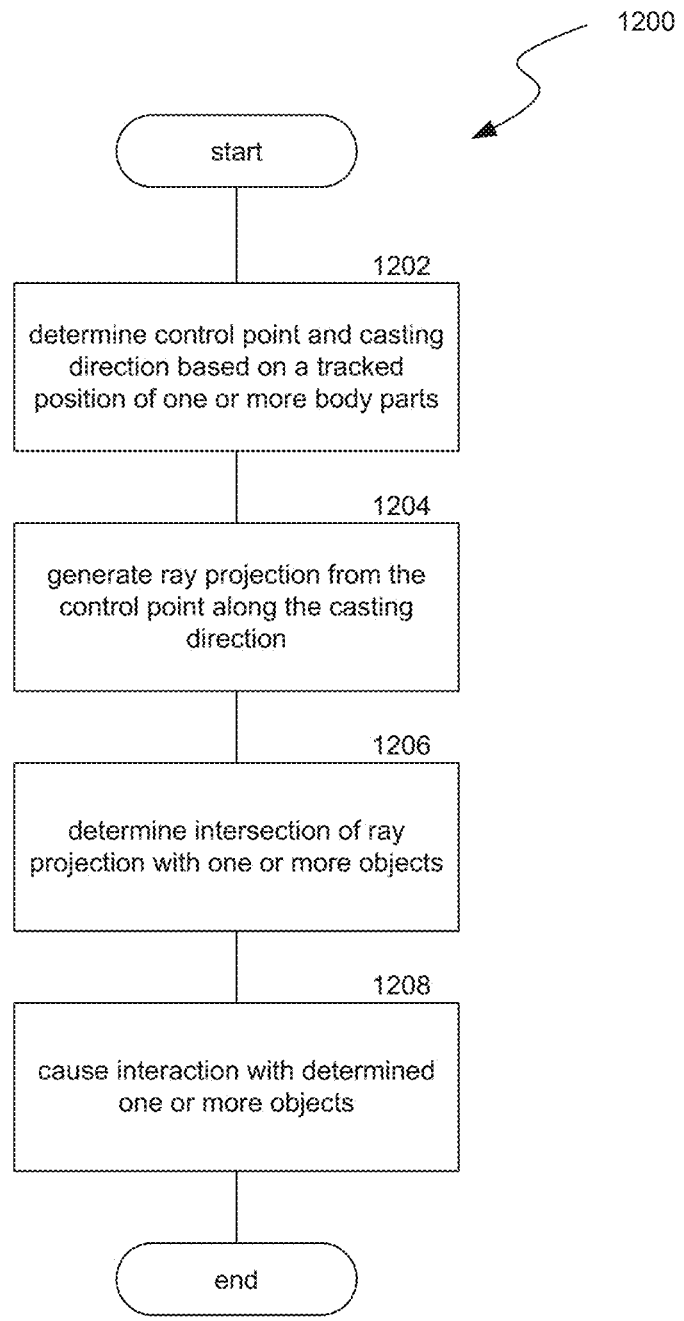
FIG. 12 is a flow diagram illustrating a process used in some implementations of the present technology for object interaction with a ray projection.

FIG. 12 is a flow diagram illustrating a process 1200 used in some implementations of the present technology for object interaction using a ray projection. At block 1202, process 1200 can determine a control point and a casting direction, for a ray projection, based on a tracked position of one or more body parts. In some implementations, as discussed above in relation to FIG. 5 through FIG. 11, the control point can be a palm, fingertips, a fist, a wrist, etc., and the casting direction can be along a line that passes through the control point and an origin point, such as a shoulder, eye, or hip. In other implementations, the control point can be based on other tracked body parts such as a user's eye, head, or chest. For example, the control point can be an estimated position of a center of a user's pupil and the origin point can be an estimated position of the center of a user's retina. In some cases, instead of using an origin point to define a direction, the system can define a plane corresponding to the control point and can determine the casting direction that is perpendicular to that plane. For example, where the control point is on the head or torso, the system can identify the coronal plane corresponding to the head or torso and can identify the casting direction as perpendicular to that coronal plane.

At block 1204, process 1200 can generate a ray projection (i.e. straight line) from the control point along the casting direction. In some cases, a graphical representation of the ray projection (the whole line or just a point where the ray hits an object) can be displayed in the artificial reality environment, while in other cases the ray projection is tracked by the XR system without displaying the ray projection. In various implementations, the ray projection can extend from the control point until it intersects with a first (real or virtual) object or the ray projection can extend through multiple objects. In some implementations, the direction of the ray projection can be adjusted to "snap" to objects that it is close to intersecting or the ray projection can be curved up to a threshold amount to maintain intersection with such objects.

At block 1206, process 1200 can determine an intersection between the ray projection and one or more target objects. In some implementations, process 1200 can determine the intersection when a user makes a particular gesture, such as tapping an index finger to a thumb. In some implementations, the target object can be the first object that the ray projection intersects, excluding other objects occluded by the first object. In other implementations, the ray can extend through multiple objects and the target objects can be all of the objects that the ray projection intersects. In yet other implementations, objects that the ray intersects can be identified as target objects depending on other body part positions or gestures, such as the user's gaze or gestures involving fingers mapped to intersected objects.

At block 1208, process 1200 can cause an interaction with the one or more target objects determined at block 1206. For example, process 1200 can select the target objects, cause them to move or rotate, or perform other interactions.

Figure 13:
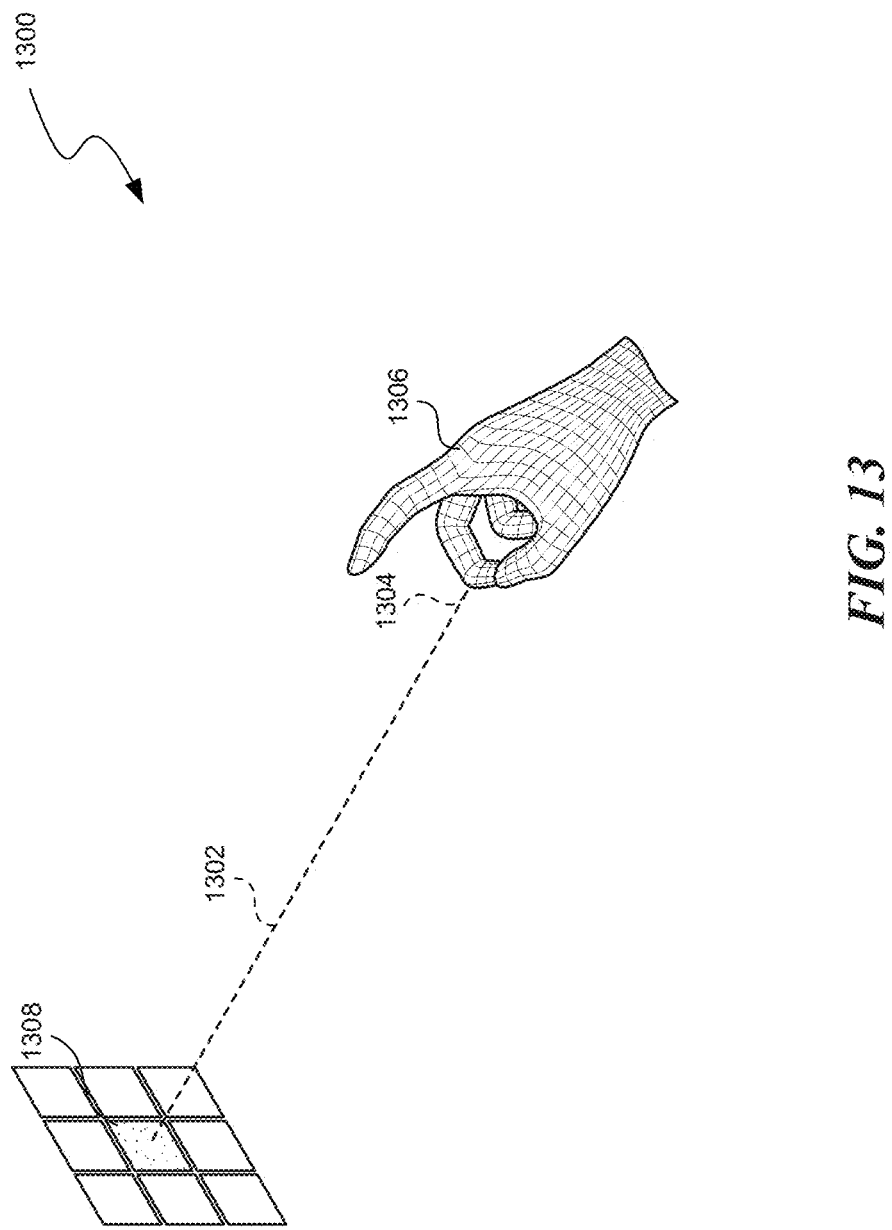
FIG. 13 is a conceptual diagram illustrating an example ray projection.

FIG. 13 is a conceptual diagram illustrating an example 1300 of a ray projection 1302. In example 1300, a user's hand 1306 has formed a gesture by connecting her thumb and middle finger, indicating initiation of a projection. In example 1300 the control point 1304 is an offset from the user's middle finger. Ray projection 1302 extends from the control point 1304 to the target object 1308. In example 1300, the user has closed her index finger to her thumb (not shown) and reopened it, making a "click" gesture, causing target object 1308 to be selected.

Figure 14:
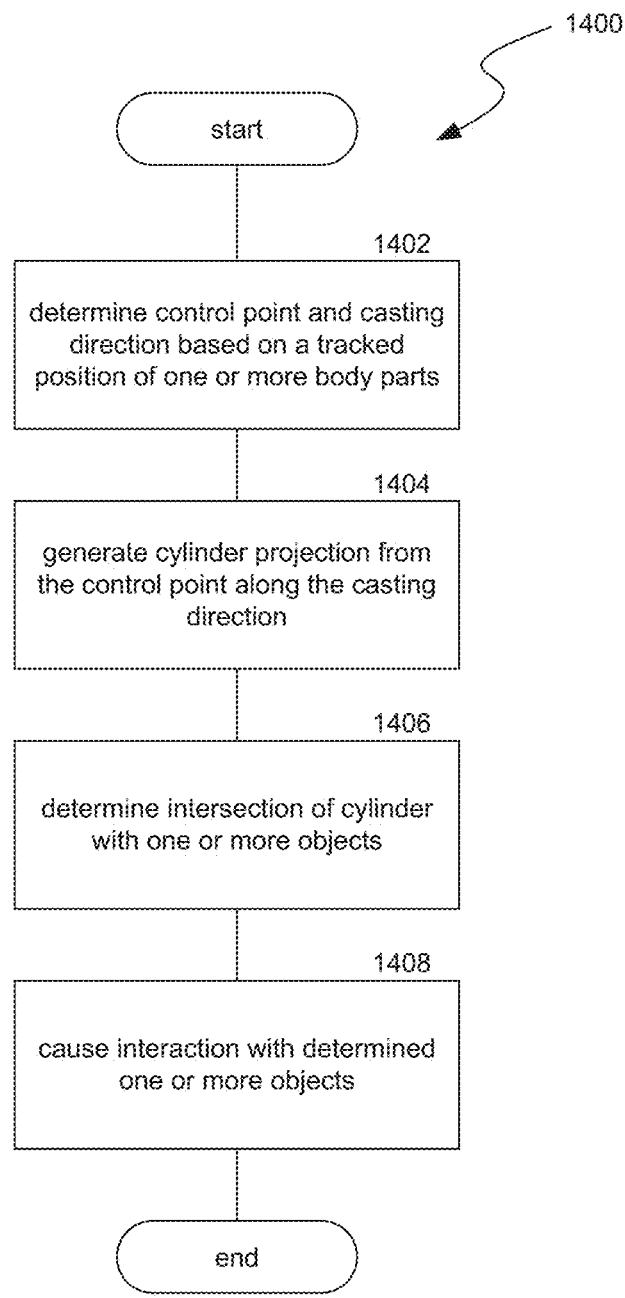
FIG. 14 is a flow diagram illustrating a process used in some implementations of the present technology for object interaction with a cylinder projection.

FIG. 14 is a flow diagram illustrating a process 1400 used in some implementations of the present technology for object interaction using a cylinder projection. At block 1402, process 1400 can determine a control point and a casting direction, for the cylinder projection, based on a tracked position of one or more body parts. In some implementations, as discussed above in relation to FIG. 5 through FIG. 11, the control point can be a palm, fingertips, a fist, a wrist, etc. and the casting direction can be along a line that passes through the control point and an origin point, such as a shoulder, eye, or hip. In other implementations, the control point can be based on other tracked body parts such as a user's eye, head, or chest. For example, the control point can be an estimated position of a of a center of user's pupil and the origin point can be an estimated position of the center of a user's retina. In some cases, instead of using an origin point to define a direction, the system can define a plane corresponding to the control point and can determine the casting direction as perpendicular to that plane. For example, where the control point is on the head or torso, the system can identify the coronal plane corresponding to the head or torso and can identify the casting direction as perpendicular to that coronal plane.

At block 1404, process 1400 can generate a cylinder projection from the control point along the casting direction. In some implementations, instead of a cylinder, the projection can be a sphere projection, which includes a sphere at the end of a ray projection. In some cases, a graphical representation of the cylinder (or sphere) projection can be displayed in the artificial reality environment (e.g., showing the entire projection or where it intersects with objects), while in other cases the cylinder (or sphere) projection is tracked by the XR system without displaying the projection. In various implementations, the cylinder projection can extend from the control point until it intersects with a first (real or virtual) object or the cylinder projection can extend to at least partially intersect with multiple objects. In some implementations, the ray of the sphere projection can extend from the control point until the sphere intersects with a first (real or virtual) object or the ray of the sphere projection can extend a fixed distance.

At block 1406, process 1400 can determine an intersection between the cylinder (or sphere) projection and one or more target objects. In some implementations, process 1400 can determine the intersection when a user makes a particular gesture, such as tapping an index finger to a thumb. In some implementations, the target object can be the first object that the cylinder (or sphere) projection at least partially intersects or wholly encompasses. In other implementations, the target objects can be all of the objects that the cylinder (or sphere) projection at least partially intersects or wholly encompasses. In yet other implementations, objects that the cylinder (or sphere) intersects can be identified as target objects depending on other body part positions or gestures, such as the user's gaze or gestures involving fingers mapped to intersected objects. In some implementations, as discussed below in relation to FIGS. 30-34, the diameter of the cylinder (or sphere) can be controlled by other gestures, such as a distance between the user's hands or the distance between the tip of the user's index finger and thumb.

At block 1408, process 1400 can cause an interaction with the one or more target objects determined at block 1406. For example, process 1400 can select the target objects, cause them to move or rotate, or perform other interactions.

Figure 15:
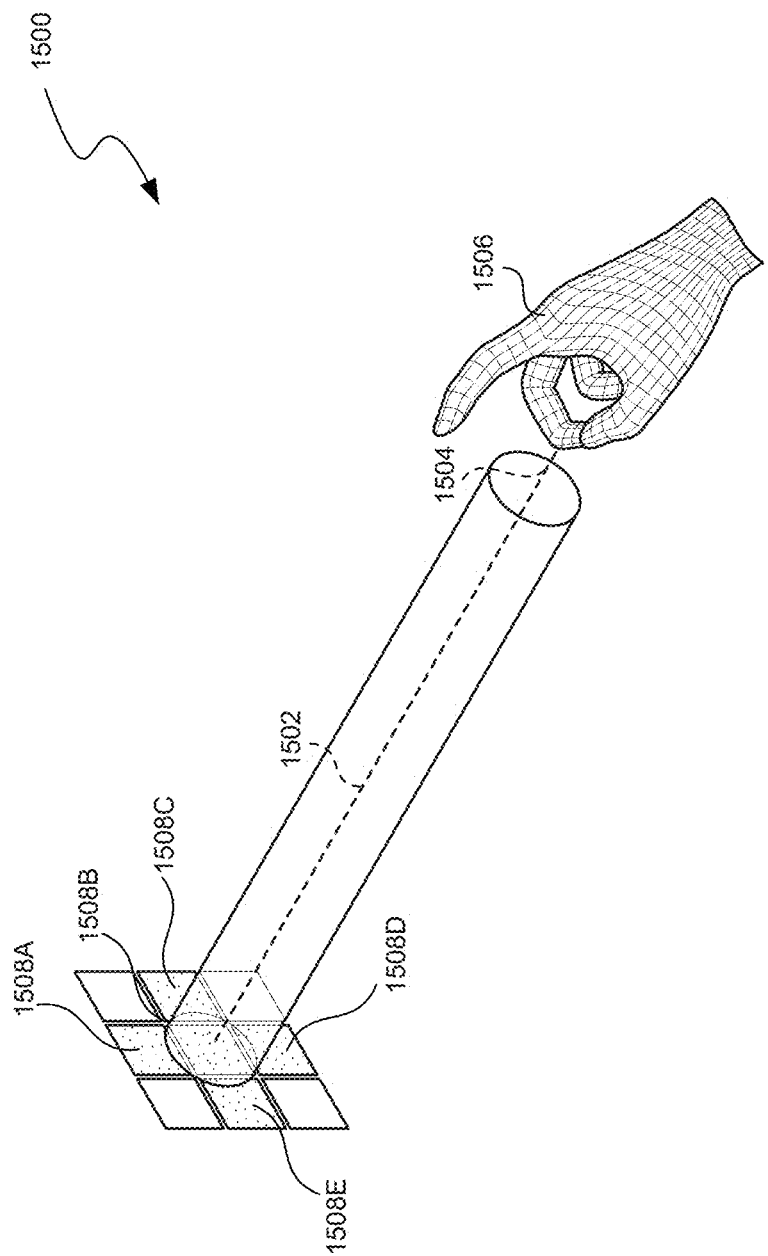
FIG. 15 is a conceptual diagram illustrating an example cylinder projection.

FIG. 15 is a conceptual diagram illustrating an example 1500 of a cylinder projection 1502. In example 1500, a user's hand 1506 has formed a gesture by connecting her thumb and middle finger, indicating initiation of a projection. In example 1500, the control point 1504 is an offset from the user's middle finger. Cylinder projection 1502 extends from the control point 1504 to the target objects 1508, intersecting at least partially with each of target objects 1508A, 1508B, 1508C, 1508D, and 1508E. In example 1500, the user has made a gesture by rotating her hand 1506 clockwise (not shown), causing target objects 1508A-E to be selected.

Figure 16:
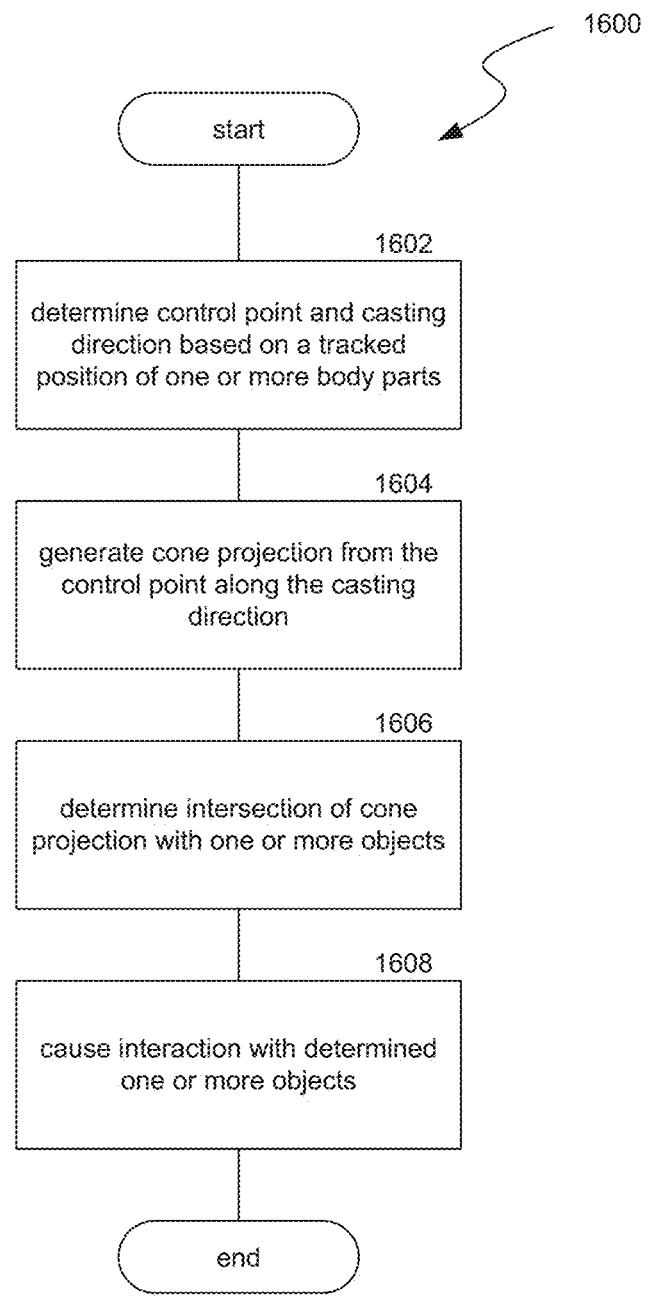
FIG. 16 is a flow diagram illustrating a process used in some implementations of the present technology for object interaction with a cone projection.

FIG. 16 is a flow diagram illustrating a process 1600 used in some implementations of the present technology for object interaction using a cone projection. At block 1602, process 1600 can determine a control point and a casting direction, for a projection, based on a tracked position of one or more body parts. In some implementations, as discussed above in relation to FIG. 5 through FIG. 11, the control point can be a palm, fingertips, a fist, a wrist, etc. and the casting direction can be along a line that passes through the control point and an origin point, such as a shoulder, eye, or hip. In other implementations, the control point can be based on other tracked body parts such as a user's eye, head, or chest. For example, the control point can be an estimated position of a of a center of user's pupil and the origin point can be an estimated position of the center of a user's retina. In some cases, instead of using an origin point to define a direction, the system can define a plane corresponding to the control point and can determine the casting direction as perpendicular to that plane. For example, where the control point is on the head or torso, the system can identify the coronal plane corresponding to the head or torso and can identify the casting direction as perpendicular to that coronal plane.

At block 1604, process 1600 can generate a cone projection with a cone tip at the control point and the cone extending away from the user along the casting direction. In some implementations, instead of a cone, the projection can be a pyramid projection with a pyramid tip at the control point and the pyramid extending along the casting direction. In some cases, a graphical representation of the cone (or pyramid) projection can be displayed in the artificial reality environment (e.g., a representation of the entire cone or pyramid or a representation of where the projection intersects objects), while in other cases the cone (or pyramid) projection is tracked by the XR system without displaying the projection. In various implementations, the cone (or pyramid) projection can extend from the control point until it intersects a first (real or virtual) object or the cone (or pyramid) projection can extend to at least partially intersect multiple objects.

At block 1606, process 1600 can determine an intersection between the cone (or pyramid) projection and one or more target objects. In some implementations, process 1600 can determine the intersection when a user makes a particular gesture, such as tapping an index finger to a thumb. In some implementations, the target object can be the first object that the cone (or pyramid) projection at least partially intersects or wholly encompasses. In other implementations, the target objects can be all of the objects that the cone (or pyramid) projection at least partially intersects or wholly encompasses. In yet other implementations, objects that the cone (or pyramid) intersects can be identified as target objects depending on other body part positions or gestures, such as the user's gaze or gestures involving fingers mapped to intersected objects. In some implementations, as discussed below in relation to FIGS. 30-34, the diameter of the cone can be controlled by other gestures, such as a distance between the user's hands or the distance between the tip of the user's index finger and thumb.

At block 1608, process 1600 can cause an interaction with the one or more target objects determined at block 1606. For example, process 1600 can select the target objects, cause them to move or rotate, or perform other interactions.

Figure 17:
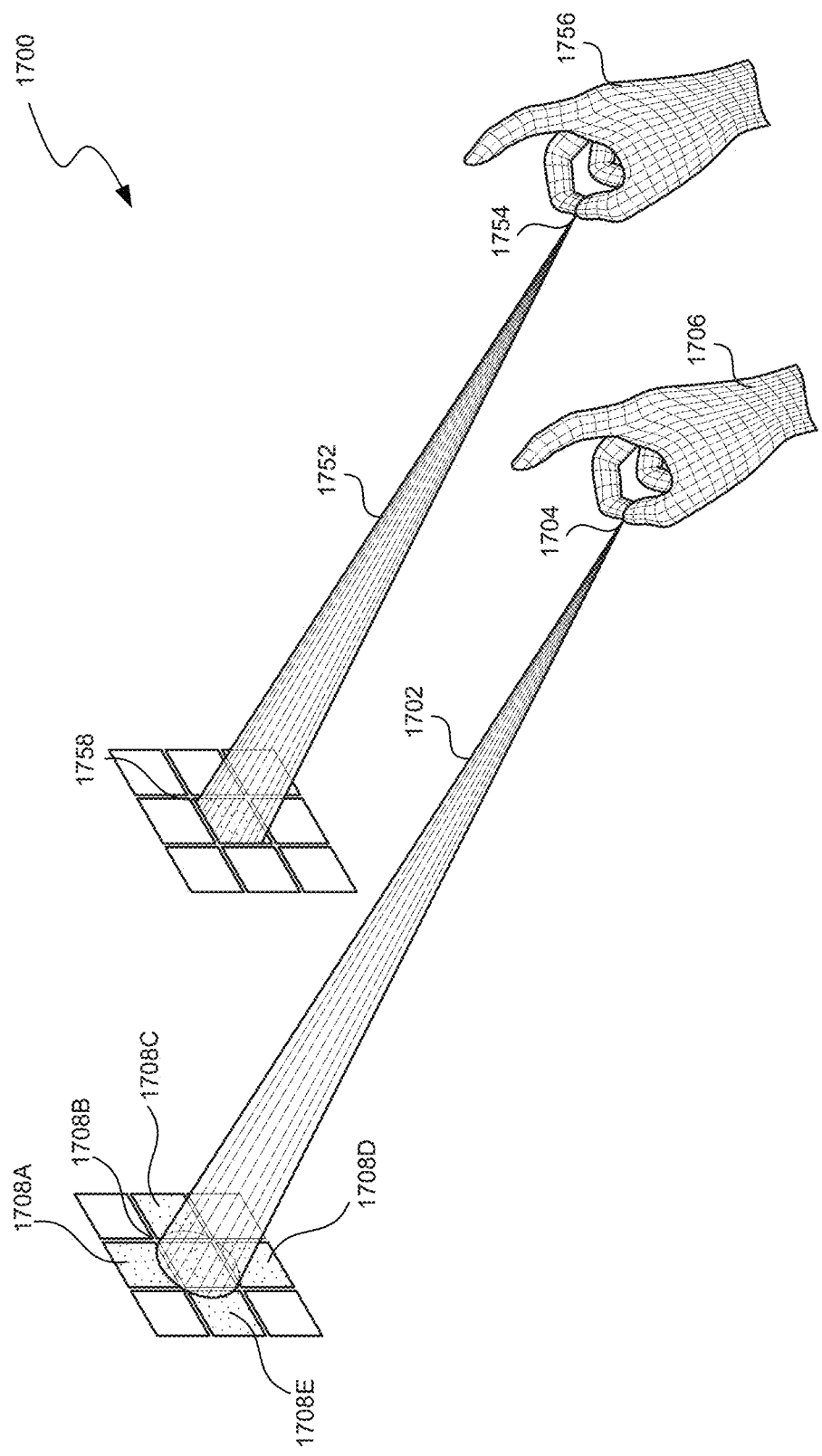
FIG. 17 is a conceptual diagram illustrating example cone projections.

FIG. 17 is a conceptual diagram illustrating an example 1700 of two cone projections 1702 and 1752. A users' hands 1706 and 1756 have formed gestures by connecting a thumb and middle finger, indicating initiation of a projection. In example 1700 the control points 1704 and 1754 are an offset from the users' middle fingers. Cone projection 1702 extends from the control point 1704, increasing in diameter until it intersects with target objects 1708, intersecting at least partially with each of target objects 1708A, 1708B, 1708C, 1708D, and 1708E. In example 1700, objects are selected as soon as the projection intersects with them, target objects 1708A-E are therefore selected by cone projection 1702. Cone projection 1752 extends from the control point 1754, also increasing in diameter. However, target object 1758 is closer to hand 1756 than target objects 1708 are to hand 1706, so cone projection 1752 only intersects with target object 1758. As objects are selected in example 1700 as soon as the projection intersects with them, target object 1758 is selected by cone projection 1752.

Figure 18:
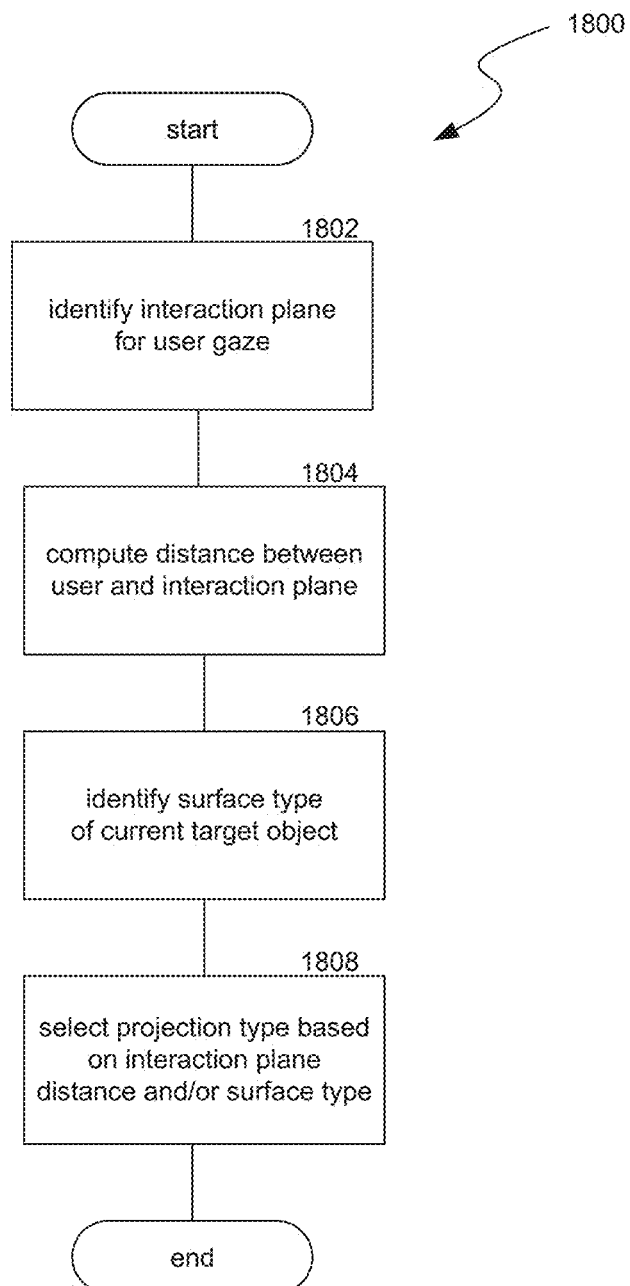
FIG. 18 is a flow diagram illustrating a process used in some implementations of the present technology for context-based selection of a projection type.

In some implementations, the hand interaction system can automatically select a type of projection to cast based on a current context. For example, the system can use ray projections when apparent target objects are closely grouped (e.g., when another type of projection would encompass greater than a threshold number of objects, or objects within a threshold distance from a center of a projection are within a threshold distance from each other). As another example, the hand interaction system can switch to sphere or cone projections when the closest objects that a ray projection would intersect are greater than a threshold distance away. FIG. 18 is a flow diagram illustrating a process 1800 used in some implementations of the present technology for context-based selection of a projection type.

At block 1802, process 1800 can identify an interaction plane for a user gaze. An interaction plane is a plane in an artificial reality environment of an object (or for the center between multiple objects) with which a user is currently interacting. For example, an interaction plane can be determined based on a plane at which a tracked gaze of the user is directed. As another example, if a user has selected a virtual object, the interaction plane can be centered on that object. At block 1804, process 1800 can compute a distance, in virtual space of the artificial reality environment, between the user and the interaction plane identified at block 1802.

At block 1806, process 1800 can identify a surface type of a current target object. In various implementations, surface types can be classified based on whether the surface of the target object is flat or not, the size of the target object, whether the target object includes controls, what type of controls the target object includes, what type of interactions the user or other users have previously performed in relation to the target object, etc. In other implementations, a type can be a setting assigned to the target object, e.g., by the creator of the object. In some implementations, process 1800 can begin at block 1806 instead of block 1802. In various implementations, process 1800 can include or skip block 1806.

At block 1808, process 1800 can select a projection type based on the distance computed at block 1804 and/or the surface type identified at block 1806. In some implementations, this selection can be based on a mapping of distance ranges to projection types. For example, when the interaction plane is within three feet of the user, ray projections can be used; when the interaction plane is between three and seven feet of the user, cylinder projections can be used; and when the interaction plane is more than seven feet from the user, cone projections can be used. In other implementations, a mapping can be of surface types to projection types. For example, where the surface type indicates a flat surface with multiple buttons and controls, ray projections can be used, and otherwise cylinder projections can be used. In yet further implementations, the mapping can be for pairs of distance ranges and surface types to projection types. For example, when the interaction plane is within three feet of the user and the surface type indicates a flat surface with multiple buttons and controls, ray projections can be used; when the interaction plane is within three feet of the user and the surface type indicates no controls, cylinder projections can be used; when the interaction plane is between three and seven feet from the user and the surface type indicates the object is larger than a seven-inch threshold cylinder projections can be used but if the surface type indicates the object is smaller than the seven-inch threshold ray projections can be used; and if the interaction plane is further than seven feet from the user, cone projections can be used without regard to the surface type.

Multi-Object Selection

When a user operates in an artificial reality environment, she can select various objects for further interaction or specify to the XR system to perform operations on objects. While some existing XR systems have techniques to select objects, such as by performing a finger gesture directed at each object, these techniques have a number of drawbacks. For example, when a user wishes to select a group of objects, selecting each object individually is time-consuming, frustrating, and requires extra processing power. When selecting distant or small objects, the existing techniques suffer from low precision and accuracy, making it difficult for the XR system to correctly interpret which objects the user intends to select. Also, when the user intends to select objects that, from the XR system's viewpoint, occlude each other, the XR system does not know how to disambiguate which object(s) the user intends to select. Furthermore, with existing XR systems, when the object is within a dense field of other objects, focused refinement of the user's intent within the object group is impossible.

Technologies for overcoming these drawbacks in existing systems include systems and processes to identify and interpret "cut," "lasso" and "frame" gestures for selecting multiple objects, a "cut-click" gesture for activating controls, and various two-handed "bimanual" gestures to disambiguate between potential target objects.

Figure 19:
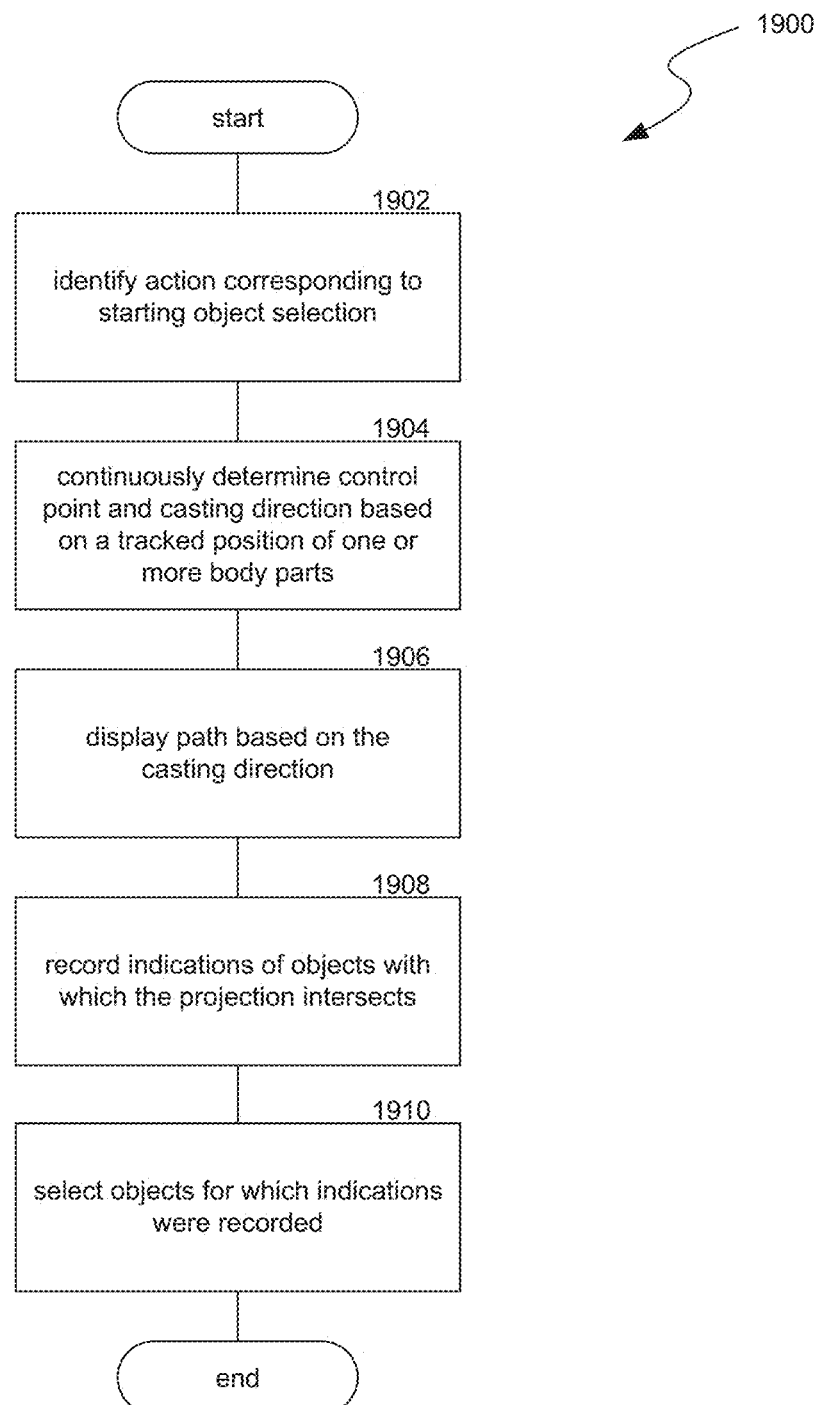
FIG. 19 is a flow diagram illustrating a process used in some implementations of the present technology for selecting objects using a cut gesture.

FIG. 19 is a flow diagram illustrating a process 1900 used in some implementations of the present technology for selecting objects using a cut gesture. At block 1902, process 1900 can identify an action corresponding to starting object selection. In some implementations, the action can be a particular gesture, such as a "pinch" between the user's thumb and index or middle finger. In some implementations, the action can also include identifying gating conditions such as a hand tracking system providing one or more of indications that the user's hand is in-view, that a confidence value in the current hand tracking position is above a threshold, or that the hand is not in a resting state.

At block 1904, process 1900 can continuously determine a control point and casting direction based on a tracked position of one or more body parts. The body part(s), for example, can be part of a hand (e.g., fingertips, wrist, palm, fist, etc.), an eye, a head, a chest or torso, a leg or foot, etc. The control point can be at one of the body parts or offset from it. In some implementations, the casting direction can be along a line connecting one of the user's eyes to the control point. For example, process 1900 can record intersections between objects and a line that extends outward from the control point and that intersects both the control point and the user's dominant eye. The effect of this example appears to the user as though they are "drawing" in space by moving the control point. In other implementations, projections as discussed above in relation to FIG. 5 through FIG. 11 can be used. In these implementations, the casting direction can be along a line that passes through the control point and an origin point, such as a shoulder, eye, or hip. In some implementations, the drawing can be done by a user's gaze, where the control point can be an estimated position of a center of a user's pupil and the origin point can be an estimated position of the center of a user's retina.

At block 1906, process 1900 can display a path based on the casting direction. The path can be a record of locations indicated by the control point and casting direction. In some implementations, the path can appear to the user as if she is drawing the path in the artificial reality environment by moving the control point. In other implementations, the path can appear to the user as if she is creating the path at the end of a projection. In some implementations, process 1900 does not display a path, skipping block 1906.

At block 1908, as process 1900 continuously monitors the control point and casting direction, process 1900 can record any objects, from the user's point of view, that the control point intersects. In some implementations, process 1900 can record indications of any object that a cast projection intersects.

At block 1910, in response to one or more triggers such as the user releasing a gesture or the velocity of the user's hand movement falling below a threshold, process 1900 can select the objects for which indications were recorded at block 1908. For example, process 1900 could have started at block 1902 by recognizing that a user formed a gesture bringing all five fingertips together. At blocks 1904, 1906, and 1908, process 1900 could have monitored a point just in front of the user's fingertips as a control point, determined a direction based on a tracked position of the user's dominant eye, and recorded each object that the control point intersected from the user's point of view. Process 1900 could have continued this until the user released the five-finger gesture, at which point process 1900 can cause any recorded objects to be selected.

Figure 20:
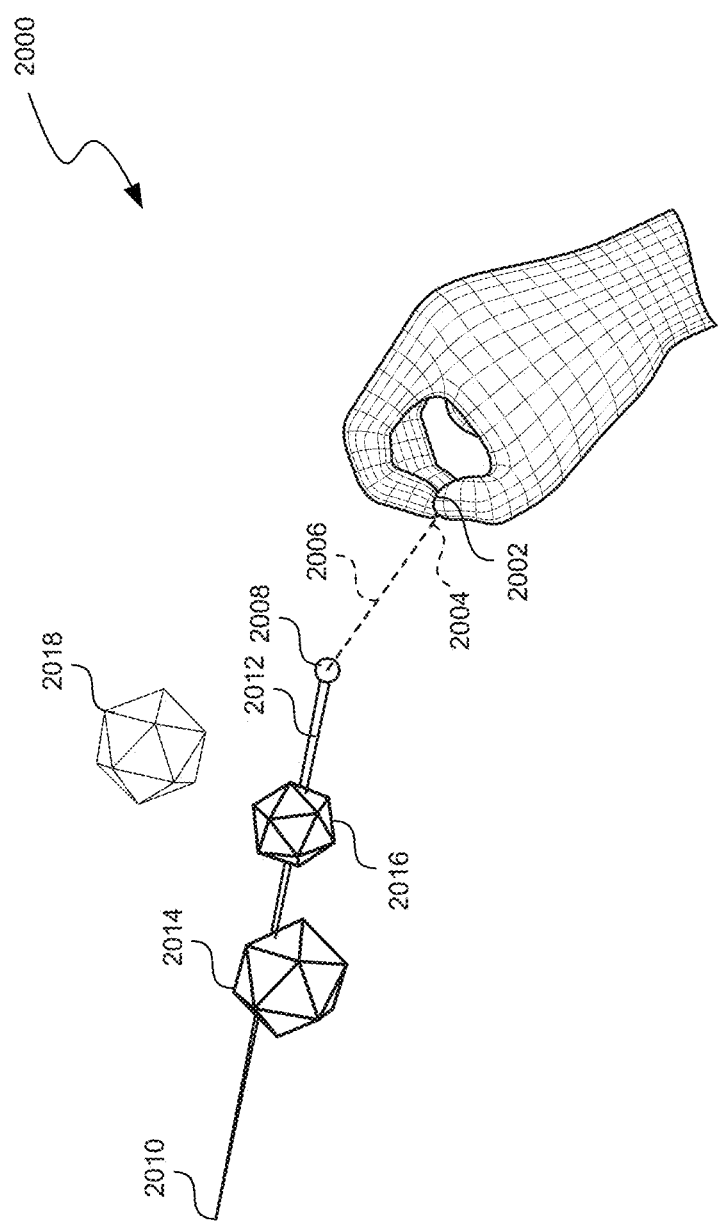
FIG. 20 is a conceptual diagram illustrating an example of selecting objects using a cut gesture.

FIG. 20 is a conceptual diagram illustrating an example 2000 of selecting objects using a cut gesture. In example 2000, the user began by making a gesture 2002, bringing her thumb-tip, index fingertip, and middle fingertip together. The hand interaction system then began tracking control point 2004 (a point offset in front of the gesture 2002) and casting direction 2006. In example 2000, casting direction 2006 is formed by determining the line connecting the user's eye (not shown) and the control point 2004. Thus, from the user's point of view, control point 2004 occludes drawing point 2008. When the user first formed the gesture 2002, the drawing point 2008 was at point 2010. The user then moved her hand, causing the control point 2004 to move, which in turn caused drawing point 2008 to progress from point 2010 along path 2012. As a result, path 2012 intersects with objects 2014 and 2016, but does not intersect with object 2018, causing the hand interaction system to record indications of objects 2014 and 2016. In example 2000, the hand interaction system displays path 2012 in the artificial reality environment for the user to see. When the user releases gesture 2002, the hand interaction system selects objects 2014 and 2016, based on the recorded indications. As shown in the figures herein, objects are illustrated as "selected" when the wireframe of that object has bold lines, as compared to other objects in that figure.

Figure 21:
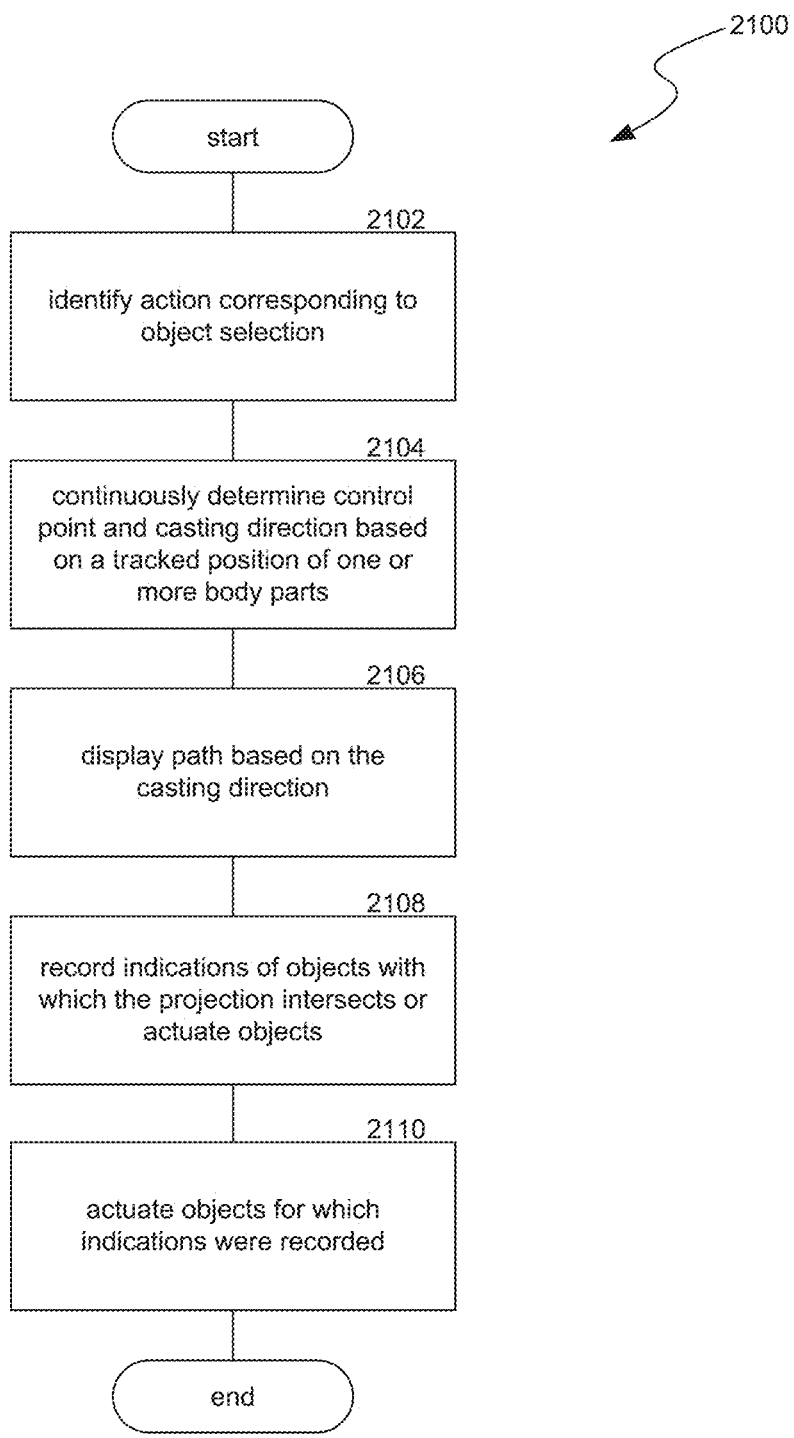
FIG. 21 is a flow diagram illustrating a process used in some implementations of the present technology for actuating objects using a cut-click gesture.

FIG. 21 is a flow diagram illustrating a process 2100 used in some implementations of the present technology for actuating objects using a cut-click gesture. At block 2102, process 2100 can identify an action corresponding to starting object selection. In some implementations, the action can be a particular gesture, such as a "pinch" between the user's thumb and index or middle finger. In some implementations, the action can also include identifying gating conditions such as a hand-tracking system providing one or more indications that the user's hand is in view, that a confidence value in the current hand-tracking position is above a threshold, or that the hand is not in a resting state.

At block 2104, process 2100 can continuously determine a control point and casting direction based on a tracked position of one or more body parts. The body part(s), for example, can be part of a hand (e.g., fingertips, wrist, palm, fist, etc.) part of an eye, a head, a chest or torso, a leg or foot, etc. The control point can be at one of the body parts or offset from it. In some implementations, the casting direction can be along a line connecting one of the user's eyes to the control point. For example, process 2100 can record intersections between objects and a line that extends outward from the control point and that falls along a line that intersects both the control point and the user's dominant eye. The effect of this example appears to the user as though they are "drawing" in space by moving the control point. In other implementations, projections as discussed above in relation to FIG. 5 through FIG. 11 can be used. In these implementations, the casting direction can be along a line that passes through the control point and an origin point, such as a shoulder, eye, or hip. In some implementations, the drawing can be done by a user's gaze, where the control point can be an estimated position of a center of a user's pupil and the origin point can be an estimated position of the center of a user's retina.

At block 2106, process 2100 can display a path based on the casting direction. The path can be a record of locations indicated by the control point and casting direction. In some implementations, the path can appear to the user as if she is drawing the path in the artificial reality environment by moving the control point. In other implementations, the path can appear to the user as if she is creating the path at the end of a projection. In some implementations, process 2100 does not display a path, skipping block 2106.

At block 2108, as process 2100 continuously monitors the control point and casting direction, process 2100 can record any objects that the control point intersects from the user's point of view, which is based on the casting direction. In some implementations where a projection is used, process 2100 can record indications of any object that the projection intersects. In some implementations, instead of or in addition to recording intersections, whenever process 2100 identifies an intersection with an actionable object (such as a button or other control), process 2100 can actuate the object.

At block 2110, in response to one or more triggers such as the user releasing a gesture or the velocity of the user's hand movement falling below a threshold, process 2100 can actuate the objects for which indications were recorded at block 2108. For example, process 2100 could have started at block 2102 by recognizing that a user formed a gesture bringing all five finger tips together. At blocks 2104, 2106, and 2108, process 2100 could have monitored a point just in front of the user's fingertips as a control point, determined a direction based on a tracked position of the user's dominant eye, and recorded each actionable object that, from the user's point of view, the control point intersected. Process 2100 could have continued this until the user released the five-finger gesture, at which point process 2100 can cause any recorded objects to be actuated. In some implementations, process 1900 and 2100 can be performed together where movement of the control point can cause actionable intersected objects to be actuated and other intersected objects to be selected. In some implementations, the actionable objects are actuated, and both the actionable and non-actionable objects are selected.

Figure 22:
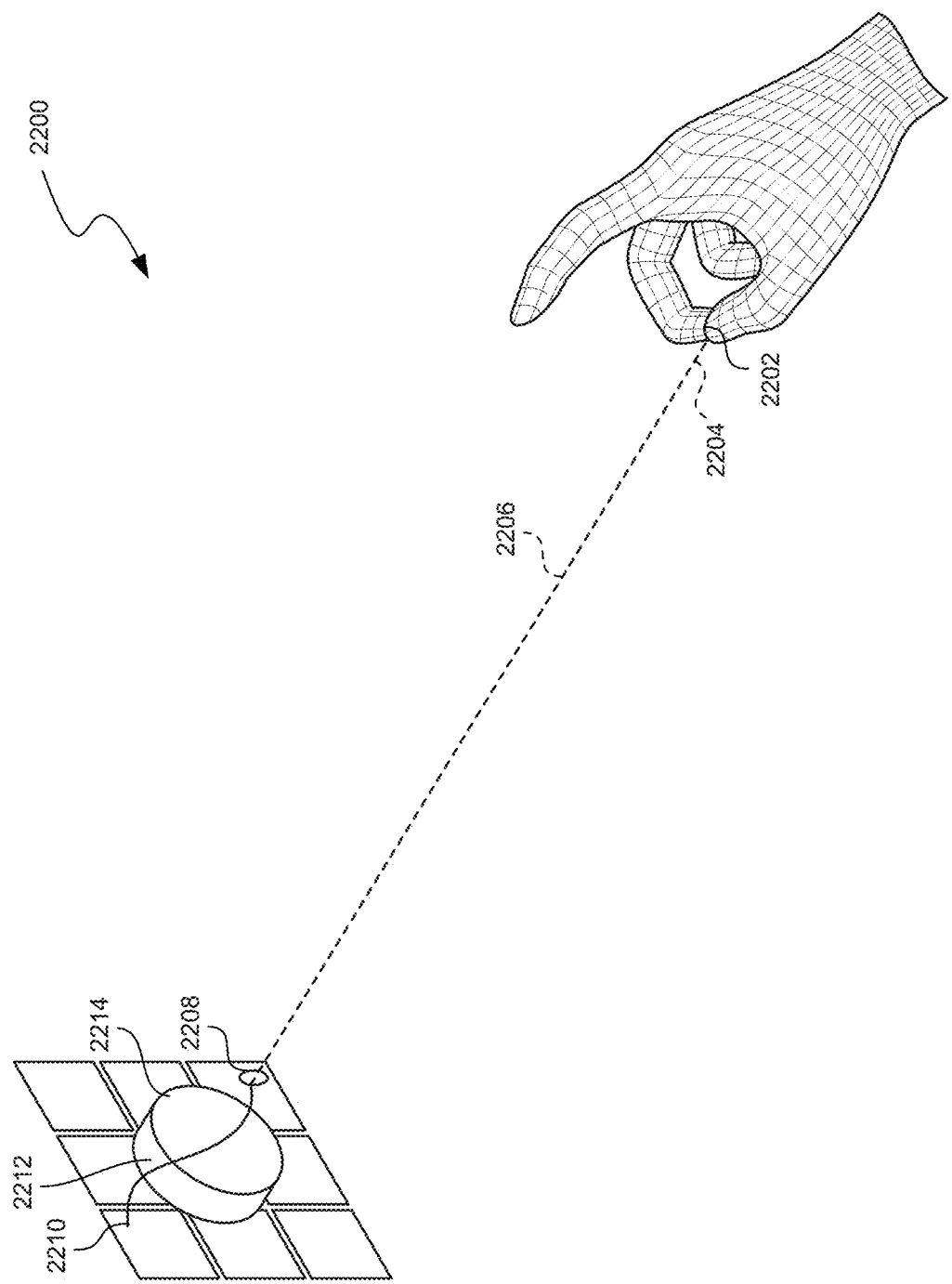
FIG. 22 is a conceptual diagram illustrating an example of actuating objects using a cut-click gesture.

FIG. 22 is a conceptual diagram illustrating an example 2200 of actuating a button object using a cut-click gesture.

In example 2200, the user began by making a gesture 2202, bringing her thumb-tip and middle fingertip together. The hand interaction system then began tracking control point 2204 (a point offset in front of the gesture 2202) and casting direction 2206. In example 2200, casting direction 2206 is formed by determining the line connecting the user's eye (not shown) and the control point 2204. Thus, from the user's point of view, control point 2204 occludes drawing point 2208. When the user first formed the gesture 2202, the drawing point 2208 was at point 2210. The user then moved her hand, causing the control point 2204 to move, which in turn caused drawing point 2208 to progress from point 2210 along path 2212. As a result, path 2212 intersects with button object 2214, causing the hand interaction system to actuate button object 2214. In example 2200, the hand interaction system displays path 2212 in the artificial reality environment.

Figure 23:
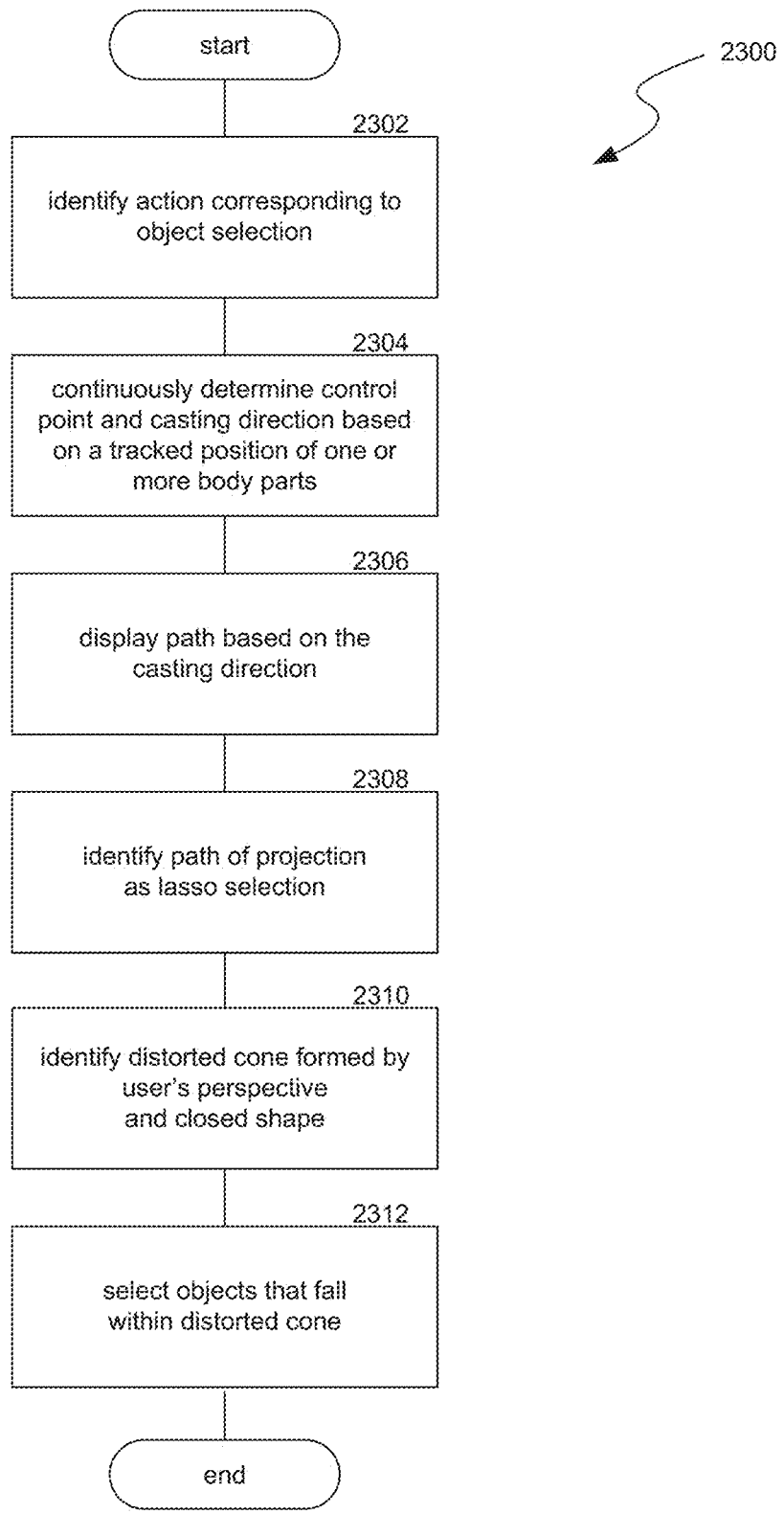
FIG. 23 is a flow diagram illustrating a process used in some implementations of the present technology for selecting objects using a lasso gesture.

FIG. 23 is a flow diagram illustrating a process 2300 used in some implementations of the present technology for selecting objects using a lasso gesture. At block 2302, process 2300 can identify an action corresponding to starting object selection. In some implementations, the action can be a particular gesture, such as a "pinch" between the user's thumb and index or middle finger. In some implementations, the action can also include identifying gating conditions such as a hand-tracking system providing one or more indications that the user's hand is in view, that a confidence value in the current hand-tracking position is above a threshold, or that the hand is not in a resting state.

At block 2304, process 2300 can continuously determine a control point and casting direction based on a tracked position of one or more body parts. The body part(s), for example, can be part of a hand (e.g., fingertips, wrist, palm, fist, etc.) part of an eye, a head, a chest or torso, a leg or foot, etc. The control point can be at one of the body parts or offset from it. In some implementations, the casting direction can be along a line connecting one of the user's eyes to the control point. For example, process 2300 can determine whether objects fall within a distorted cone formed with the distorted cone's tip at the user's eye and the shape of the distorted cone's sides based on the user moving the control point. As used herein, a "distorted cone" is a cone with a base that is not necessarily a circle or oval shape. In some implementations, the distorted cone shape can be created by a user moving her gaze, where the gaze is determined by a line formed from an estimated position of a center of a user's pupil and an estimated position of the center of a user's retina.

At block 2306, process 2300 can display a path based on the casting direction. The path can be a record of locations indicated by the control point and casting direction. In some implementations, the path can appear to the user as if she is drawing the path in the artificial reality environment by moving the control point. In some implementations, process 2300 does not display a path, skipping block 2306.

At block 2308, as process 2300 continuously monitors the control point and casting direction, process 2300 can determine that the user movement of the control point was intended as a lasso input. In some implementations, process 2300 makes this determination by providing indications of the path to a machine learning model trained to identify lasso inputs. In some implementations, process 2300 makes this determination by flattening the path, from the user's perspective, to a 2D plane and determining that the path intersects itself. The lasso input can define a closed outline of a shape formed by the lasso input. If the lasso input does not make a closed shape, process 2300 can close it with a straight line or a curve matching the lasso input.

At block 2310, in response to one or more triggers such as the identification of the lasso input, the user releasing a gesture, or the velocity of the user's hand movement falling below a threshold, process 2300 can identify a distorted cone formed with the tip of the distorted cone at one of the user's eyes and the distorted cone shape formed by the closed shape defined by the lasso input. For example, the distorted cone can be formed by each possible line that extends from the user's eye and that passes through a point on the closed shape.

At block 2312, process 2300 can select the objects which fall within the distorted cone identified at block 2310. In some implementations, process 2300 can also select objects that at least partially intersect the distorted cone or have a threshold amount of their volume within the distorted cone (e.g., at least 30%, 50%, or 75%). For example, process 2300 could have started at block 2302 by recognizing that a user formed a gesture bringing all five finger tips together. At blocks 2304-2310, process 2300 could have monitored a point just in front of the user's fingertips as a control point, determined a direction based on a tracked position of the user's dominant eye, tracked a path defined by the control point from the user's point of view, and used a machine learning model to determine that the path formed a lasso input. Process 2300 could then identify a distorted cone defined by a path of a line that begins at the user's eye and that is moved to also extend through every point on a closed portion of the lasso input. Process 2300 could then cause any objects that at least partially fall within the distorted cone to be selected.

In some implementations, multiple of the selection processes described herein can be combined into a single gesture. For example, processes 1900 and 2300 can be combined. In one example, process 1900 can begin at block 1902 while continuously performing the analysis from block 2308 to determine if the input is a lasso gesture. If a lasso gesture is identified, process 1900 can transition to block 2308 of process 2300. if no lasso gesture is identified, process 1900 can continue. In another example, a lasso gesture drawn by the user can have a closed shape with a beginning and/or an ending "tail." This example combination of processes 1900 and 2300 can select all objects that intersect the path of the lasso gesture (including the tail) from the user's point of view and can select all objects that fall inside the distorted cone formed by the closed shape portion of the lasso gesture. In another example, process 2100 can be combined with process 2300 such that any actionable object selected by process 2300 can also be actuated.

Figure 24A:
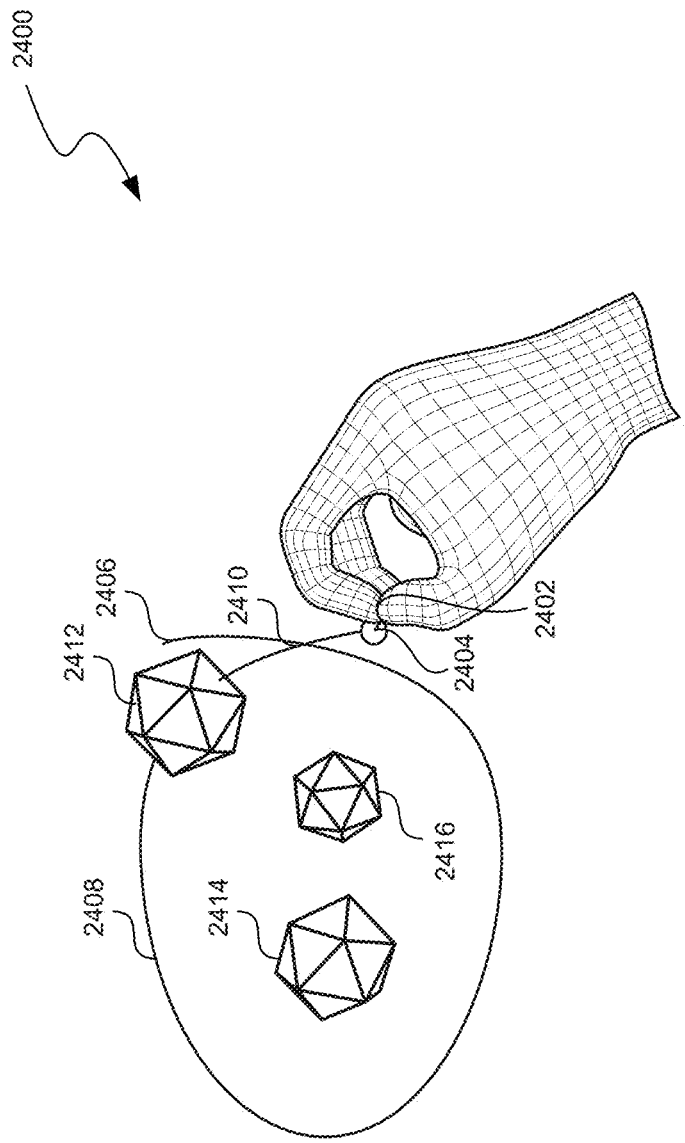
FIGS. 24A and 24B are conceptual diagrams illustrating an example of selecting objects using a lasso gesture.

FIG. 24A is a conceptual diagram illustrating an example 2400 of selecting objects using a lasso gesture. In example 2400, the user began by making a gesture 2402, bringing her thumb-tip, index fingertip, and middle fingertip together. The hand interaction system then began tracking control point 2404 (a point offset in front of the gesture 2402) and a casting direction formed by determining the line connecting the user's eye (not shown) and the control point 2404. Thus, from the user's point of view, moving control point 2404 can be used to "draw" a path in the artificial reality environment. When the user first formed the gesture 2402, she began drawing at point 2406. The user then moved her hand, causing the control point 2404 to move, creating path 2408. When path 2408 intersects with itself (from the user's point of view) at point 2410, the hand interaction system determined, based on a machine learning model, that the user has drawn a lasso selection. The hand interaction system then formed the closed section of path 2408 into a distorted cone (not shown) and determined that the distorted cone at least partially intersects with objects 2412, 2414, and 2416. The hand interaction system thus selected the intersected objects 2412, 2414, and 2416.

Figure 24B:
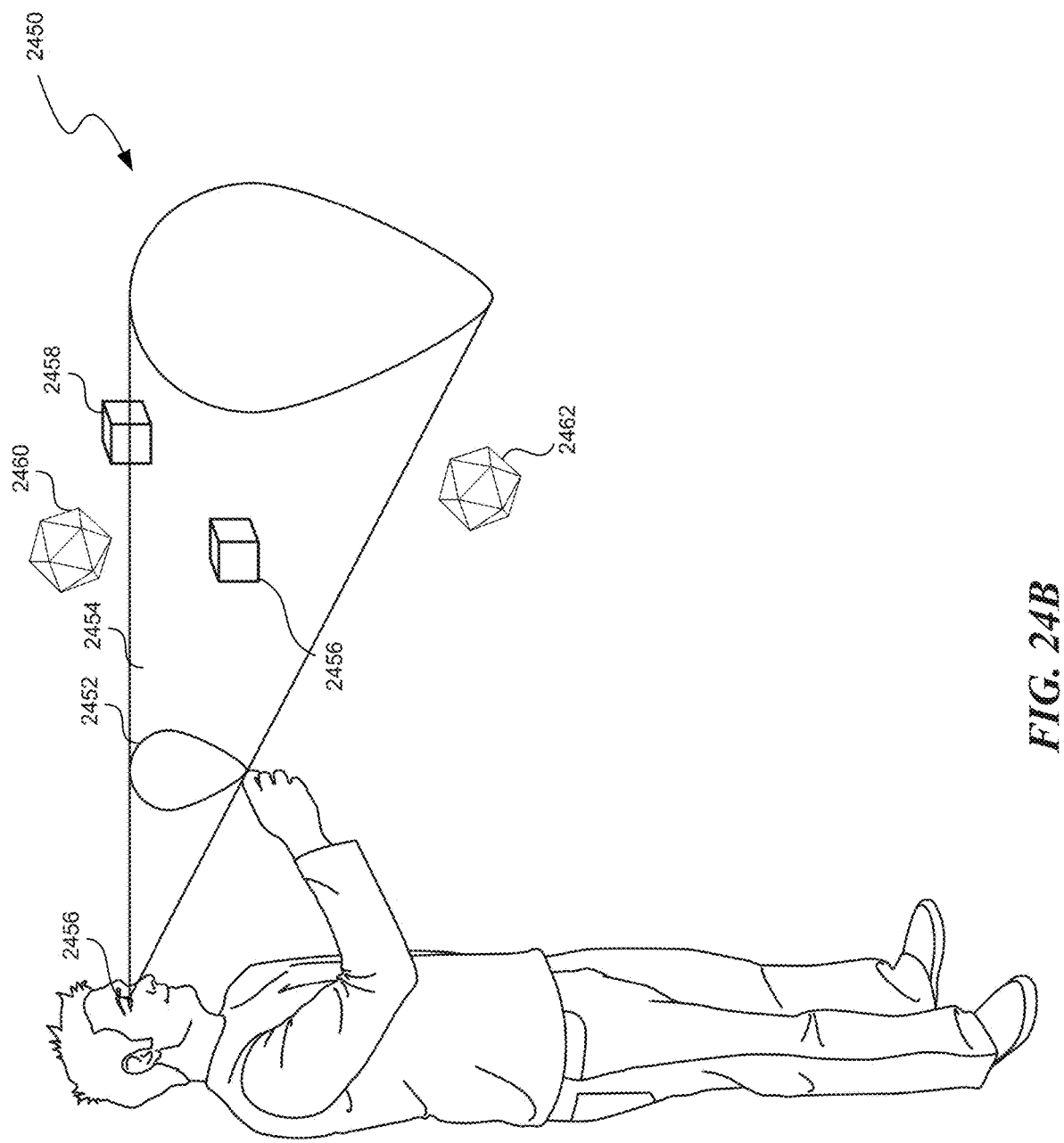

FIG. 24B is another conceptual diagram illustrating an example 2450 of selecting objects using a lasso gesture. In example 2450, the user formed a path with a closed shape 2452 by moving a control point based on a gesture in a manner similar to example 2400. The hand interaction system formed a distorted cone 2454 with the tip of the cone at the user's dominant eye 2456 and extending so that the edges of the distorted cone coincide with closed shape 2452. The hand interaction system then determined any objects that are beyond the shape 2452 (i.e. on the opposite side of the closed shape 2452 from the user) and that intersect with that portion of the distorted cone 2454. In example 2450, these are objects 2456 and 2458. The hand interaction system thus selected the intersected objects 2456 and 2458, but not non-intersected objects 2460 and 2462.

Figure 25:
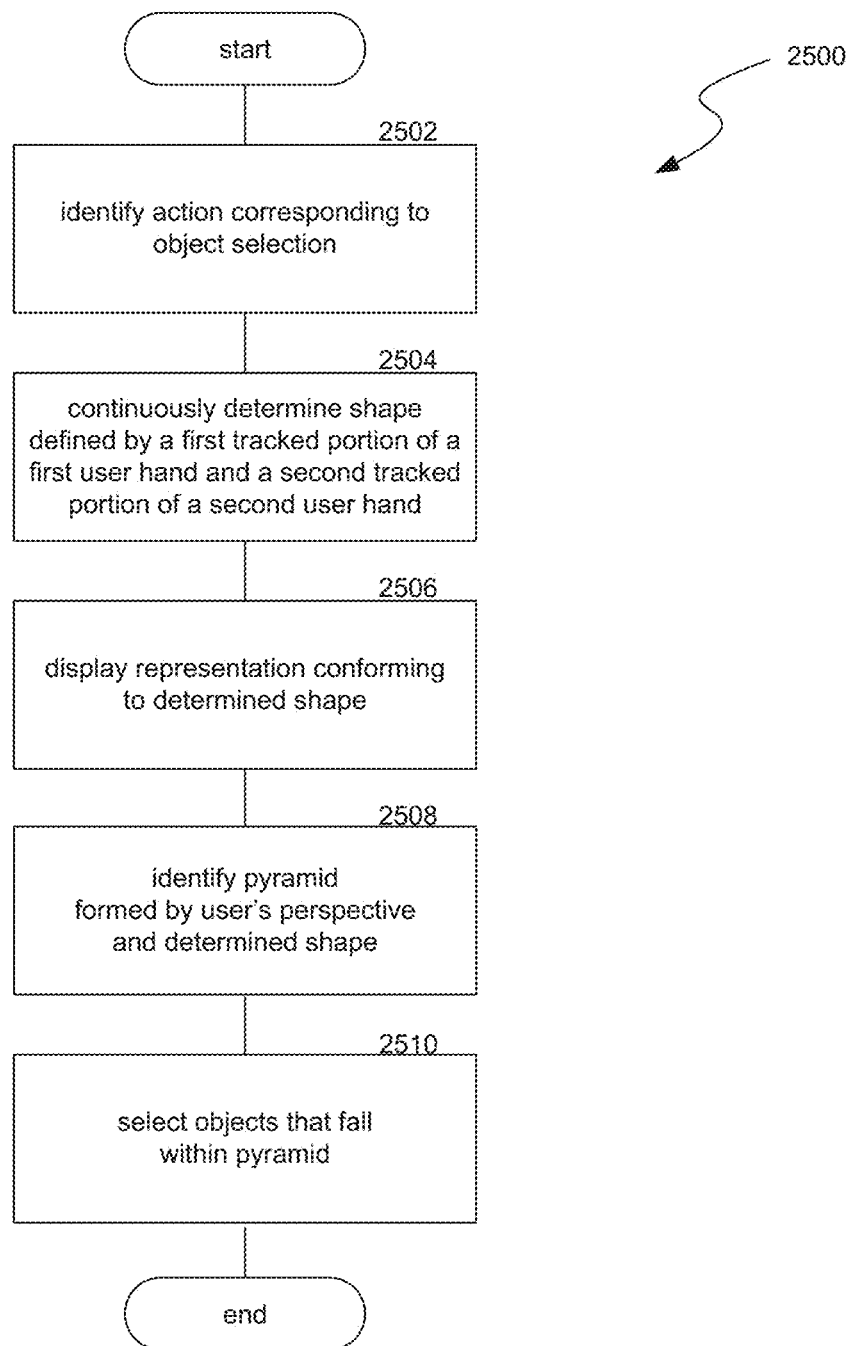
FIG. 25 is a flow diagram illustrating a process used in some implementations of the present technology for selecting objects using a frame gesture.

FIG. 25 is a flow diagram illustrating a process 2500 used in some implementations of the present technology for selecting objects using a frame gesture. At block 2502, process 2500 can identify an action corresponding to starting object selection. In some implementations, the action can be a two-handed "pinch" gesture, formed with the user's thumb from each hand touching the index or middle finger of that hand, with the two pinches touching at the thumb/finger intersection point. In some implementations, the action can be a two-handed "L" gesture, formed with a first hand having the thumb sticking up perpendicular to the floor and the index finger parallel to the floor and with a second hand having the thumb sticking down perpendicular to the floor and the index finger parallel to the floor, defining two opposite corners of a rectangle. In some implementations, the gesture can be the user's fingers on one or both hands defining another shape, such as a triangle or oval. In some implementations, the gesture can be formed with one hand. For example, the gesture can be a pinch that, when opened, defines opposite points of a rectangle corresponding to points at the tips of the user's thumb and finger. As another example, the gesture can be a pinch that begins the system tracking a control point. The control point can be moved to draw a line, defining opposite points of a rectangle as the start and end points of the line. In some implementations, the action can also include identifying gating conditions such as a hand-tracking system providing one or more indications that the user's hand is in view, that a confidence value in the current hand-tracking position is above a threshold, or that the hand is not in a resting state.

At block 2504, process 2500 can continuously determine a shape defined by a first tracked portion of a first user hand and a second tracked portion of a second user hand. The shape can be a rectangle and the tracked hand portions can be points identified at block 2502 corresponding to opposite corners of the rectangle. As the user moves her hands, process 2500 can determine new sizes and positions for the rectangle. In other implementations, the shape can be defined by ascribing lines or curves to portions of a user's hand, connecting the lines and/or snapping the lines to conform to a given shape. For example, process 2500 can be configured to recognize a rectangle, and the user can make an L shape with each hand. Process 2500 can ascribe a line to each finger making part of the L shape, extend them to intersect, and snap these four lines to form right angles, making a rectangle. As another example, process 2500 can be configured to recognize an oval, and the user can make a "C" shape with the thumb and index finger of one hand and another backward "C" shape with the thumb and index finger of the other hand. Process 2500 can ascribe a curve to each C shape, extend them to intersect, and smooth these curves to form an oval. As discussed above, in some implementations, the shape can be defined by a gesture using a single hand, such as a rectangle formed with opposite corners defined at points on a user's index finger and thumb or based on a line drawn by a user (in a manner similar to the path tracked by blocks 1902 and 1904) that defines opposite corners of a rectangle as the start and end points of the line.

At block 2506, process 2500 can display a representation (such as an outline) of the shape determined at block 2504. For example, if the user is making a gesture to pull apart opposite corners of a rectangle using pinch gestures, a rectangle can be continuously drawn showing the user an outline of the rectangle. In some implementations, process 2500 does not display a shape representation, skipping block 2506.

At block 2508, process 2500 can identify a pyramid formed with the tip of the pyramid at one of the user's eyes and the pyramid walls being formed based on the rectangle determined at block 2504. For example, the pyramid can be formed by the four triangles that extend from the user's eye and that pass through one edge of the rectangle. In some implementations where the shape determined at block 2504 is other than a rectangle, other 3D shapes can be determined, such as a tetrahedron if the shape is a triangle or a cone if the shape is an oval (formed similarly to block 2310).

At block 2510, in response to one or more triggers such as continuously following the identification of the action at block 2502, upon the user releasing the gesture identified at block 2502, or when the velocity of the user's hand movement falls below a threshold, process 2500 can select the objects that fall within the pyramid (or other shape) identified at block 2508. In some implementations, process 2500 can also select objects that at least partially intersect the pyramid (or other shape) or have a threshold amount of their volume within it (e.g., at least 20%, 50%, or 85%). For example, process 2500 could have started at block 2502 by recognizing that a user formed two touching pinch gestures. At blocks 2504-2510, process 2500 could have continuously determined the size and position of the rectangle formed with opposite corners at the user's two pinch gestures as the user pulls them apart. Process 2500 could then have drawn this rectangle for the user to see, identified a pyramid with a tip at the user's dominant eye and with the pyramid shape defined by the rectangle, and caused any objects that at least partially fall within the pyramid to be selected.

In some implementations, multiple of the selection processes described herein can be combined into a single gesture. For example, processes 2100 and 2500 can be combined such that any actionable object selected by process 2500 can also be actuated.

Figure 26A:
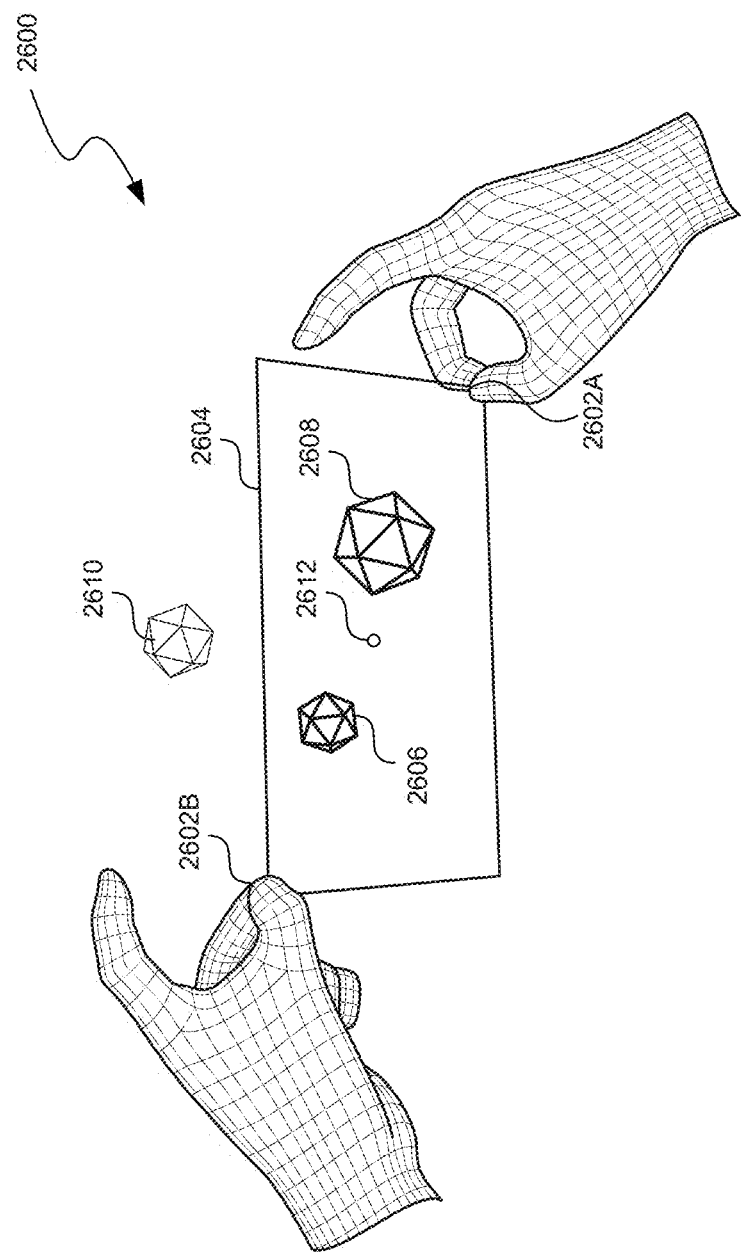
FIGS. 26A and 26B are conceptual diagrams illustrating an example of selecting objects using a frame gesture.

FIG. 26A is a conceptual diagram illustrating an example 2600 of selecting objects using a frame gesture. In example 2600, the user began by making gestures 2602A and 2602B, bringing her thumb-tips and index fingertips together and touching those gestures together at point 2612. The hand interaction system then began tracking opposite corners of rectangle 2604 based on the locations of gestures 2602A and 2602B, from the user's point of view. Thus, from the user's point of view, moving gesture points 2602A and 2602B formed rectangle 2604. As the user moved her hands apart, the corners of rectangle 2604 moved apart, increasing the size of rectangle 2604. As the user formed this rectangle, the hand interaction system determined a pyramid formed with the pyramid tip at the user's dominant eye and with sides extending through the edges of rectangle 2604. In example 2600, the hand interaction system continuously selected (or deselected) objects that at least partially intersect with the pyramid until the user released one of gestures 2602A or 2602B. The hand interaction system thus selected the intersected objects 2606 and 2608, but not 2610.

Figure 26B:
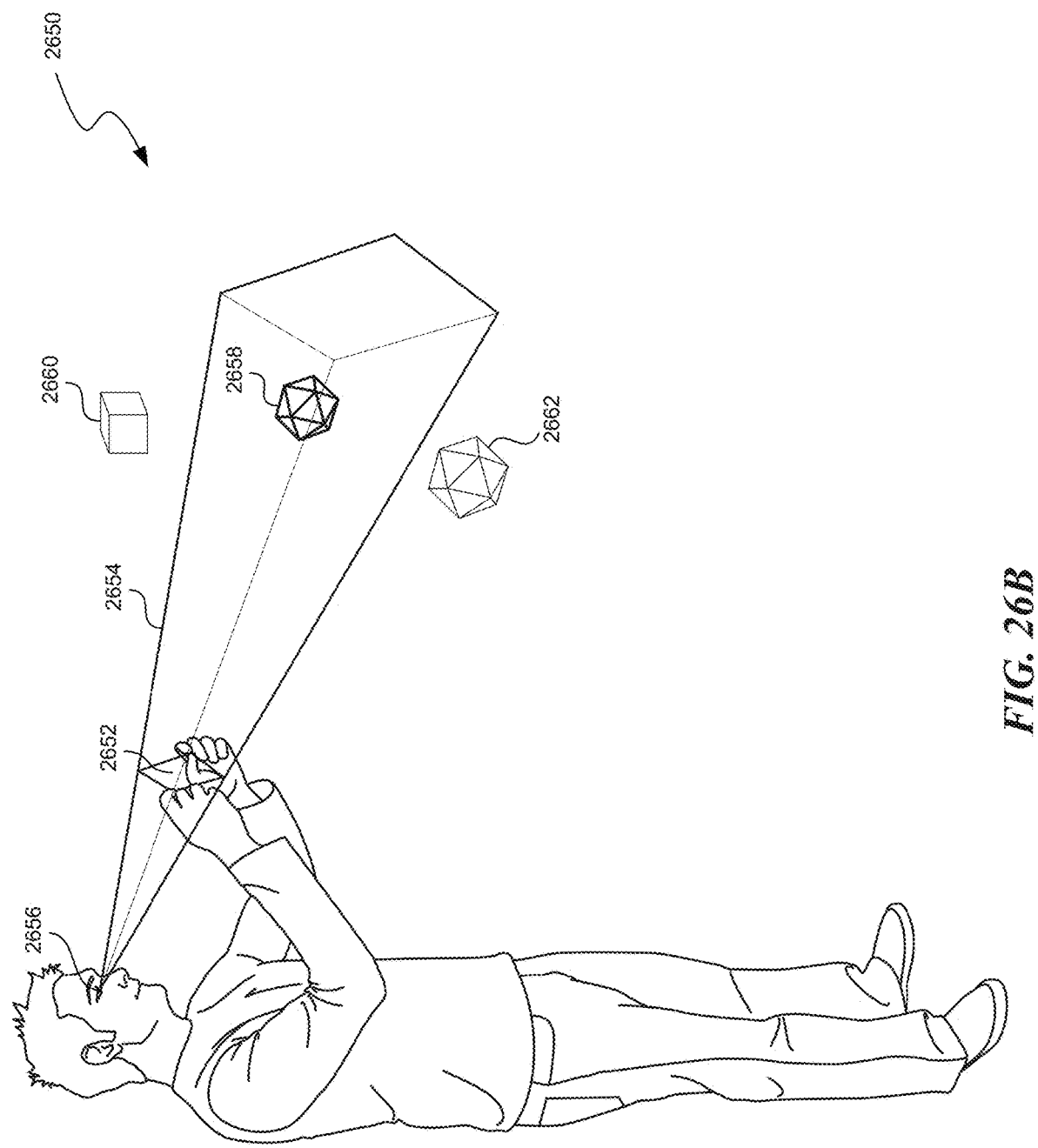

FIG. 26B is another conceptual diagram illustrating an example 2650 of selecting objects using a frame gesture. In example 2650, the user formed a rectangle 2652 by forming two pinch gestures and pulling them apart in a manner similar to example 2600. The hand interaction system formed a pyramid 2654 with the tip of the pyramid at the user's dominant eye 2656 and extending so that the four triangles that form edges of the pyramid coincide with rectangle 2652. The hand interaction system then determined any objects that are both beyond the rectangle 2652 (i.e. on the opposite side of the rectangle 2652 from the user) and that fall completely within the pyramid 2654. In example 2650, this is object 2658. The hand interaction system thus selected the enveloped object 2658, but not non-enveloped objects 2660 and 2662.

Bimanual Interactions

Single hand gestures limit how expressive a user can be when interacting with an XR system. The hand interaction system can track postures of both user hands, allowing a second hand (e.g., a non-dominant hand) to provide nuances for a gesture controlled by a first hand (e.g., a dominant hand). These bimanual (i.e., two-handed) interactions allow users to transfer their everyday experiences and skills to interactions in the artificial reality environment. For example, when performing an interaction with a projection casting technique discussed above, the projection can intersect with more or fewer objects than the user intends, such as when multiple objects occlude one another, when objects are tightly grouped and a user wants to select a subset of them, or when objects are spread apart and the user wants to select all of them. In these cases, a second gesture performed by a second hand (and/or with different parts of the same hand) can control aspects of the projection such as the length of a ray projection (e.g., a "hook" interaction) or the diameter of a cone projection (e.g., a "trombone" interaction). In some implementations, the user may want to perform more complicated interactions with a target object or objects and can specify details of these interactions by interacting with a control using her second hand.

Figure 27:
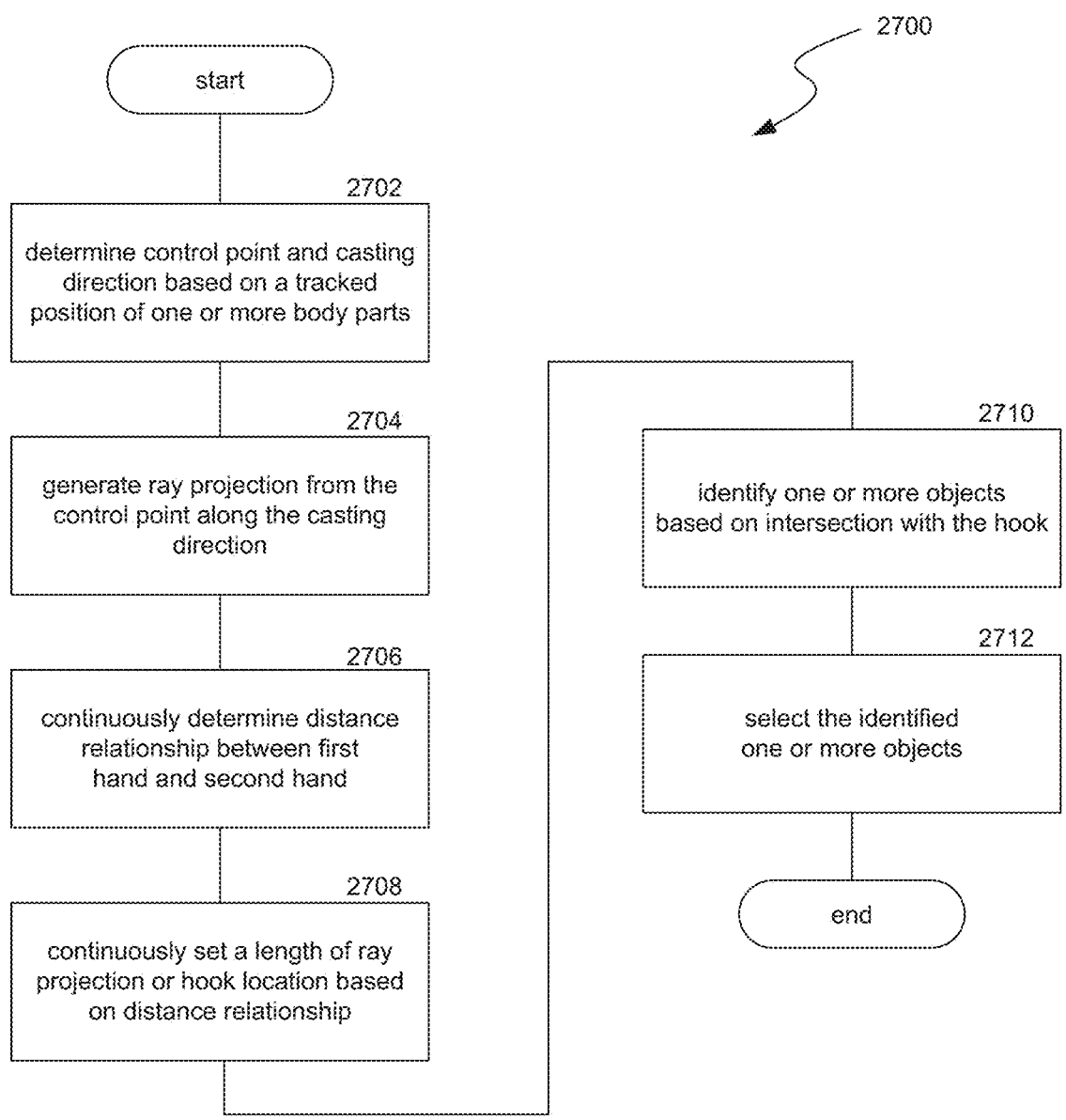
FIG. 27 is a flow diagram illustrating a process used in some implementations of the present technology for disambiguating between target and non-target objects that intersect with a ray projection.

FIG. 27 is a flow diagram illustrating a process 2700 used in some implementations of the present technology for disambiguating between target and non-target objects that intersect with a ray projection. For example, this can allow a user to disambiguate objects that occlude one another when using a ray projection.

At block 2702, process 2700 can determine a control point and casting direction based on a tracked position of one or more body parts. Process 2700 can accomplish this in a manner similar to block 1202. At block 2704, process 2700 can generate a ray projection from the control point along the casting direction. Process 2700 can accomplish this in a manner similar to block 1204.

At block 2706, process 2700 can continuously determine a distance relationship between a first hand (e.g., a dominant hand) controlling the control point and a second hand (e.g., a non-dominant hand). In some implementations, instead of the distance between two hands, the distance relationship can be based on the distance between two fingers (e.g., tip of index finger and tip of thumb) on one hand. In other implementations, the distance relationship can be based on the distance between one hand and another body part, such as the user's torso. In some implementations, the ray projection can be along a user's gaze, and the user can specify a distance by moving her hand closer or further from her eye along the ray. In various implementations, the distance can be in any direction or can be in a particular direction (e.g., perpendicular to the ray or along the ray).

In various implementations, the distance relationship can be linearly or exponentially proportional to the actual distance between the user's hands. In some implementations, this relationship can be based on a speed at which the user changes the distance between her hands. For example, an amount that process 2700 determines can be increased or decreased logarithmically such that faster movements increase the amount more than slow movements. This allows the user to use fast movements to control the amount with larger granularity and slower movements to make more precise adjustments. In some implementations, the distance relationship can be scaled according to a determined size of the artificial reality environment. For example, in smaller spaces movements can be more precise, while in larger spaces movements can extend the ray further to interact with objects at a greater distance.

At block 2708, process 2700 can continuously set a length of the ray projection or a "hook" location based on the distance relationship determined at block 2706. In some implementations, instead of setting a ray length, process 2700 can set an interaction point along the ray based on the distance relationship. Whether at the end of the ray or at a point along the ray, this interaction point is referred to herein as the "hook." In some implementations, process 2700 can provide a visual representation of the ray and can include a graphical representation (such as a sphere) of the hook.

At block 2710, process 2700 can identify one or more objects based on an intersection with the hook. In some implementations, this can occur as soon as the hook intersects with an object. In other implementations, process 2700 can identify a third gesture performed by the user, such as making a click gesture with one hand, nodding her head, tapping her foot, etc., as the trigger to select object(s) that the hook intersects when the gesture is made. At block 2712, process 2700 can toggle selection of, or otherwise interact with, the object(s) identified at block 2710.

Figure 28:
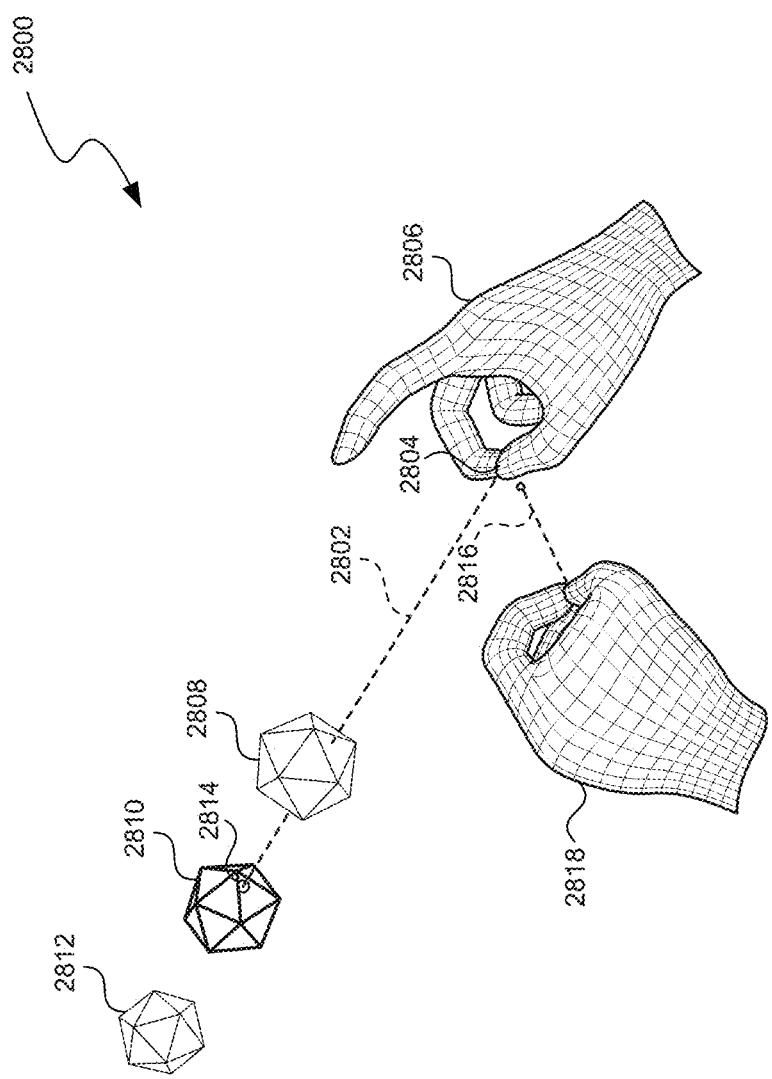
FIGS. 28 and 29 are conceptual diagrams illustrating an example hook disambiguation between selected and non-selected objects that intersect with a ray projection.
Figure 29:
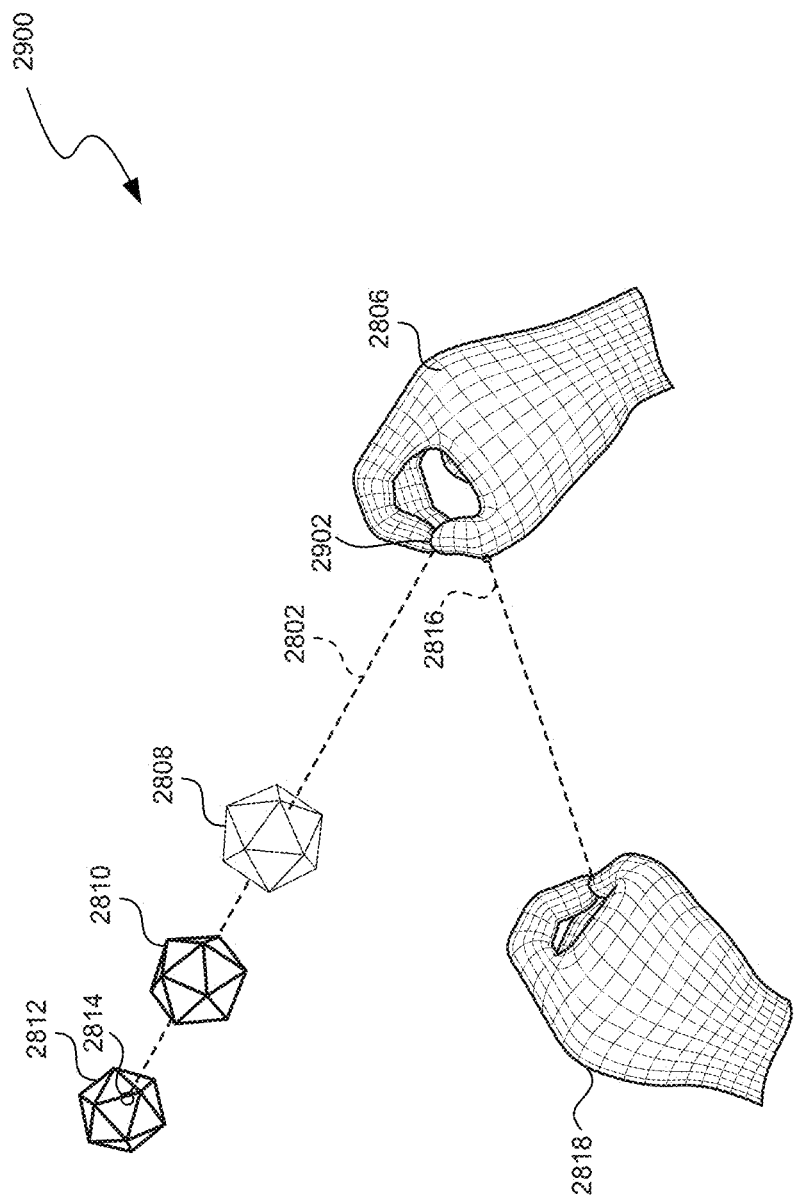

FIGS. 28 and 29 are conceptual diagrams illustrating an example 2800 and 2900 of using a hook to disambiguate between selected and non-selected objects that intersect with a ray projection 2802. Example 2800 begins with a user creating ray projection 2802 by performing pinch gesture 2804 between her thumb and middle finger on her dominant hand 2806. The user can position the ray 2802 so that it intersects with objects 2808 and 2810. The user can then control the length of the ray, with a hook 2814 at the end of the ray 2802, based on a distance 2816 between her dominant hand 2806 and non-dominant hand 2818. As the hook 2814 intersects with the object 2810, which the user intends to target, she can make a second pinch gesture (not shown), this time with her index finger and thumb on her dominant hand 2806. As the hand interaction system identifies this gesture, it selects object 2810, which the hook 2814 intersects at that moment. In example 2900, the user then changes the length of ray 2802, and accordingly the position of the hook 2814, by lengthening the distance 2816 between her dominant hand 2806 and her non-dominant hand 2818, while still holding the first thumb/middle-finger pinch, causing the hook 2814 to intersect with object 2812. The user can also select object 2812, now that it intersects with the hook 2814, by again making the gesture 2902 with a further thumb/index-finger pinch.

Figure 30:
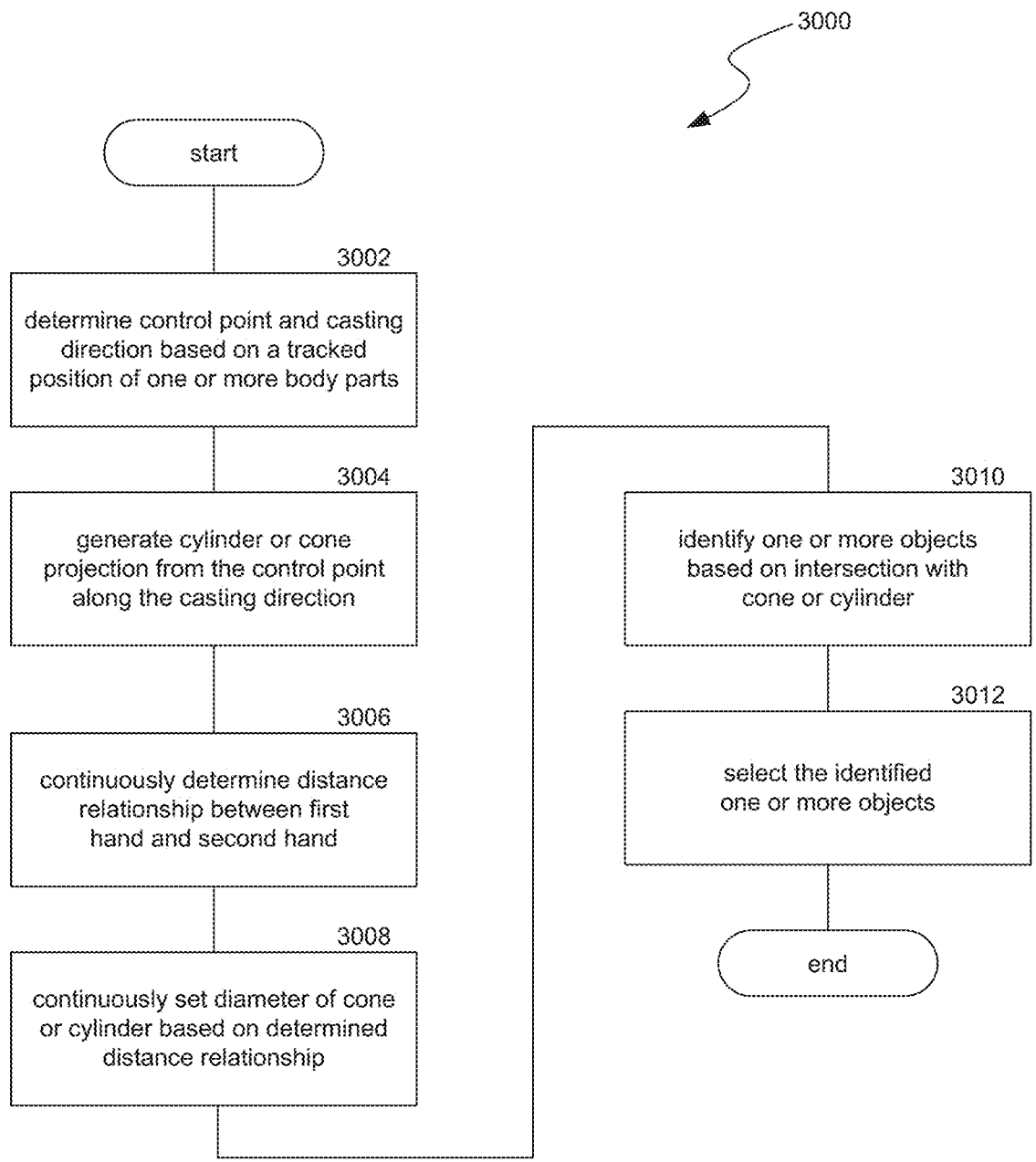
FIG. 30 is a flow diagram illustrating a process used in some implementations of the present technology for disambiguating; with a "trombone" gesture, between target and non-target objects that intersect a cone or cylinder projection.

FIG. 30 is a flow diagram illustrating a process 3000 used in some implementations of the present technology for disambiguating, with a "trombone" gesture, between target and non-target objects that intersect with a cone or cylinder projection. For example, this can allow a user to expand or contract the diameter of a cone or cylinder projection to easily control which objects the cone or cylinder intersects.

At block 3002, process 3000 can determine a control point and casting direction based on a tracked position of one or more body parts. Process 3000 can accomplish this in a manner similar to blocks 1402 or 1602. At block 3004, process 3000 can generate a cone or cylinder projection from the control point along the casting direction. Process 3000 can accomplish this in a manner similar to blocks 1404 or 1604.

At block 3006, process 3000 can continuously determine a distance relationship between a first hand (e.g., a dominant hand) controlling the control point and a second hand (e.g., a non-dominant hand). In some implementations, instead of the distance between two hands, the distance relationship can be based on the distance between two fingers (e.g., tip of index finger and tip of thumb) on one hand. In other implementations, the distance relationship can be based on the distance between one hand and another body part, such as the user's torso. In some implementations, the cone or cylinder projection can be along a user's gaze, and the user can specify a distance by moving her hand closer or further from her eye along the center of the cone or cylinder. In various implementations, the distance can be in any direction or can be in a particular direction (e.g., perpendicular or parallel to the center of the cone or cylinder).

In various implementations, the distance relationship can be linearly or exponentially proportional to the actual distance between the user's hands. In some implementations, this relationship can be based on a speed at which the user changes the distance between her hands. For example, an amount that process 3000 determines can be increased or decreased logarithmically such that faster movements increase the amount more than slow movements. This allows the user to use fast movements to control the amount with larger granularity and slower movements to make more precise adjustments.

At block 3008, process 3000 can continuously set a diameter of the cylinder or of the base of the cone based on the distance relationship determined at block 3006. In some implementations, process 3000 can provide a visual representation of the cone or cylinder, showing it change size as the user changes the distance relationship.

At block 3010, process 3000 can identify one or more objects based on at least partial intersection or full encompassment by the cone or cylinder. In some implementations, this can occur as soon as the cone or cylinder intersects with an object. In other implementations, process 3000 can identify a third gesture performed by the user, such as making a click gesture with one hand, nodding her head, tapping her foot, etc., as a trigger to identify any object that the cone or cylinder intersects at that moment. At block 3012, process 3000 can toggle selection of, or otherwise interact with, the object(s) identified at block 3010.

In an alternative implementation that combines processes 2700 and 3000, the user can control the length of the cylinder or cone with one gesture (e.g., the distance between the tip of a thumb and forefinger on a dominant hand) and can control the diameter of the cylinder or cone base with another gesture (e.g., the distance between her two hands). As a modification of this alternative, instead of a cylinder or cone projection, a sphere projection can be used, where the user controls the location of a sphere along a ray based on one gesture (e.g., the distance between her two hands) and the diameter of the sphere with another gesture (e.g., the distance between the tip of a thumb and forefinger on a dominant hand).

Figure 31:
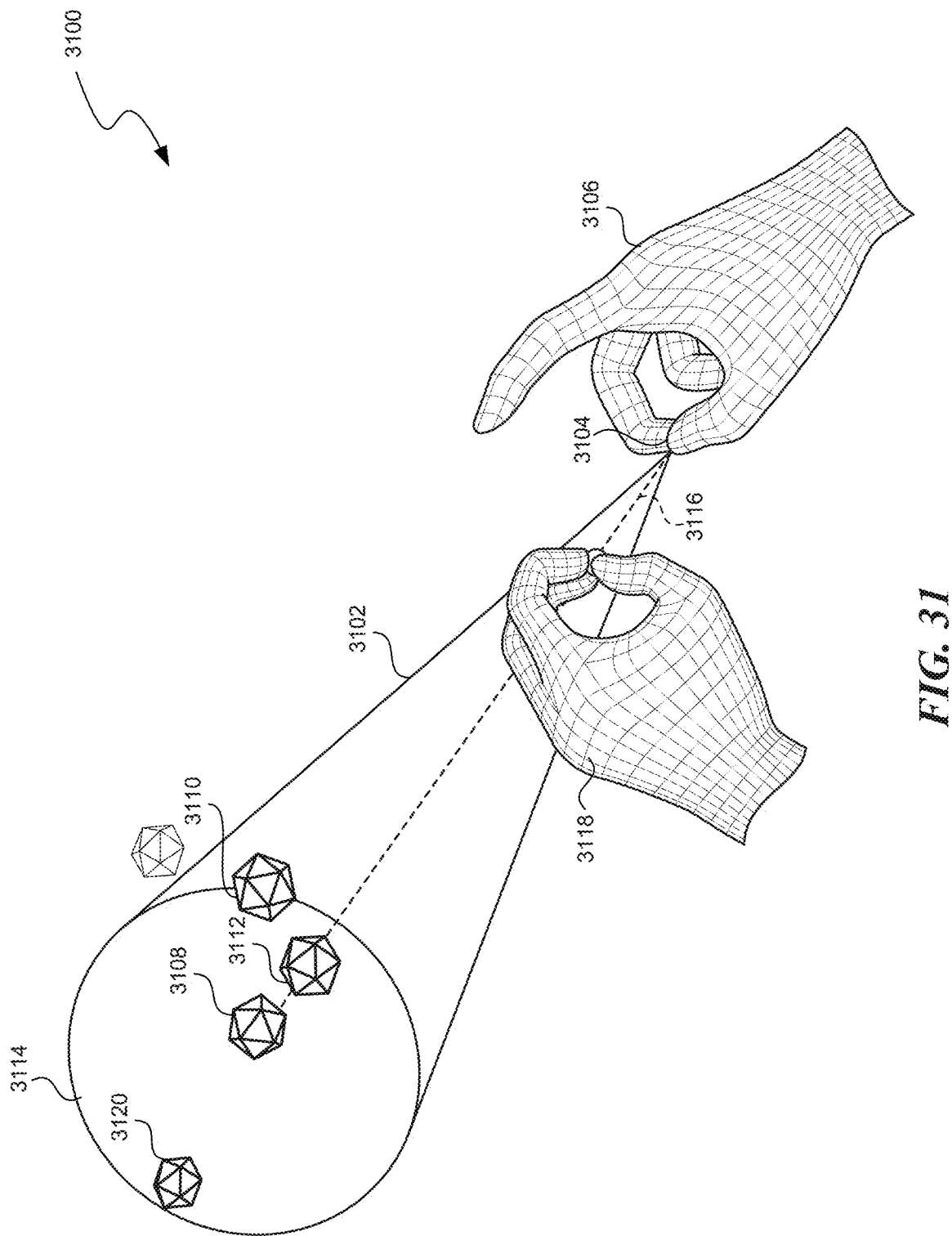
FIGS. 31 and 32 are conceptual diagrams illustrating an example trombone gesture to disambiguate between selected and non-selected objects that intersect with a cone projection.
Figure 32:
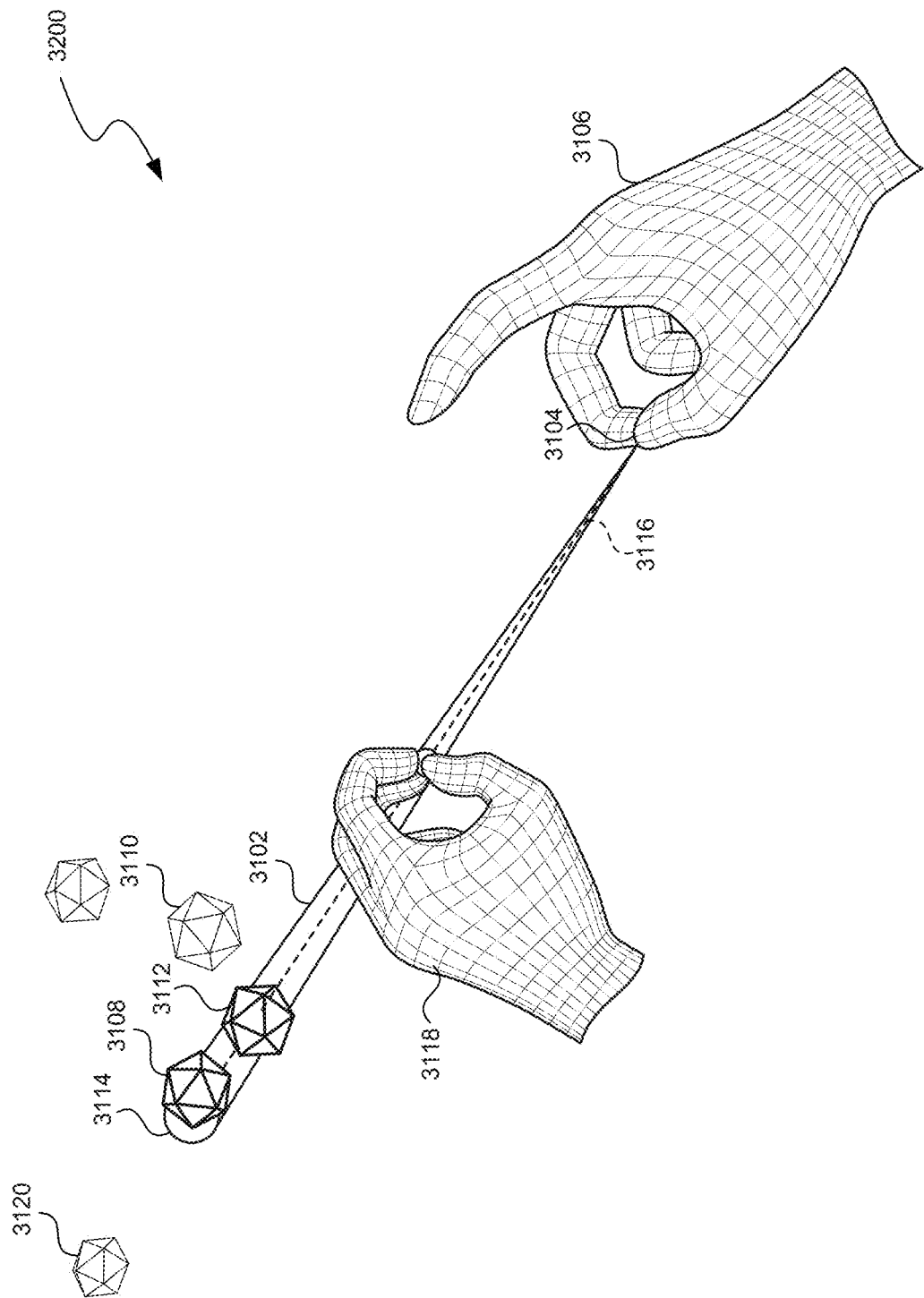

FIGS. 31 and 32 are conceptual diagrams illustrating examples 3100 and 3200 of trombone gestures for disambiguating between selected and non-selected objects that intersect with a cone projection. Example 3100 begins with a user creating cone projection 3102 by performing pinch gesture 3104 between her thumb and middle finger on her dominant hand 3106. The user can position the cone 3102 so that it intersects with objects 3108, 3110, 3112, and 3120. The user can then control the diameter of the base 3114 of cone 3102 based on a distance 3116 between her dominant hand 3106 and non-dominant hand 3118. The hand interaction system selects objects 3108, 3110, 3112, and 3120 due to their intersection with cone 3102. In example 3200, the user has changed the diameter of the base 3114 of cone 3102 by changing distance 3116 between her dominant hand 3106 and non-dominant hand 3118, while still holding the first thumb/middle-finger pinch gesture, causing the cone 3102 to intersect with only objects 3112 and 3108. In response, the hand interaction system can deselect objects 3120 and 3110, but keep objects 3108 and 3112 selected. The user can continue until her intended target objects are selected, at which point she releases gesture 3104.

Figure 33:
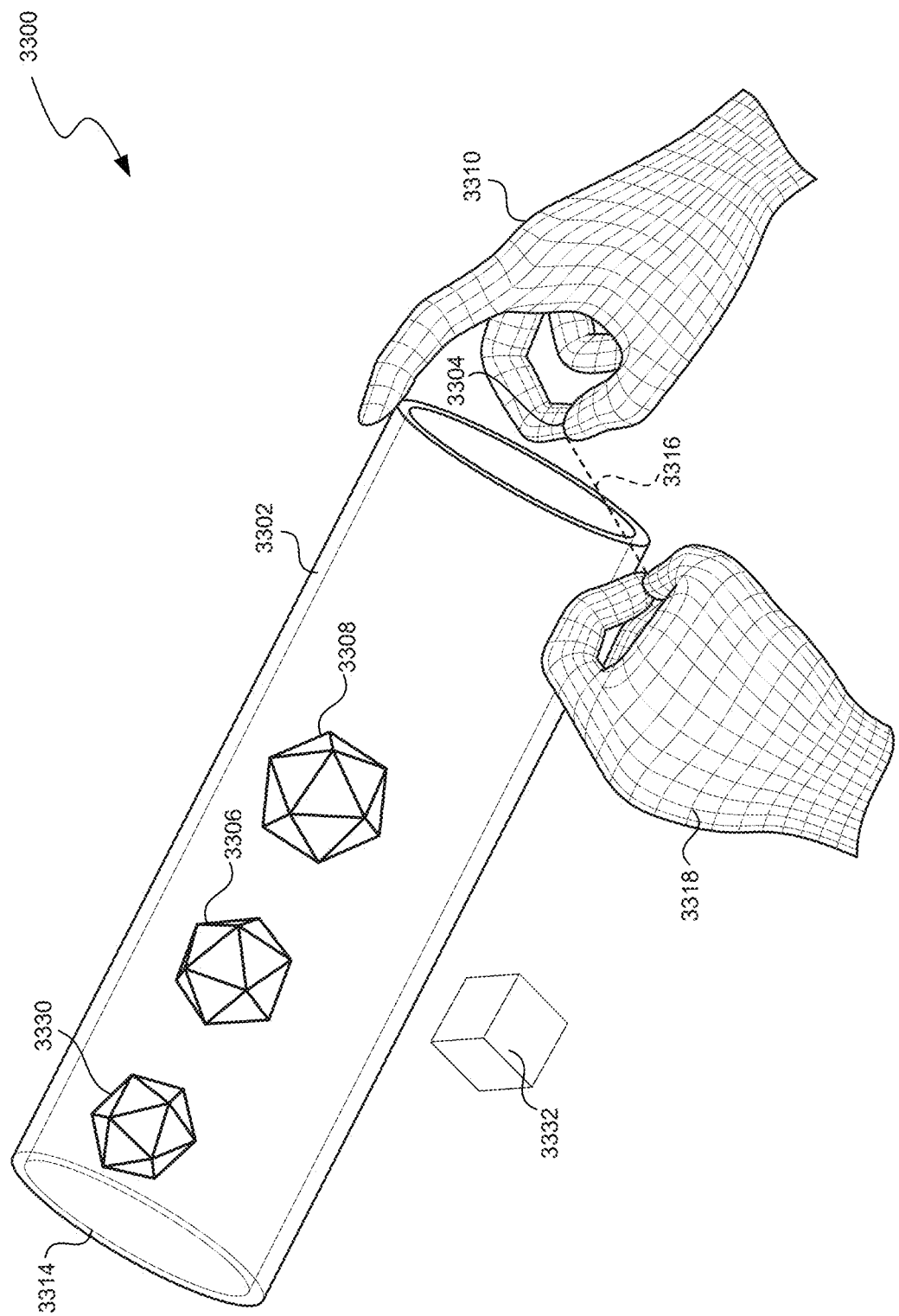
FIGS. 33 and 34 are conceptual diagrams illustrating a second example trombone gesture to disambiguate between selected and non-selected objects that intersect with a cylinder projection.
Figure 34:
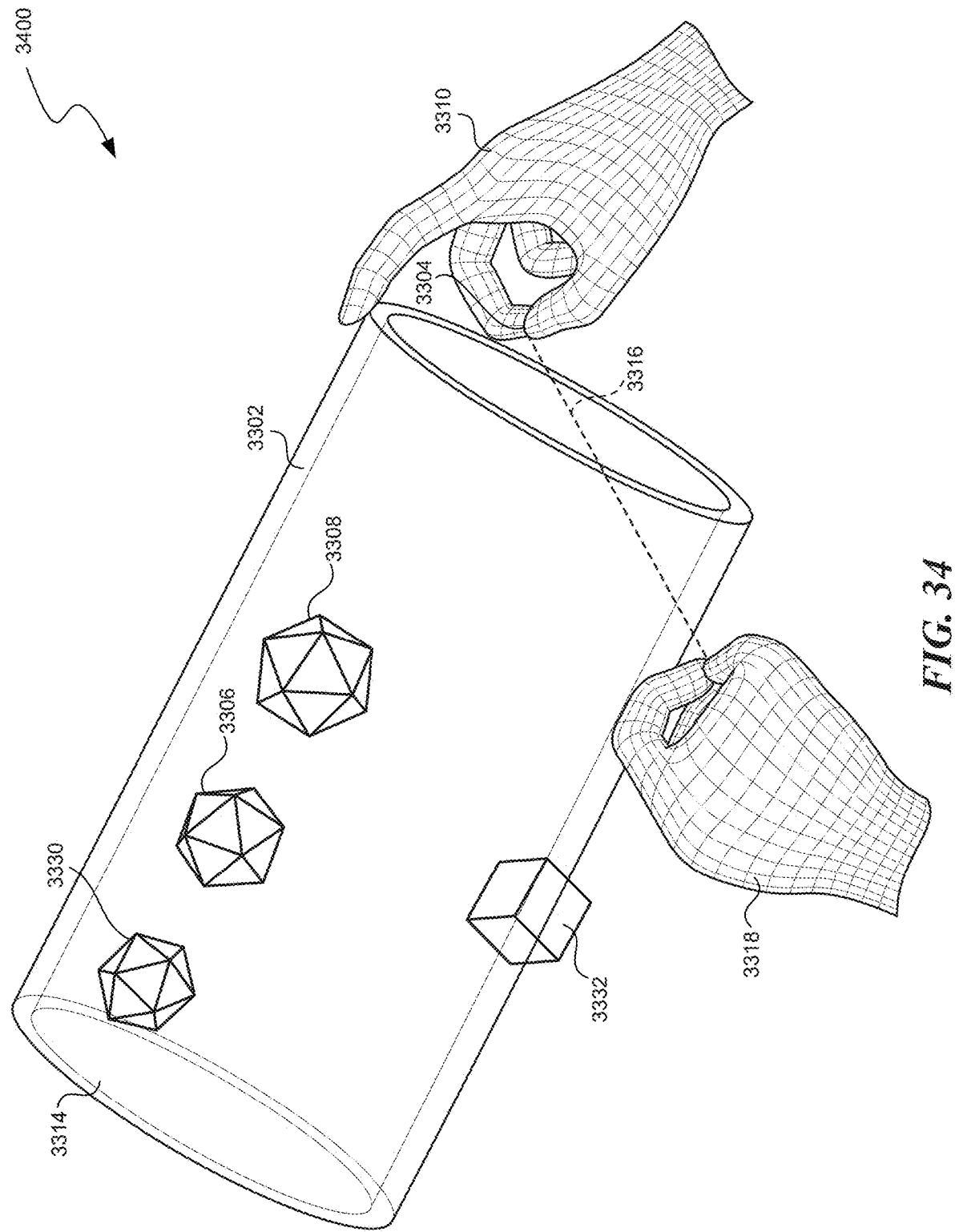

FIGS. 33 and 34 are conceptual diagrams illustrating examples 3300 and 3400 of a trombone gesture to disambiguate between selected and non-selected objects that intersect with a cylinder projection. Example 3300 begins with a user creating cylinder projection 3302 by performing pinch gesture 3304 between her thumb and middle finger on her dominant hand 3310. The user can position the cylinder 3302 so that it intersects with objects 3308, 3306, and 3330. The user can then control the diameter of the base 3314 of cylinder 3302 by changing the distance 3316 between her dominant hand 3310 and non-dominant hand 3318. The hand interaction system selects objects 3308, 3306, and 3330, as these are the objects that intersect with cylinder 3302, but does not select object 3332 because it does not intersect with cylinder 3302. In example 3400, the user then changes the diameter of the base 3314 of cylinder 3302 by changing distance 3316 between her dominant hand 3310 and non-dominant hand 3318, while still holding the first thumb/middle-finger pinch. This change causes the cylinder 3302 to intersect with objects 3306, 3308, 3330, and 3332. The user can continue until her intended target objects are selected, at which point she releases gesture 3304.

Figure 35:
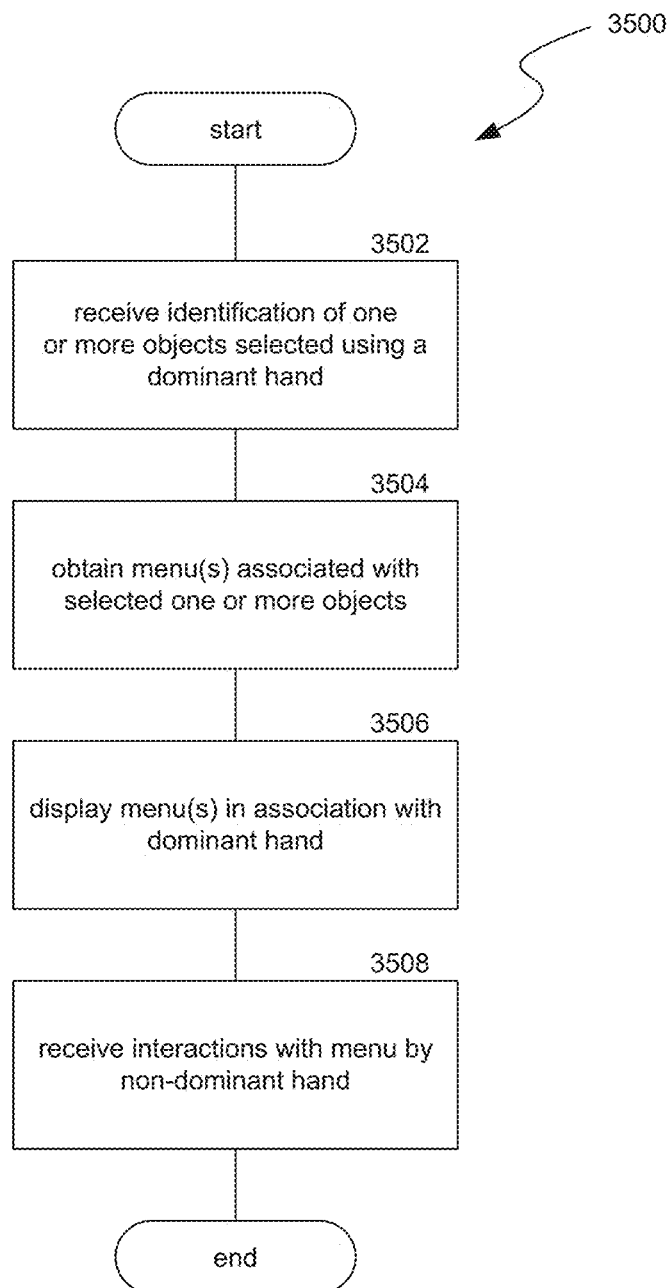
FIG. 35 is a flow diagram illustrating a process used in some implementations of the present technology for a bimanual interaction with an object using a menu attached to a dominant hand.

While combinations of gestures, as discussed above, are powerful interaction techniques, in some circumstances mapping a different gesture to every action can be confusing for a user or limiting in which actions a user can perform. However, when interacting with distant objects, menus attached to those objects can be difficult for a user to interact with. Menus that are world-locked can be limiting where a user wants to move herself or a target object while interacting with the menu. It can also be difficult for a user to match world-locked menus to target objects. These problems can be overcome with a menu that relates to an object selected with a projection, but that is attached to the projection casting hand instead of the object. This allows a second hand to interact with the menu, and thereby the object, with ease. FIG. 35 is a flow diagram illustrating a process 3500 used in some implementations of the present technology for a bimanual interaction with an object using a menu attached to a dominant hand.

At block 3502, process 3500 can receive an identification of one or more objects selected using a dominant hand. In some implementations, the selection can be performed using one of the projection or multi-selection processes described above. In some implementations, the selection can be associated with a particular gesture, such as a gesture used to initiate a projection or selection, and process 3500 can continue only while the user holds that gesture. For example, a user can cast a ray projection to select an object, and process 3500 can continue providing a menu corresponding to that selected object until the user moves the projection (unselecting the object) or releases the projection gesture.

At block 3504, process 3500 can obtain one or more menus associated with the one or more objects for which process 3500 received indications at block 3502. At block 3506, process 3500 can display one or more menus in association with a dominant hand. In other implementations, instead of always displaying the one or more menus in association with the dominant hand, process 3500 can display the one or more menus in association with the non-dominant hand or with a hand that performed the selection of the one or more objects. In various implementations, each of the one or more menus can be offset from a point on the hand (such as the wrist, center of the thumb, at a fingertip, middle of the back of the hand, center of mass of the hand, etc.), overlaid as a "skin" at such a point, wrapped around a part of the hand (e.g., to appear as a bracelet, ring, etc.), or combinations thereof. In some implementations, the one or more menus can be triggered to appear and disappear based on a gesture, such as movement of a particular finger or rotation of the hand.

At block 3508, process 3500 can receive interactions with the displayed one or more menus. In some implementations, the interaction can occur with the same hand with which the menu is associated (e.g., a "ring" menu appearing on the middle finger can be tapped by a thumb on that same hand) or can be an interaction from the opposite hand, whether or not it is non-dominant. The one or more menus can have controls to perform any type of interaction with a selected object, and the interaction with the menu can trigger that interaction. In some implementations, the menu selection can cause the hand interaction system to interpret further gestures in a particular way. For example, if a menu selection is "move," then movement of the dominant hand can cause the hand interaction system to move the selected one or more objects accordingly. As another example, if a menu selection is "rotate," then rotation of the dominant hand can cause the hand interaction system to rotate the selected one or more objects proportionally.

Figure 36:
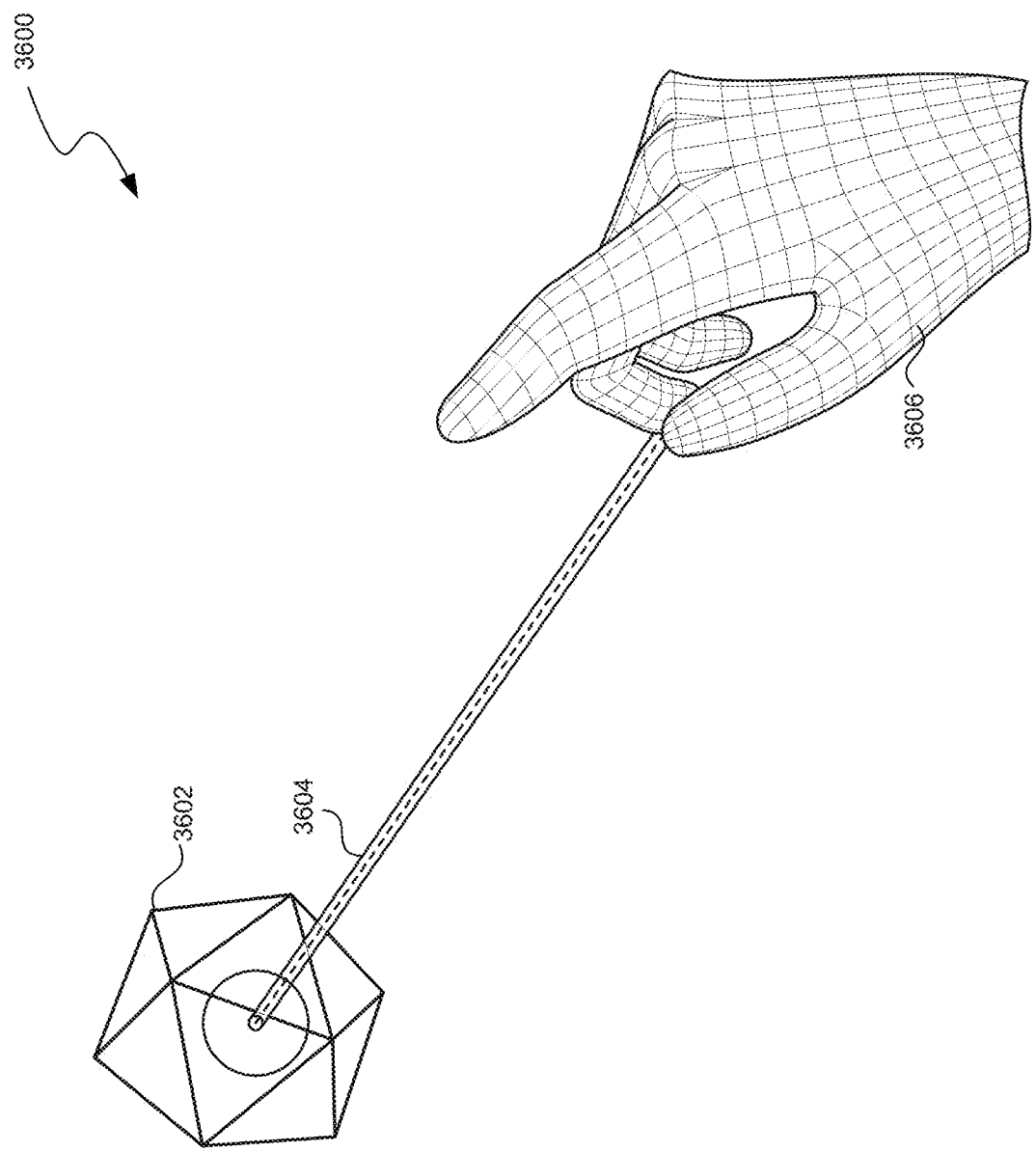
FIGS. 36, 37 and 38 are conceptual diagrams illustrating an example of a bimanual interaction with an object using a menu attached to a dominant hand.
Figure 37:
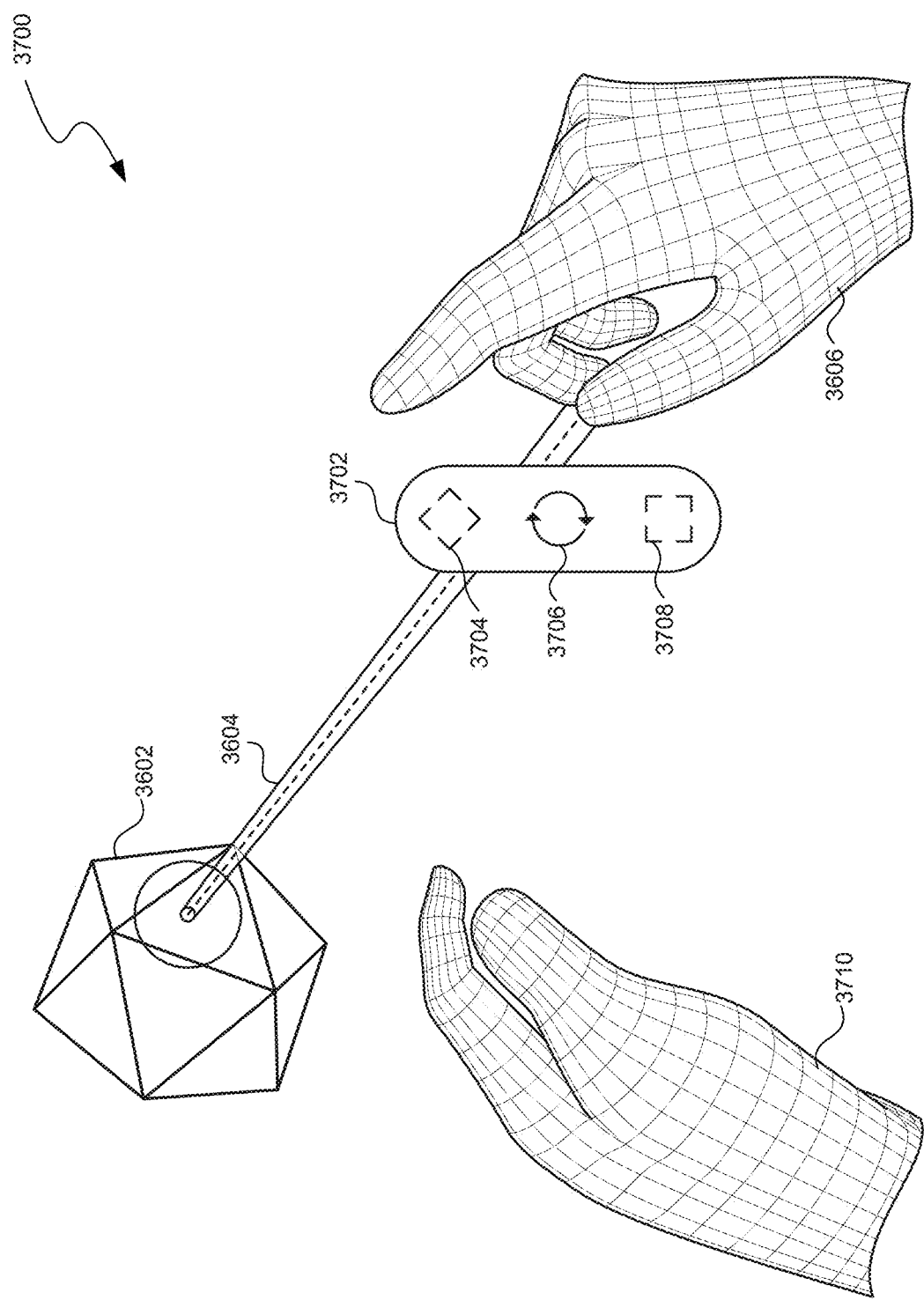
Figure 38:
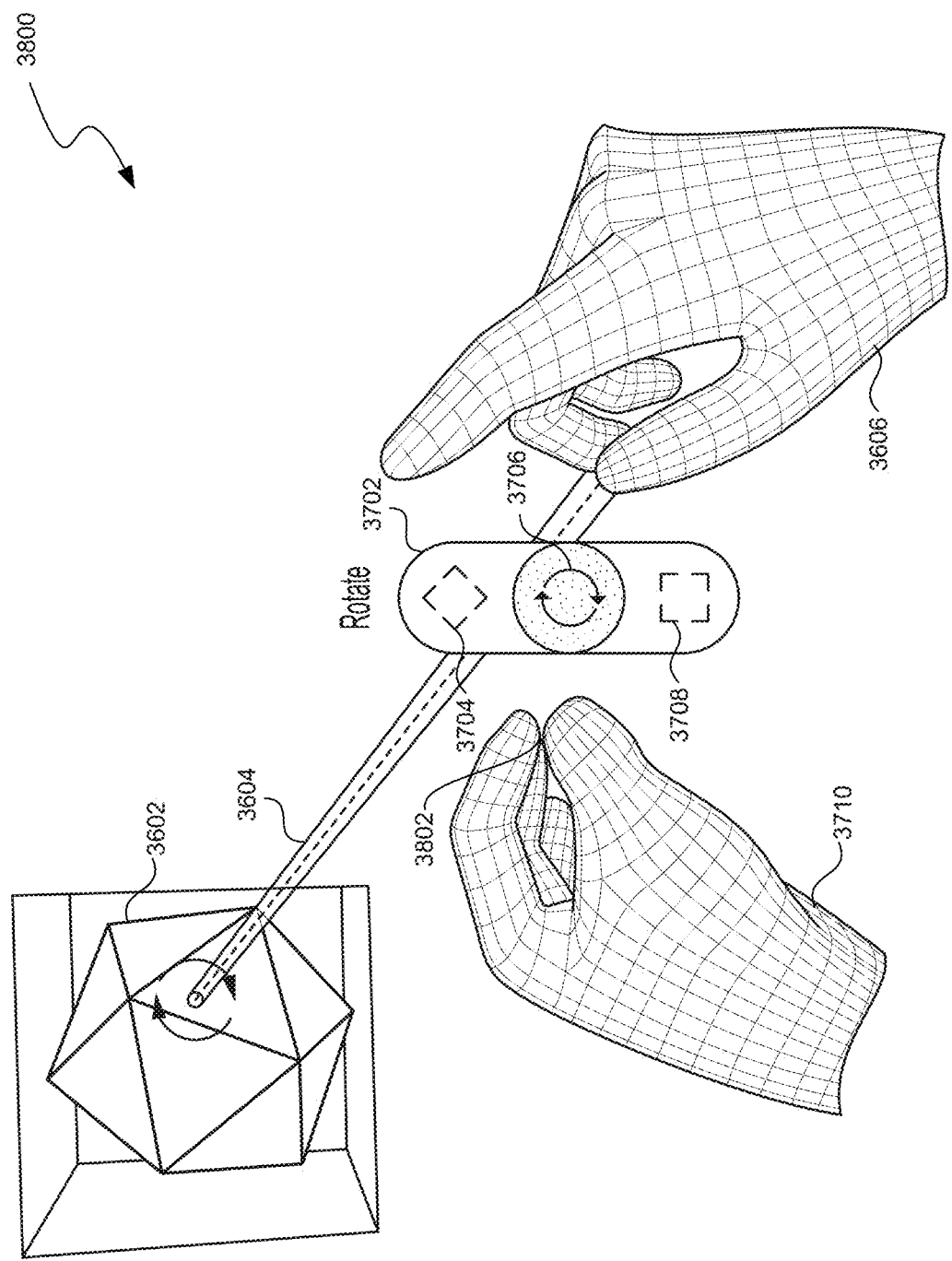

FIGS. 36, 37 and 38 are conceptual diagrams illustrating examples 3600, 3700 and 3800 of a bimanual interaction with an object using a menu attached to a dominant hand. In example 3600, an indication of object 3602 is received due to the selection of object 3602 using ray projection 3604, cast by the user's dominant hand 3606. In example 3700, in response to the selection of object 3602, menu 3702 appears in association with dominant hand 3602, offset from a center of mass from the dominant hand 3602. Menu 3702 includes controls for object 3602 that can be actuated by the user's non-dominant hand 3710. In example 3700, the controls include control 3704 for performing a 90-degree rotation of the selected object 3602, control 3706 for allowing free rotation of the selected object 3602 according to rotation of the dominant hand 3606, and control 3708 for resizing the selected object 3602. In example 3800, the user has actuated control 3706 by performing pinch gesture 3802, using her non-dominant hand 3710, next to control 3706. The actuation of control 3706 causes the hand interaction system to map rotation of the dominant hand 3606 to rotation of the selection object 3602.

Operational Modes

There are different types of interactions that a user can perform in relation to an object, such as moving an object within an artificial reality environment and actuating controls on the object. However, the gestures to perform such interactions can be ambiguous, causing existing XR systems to incorrectly distinguish between them. Especially as precision degrades over distance, users of existing XR systems find interactions tiring and stressful due to these systems' use of the same input modality in different situations and their failure to distinguish between interaction types. To address these issues, the hand interaction system can switch operational modes (e.g., between global and local interaction modes). Global mode can be used to manipulate objects within an environment (e.g., selecting objects, controlling object placement, orientation, size, etc., in the virtual environment) or to switch to an input modality useful for such global interactions (e.g., ray, sphere, or cone casting). Local mode can be used to interact with interfaces of an object (e.g., pressing buttons on an object or interacting with menus associated with the object) or to switch to an input modality useful for such local interactions (e.g., mapping buttons to user fingers). Thus, ambiguous input can be interpreted according to whichever mode is currently set for the hand interaction system. In various implementations, alternate or additional operations modes can be used. For example, more than two modes can be defined, modes can be defined for different purposes, modes can be triggered in different ways, etc.

In various implementations, the user can explicitly select between operational modes (e.g., with a gesture or button press) or mode selection can be implicit (e.g., based on user gaze). In response to an explicit or implicit trigger corresponding to a switch between operational modes, the hand interaction system can then interpret input gestures according to a mapping of gestures to actions defined for the selected mode. For example, in response to identifying a switch to a first mode (e.g., global mode) the hand interaction system can interpret a first gesture by mapping the first gesture to a first action in a first set of actions defined for the first (e.g., global) mode. Then, in response to a second trigger causing a switch to a second operational mode (e.g., local mode), the hand interaction system can interpret a second gesture by mapping the second gesture to a second action in a second set of actions defined for the second (e.g., local) mode.

In some implementations, an input modality can change based on which operational mode is activated. For example, in global mode, inputs can be switched to an input modality based determining gesture direction (e.g., projection casting, such as ray, cylinder, sphere, or cone projections). In local mode, inputs can be switched to other modalities, such as by mapping controls associated with selected objects to fingers on the user's hand, where a particular detected movement of the mapped finger controls actuation of the corresponding control.

Figure 39:
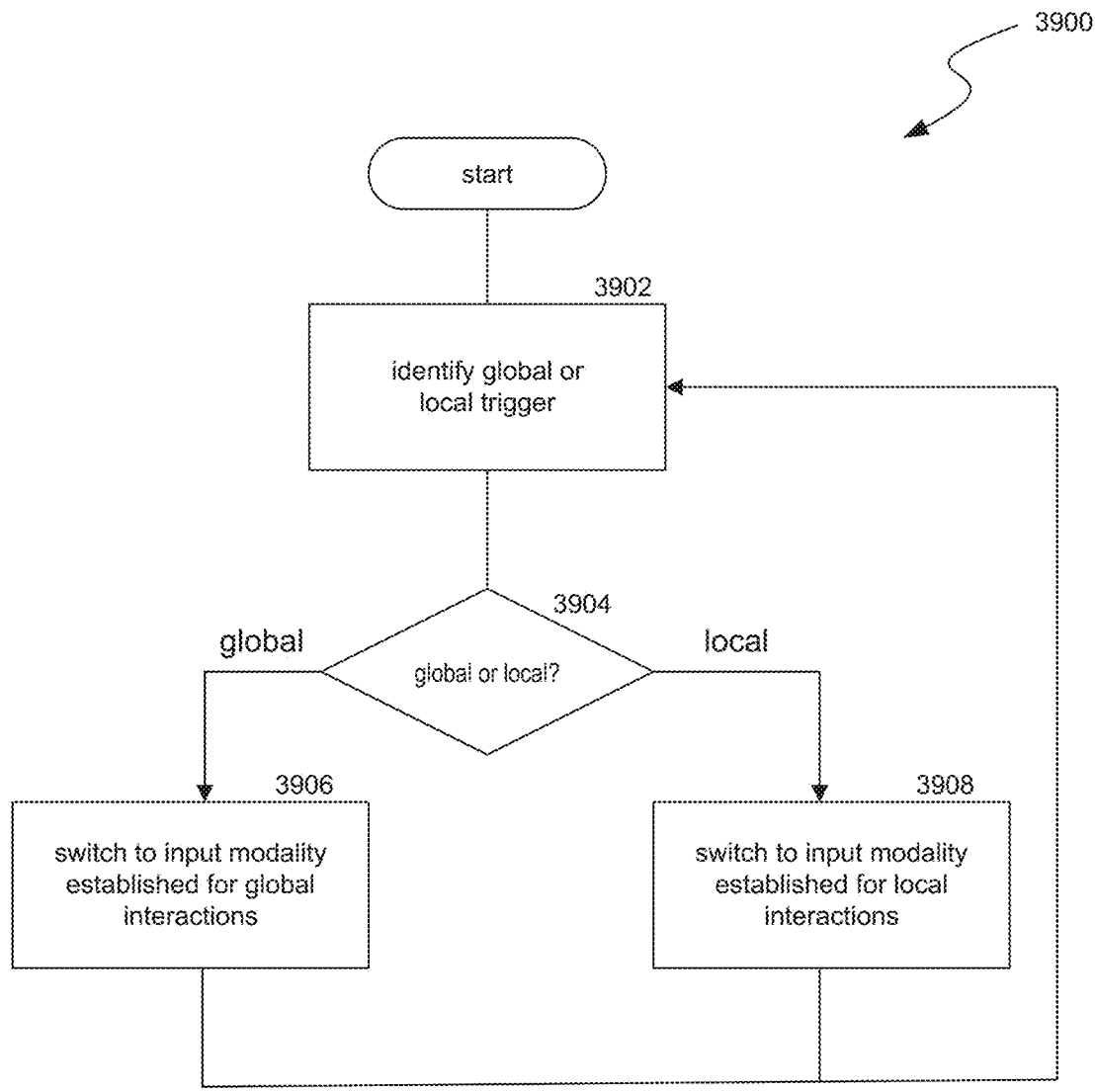
FIG. 39 is a flow diagram illustrating a process used in some implementations of the present technology for switching input modalities for global or local mode interactions.

FIG. 39 is a flow diagram illustrating a process 3900 used in some implementations of the present technology for switching input modalities (e.g., for global or local mode interactions). At block 3902, process 3900 can identify a trigger for transitioning between operational modes, and at block 3904 process 3900 can identify which mode the trigger corresponds to (e.g., whether the trigger is to enter global or local input mode). In some implementations, the trigger can be an explicit user action. As examples, a particular gesture can cause the hand interaction system to toggle between modes or to switch to a first (e.g., local) mode while the gesture is held and switch to a second (e.g., global) mode when the gesture is not identified; the hand interaction system can switch to the first mode when an input hand is rotated vertical and switch to the second mode when not; the hand interaction system can toggle between modes in response to a real or virtual button press or a vocal command; etc. In some implementations, the trigger to switch modes can be implicit. As an example, the hand interaction system can enter local mode when a user's tracked gaze lingers on an object for above a threshold amount of time (e.g., one, two, or three seconds) and can enter global mode when the user's gaze is off that object for another threshold amount of time. In another example, the hand interaction system can start in global mode, enter local mode upon a user first selecting an object, and transition back to global mode upon a user tapping off the object or otherwise performing a defined "back" gesture. In some implementations where the trigger is a relational gesture such as rotating the user's hand, hysteresis can be applied to prevent jitter between modes when the user's hand is on the border between modes. If the trigger was to transition to a first (e.g., global) mode, process 3900 can continue to block 3906, and if the trigger was to transition to second (e.g., local) mode, process 3900 can continue to block 3908.

At block 3906, process 3900 can switch to an input modality established for the current mode (e.g., global mode). In some implementations, an input modality for the global mode can be based on determining gesture direction (e.g., casting a projection (e.g., ray, sphere, cylinder, or cone), as discussed above). In other implementations, the input modality can be presenting a set of controls for global interaction when an object is selected (e.g., to rotate, resize, or move the object).

At block 3908, process 3900 can switch to an input modality established for a second mode (e.g., local mode). In various implementations, the input modality can be a mapping of available interactions to movement of particular fingers or other gestures; switching between casting types, such as switching from cone casting to ray casting; or displaying controls configured for performing location interactions. In some implementations, local interactions can be for a particular selected object, such as one or more objects selected in global mode. This allows the user to perform interactions in relation to the selected object(s) without necessarily pointing at or otherwise directing her interaction to the target object. In some cases, the selected object can change without exiting the current (e.g., local) mode, e.g., based on the user's gaze. In other implementations, local interactions can be based on which object a user indicates.

In some implementations, process 3900 can be performed separately for each hand. For example, the user's dominant hand can be in a first (e.g., global) mode, controlling a projection for selecting object(s), while the user's non-dominant hand can be in a second (e.g., local) mode, with controls mapped to fingers on the non-dominant hand to interact with whichever object(s) the dominant hand selects.

After performing block 3906 or 3908, process 3900 can return to block 3902 upon identifying another trigger for switching to the alternate global or local mode.

Figure 40A:
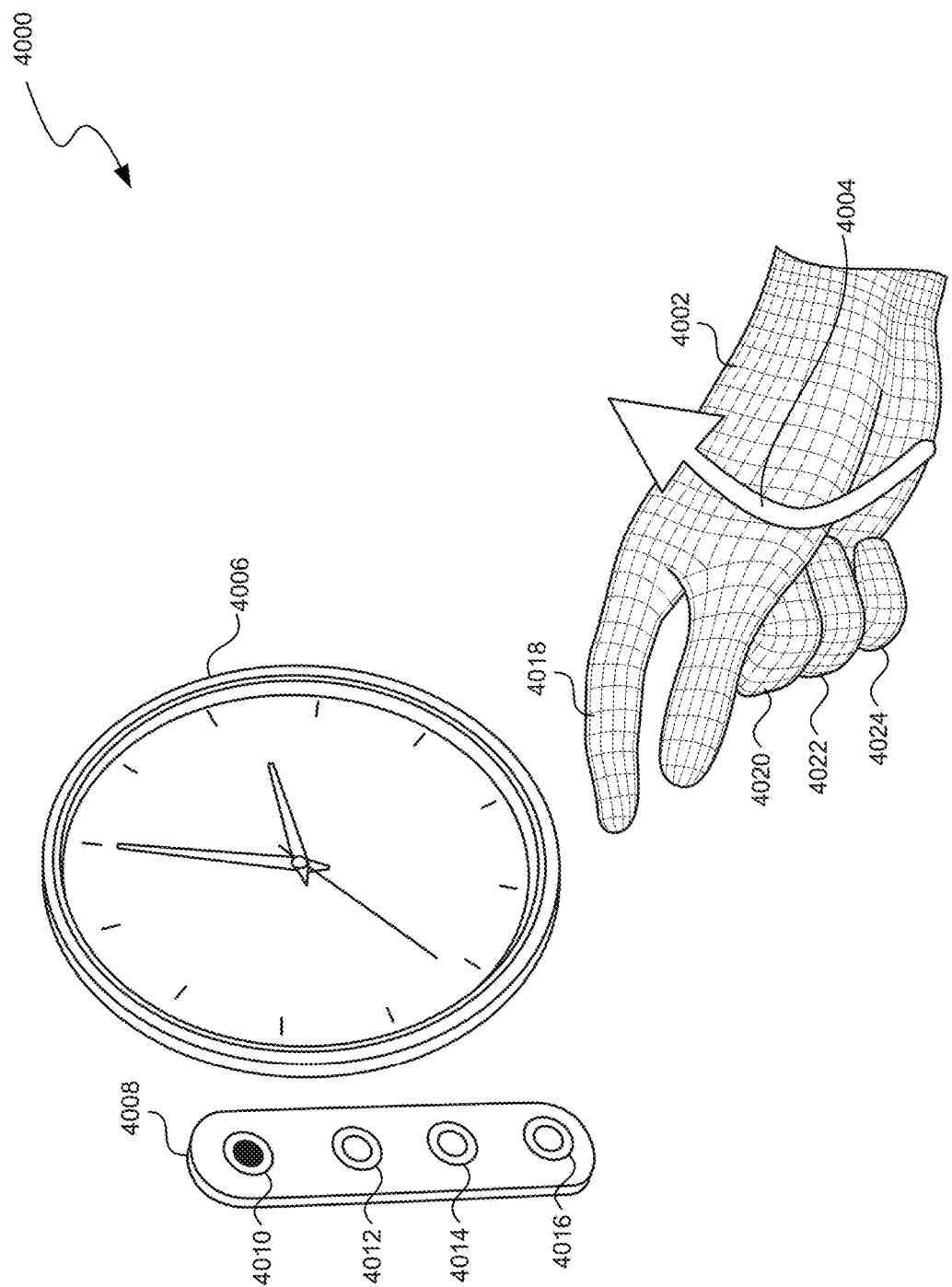
FIGS. 40A and 40B are conceptual diagrams illustrating an example of switching input modalities for global or local mode interactions.
Figure 40B:
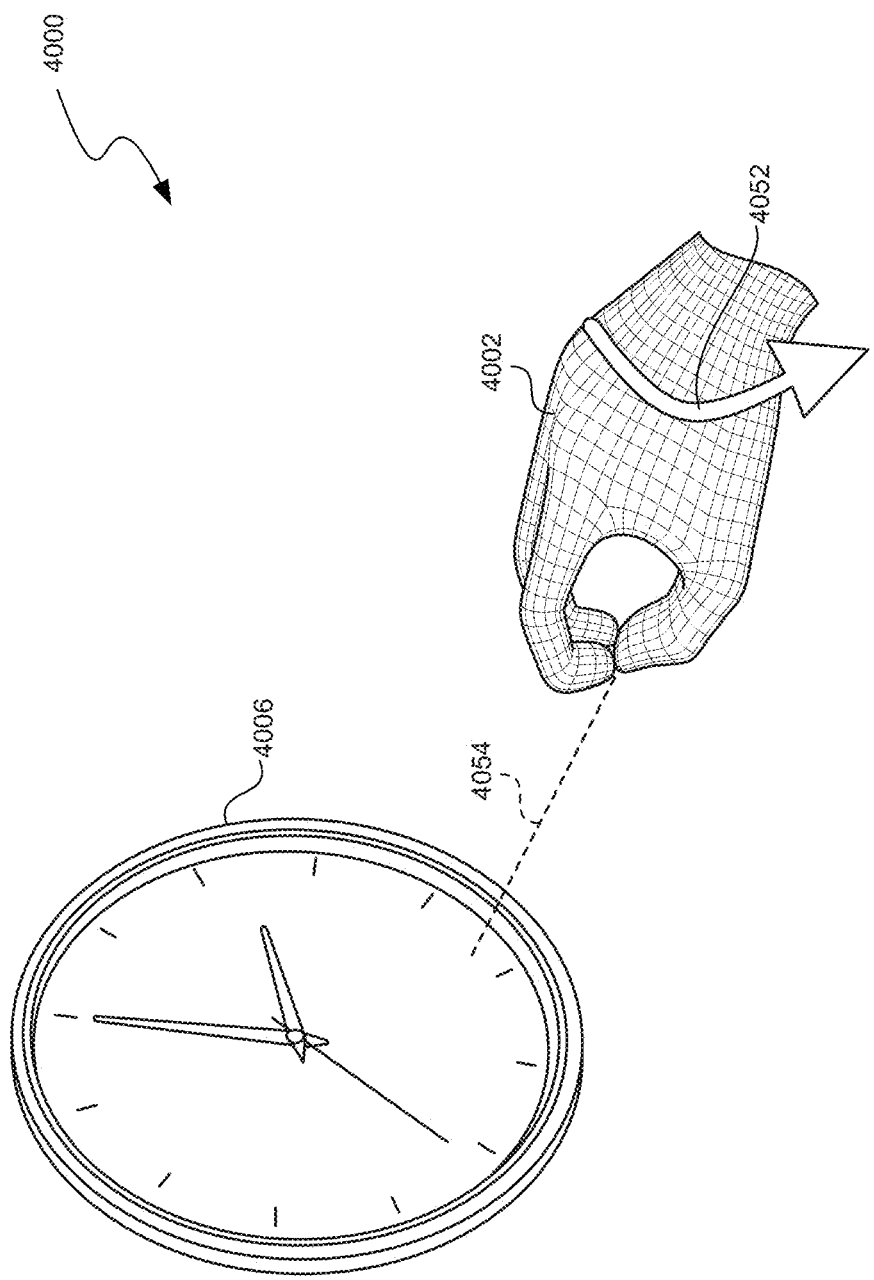

FIGS. 40A and 40B are conceptual diagrams illustrating an example 4000 of switching input modalities for global or local mode interactions. In example 4000, the user transitions between local and global modes based on the rotational orientation of her hand 4002. In example 4000, the user has caused the hand interaction system to enter local mode by turning, as indicated by arrow 4004, her hand 4002 vertically (e.g., a plane representing the flat of her hand is at least a threshold number of degrees, such as 30 degrees, from being perpendicular with an established floor plane.)

Upon entering local mode, a set of local mode controls 4008 appear in conjunction with a previously selected object 4006. The controls 4008 include buttons 4010-4016. In this example, control 4010 is mapped to finger 4018, control 4012 is mapped to finger 4020, control 4014 is mapped to finger 4022, and control 4016 is mapped to finger 4024. Because the user has extended finger 4018, the corresponding mapped control 4010 is activated.

Example 4000 is continued in FIG. 40B, where the user has caused the hand interaction system to transition to global mode by rotating, as indicated by arrow 4052, her hand 4002 to be horizontal (e.g., the plane representing the flat of her hand is at least a threshold number of degrees, such as 30 degrees, from being parallel to the established floor plane.) In response, the hand interaction system switches input modalities from the hand-mapped controls of FIG. 40A to a ray projection 4054, allowing the user to further perform global interactions with object 4006 or other objects using the ray projection 4054.

Figure 41:
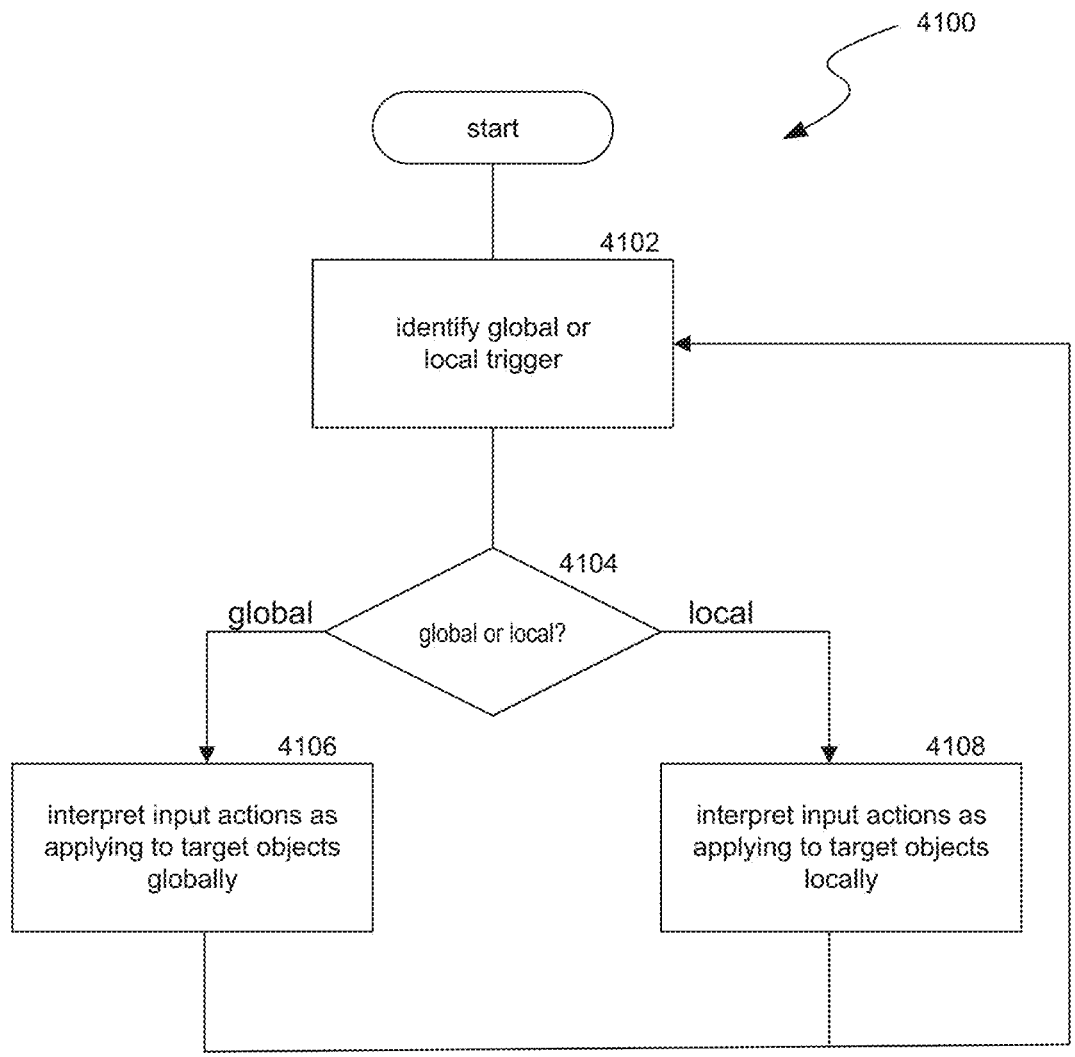
FIG. 41 is a flow diagram illustrating a process used in some implementations of the present technology for interpreting gestures as interactions in either global or local mode.

FIG. 41 is a flow diagram illustrating a process 4100 used in some implementations of the present technology for interpreting gestures as particular interactions in a current (e.g., global or local) mode. At block 4102, process 4100 can identify a trigger for transitioning between from two modes (e.g., global and local modes), and at block 4104 process 4100 can identify which mode the trigger corresponds to (e.g., whether the trigger is to enter global or local mode). Blocks 4102 and 4104 can be performed similarly to blocks 3902 and 3904. If the trigger was for a first (e.g., global) mode, process 4100 can continue to block 4106, and if the trigger was for a second (e.g., local) mode, process 4100 can continue to block 4108.

At block 4106, process 4100 can cause the hand interaction system to interpret further user input according to the current (e.g., global) mode. While at block 4108, process 4100 can cause the hand interaction system to interpret further user input according to the second (e.g., local) mode. Actions that can be taken with respect to an object can be divided into being performable one of the available modes (e.g., in either global or local mode). The hand interaction system can match an input gesture to an action in the set of actions defined for the currently activated mode. For example, when in global mode, a gesture dragging downward from an upper right corner of a virtual chess board can be interpreted as an intention to rotate the chess board. However, in local mode, the same gesture can be interpreted as moving a rook from the upper right corner square forward an amount corresponding to the length of the gesture. As another example, where a target object is a virtual drawing application, the hand interaction system can interpret a click-and-drag gesture in local mode as drawing a line within the application, while the hand interaction system can interpret the same gesture in global mode as a command to rotate the virtual panel displaying the drawing surface. In some implementations, process 4100 can be performed separately for each hand. For example, the user's dominant hand can be in a first (e.g., global) mode, controlling an orientation of a 3D model, while the user's non-dominant can be in a second (e.g., local) mode to actuate controls on the face of the 3D model.

After performing block 4106 or 4108, process 4100 can return to block 4102 upon identifying another trigger for switching to an alternate mode.

Figure 42A:
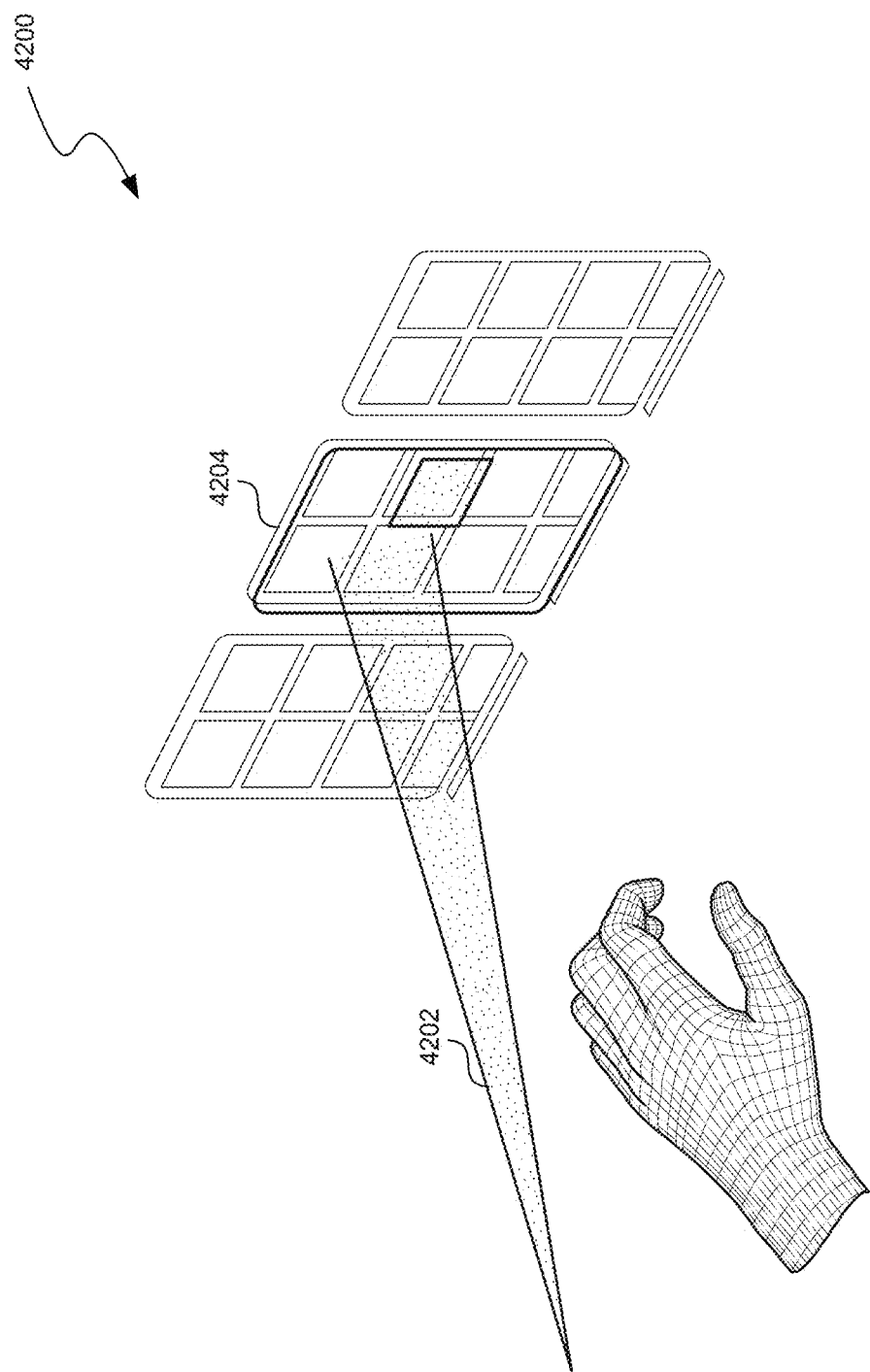
FIGS. 42A and 42B are conceptual diagrams illustrating an example of interpreting gestures as interactions in either global or local mode.
Figure 42B:
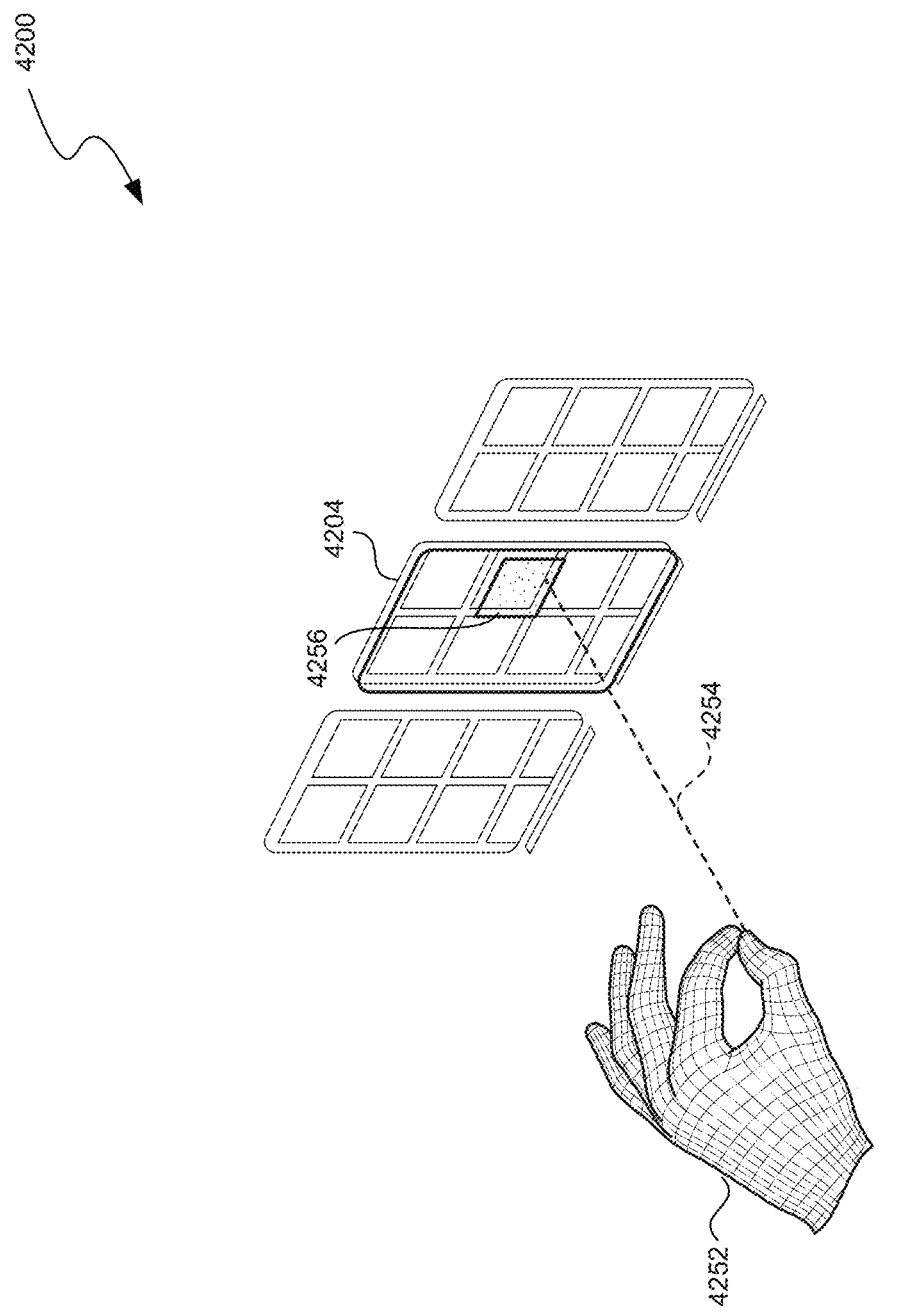

FIGS. 42A and 42B are conceptual diagrams illustrating an example 4200 of interpreting gestures as interactions in either global or local mode. In example 4200, the user transitions to local mode based on her gaze resting on an object for at least two seconds and transitions to global mode when her gaze leaves that object for at least 1.5 seconds. In example 4200, the user has caused the hand interaction system to enter local mode in relation to object 4204 by directing her gaze 4202 at object 4204 for two seconds.

Example 4200 is continued in FIG. 42B, where the user controls a ray projection 4254 with her hand 4252. Because the user entered local mode based on her gaze (as shown in FIG. 42A), the ray projection 4254 intersecting with the object 4204 causes local interactions by actuating a control 4256 of object 4204. The user's gaze (not shown in FIG. 42B) has not left object 4204 for more than 1.5 seconds, thus the hand interaction system has remained in local mode. In some implementations, processes 3900 and 4100 can be performed together such that switching between global and local modes can both change an input modality and cause otherwise ambiguous inputs to be interpreted according to a current global or local mode.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, a "finger" can be any of the five digits of a hand and a fingertip can be a tip of any of the five fingers of a hand.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A non-transitory computer-readable storage medium storing instructions that, when executed by a computing system, cause the computing system to perform a process for selecting multiple objects in an artificial reality environment, the process comprising:
   determining a control point and casting direction based on one or more tracked positions of one or more body parts of a user;
   identifying a target object with a corresponding surface type;
   selecting a type of the projection based on mappings between surface types and projection types;
   generating a projection, of the selected type, that begins at the control point and that extends along the casting direction;
   identifying multiple objects that at least partially intersect with at least part of the projection, either simultaneously or at different times; and
   selecting the multiple objects.

2. The non-transitory computer-readable storage medium of claim 1, wherein the type of the projection is equivalent to a cylinder type, specifying that the projection includes a cylinder that extends, beginning at the control point, outward from the user and is centered on the casting direction.

3. The non-transitory computer-readable storage medium of claim 1,
   wherein the type of the projection is equivalent to a cone type, specifying that the projection includes a cone; and
   wherein:
      the tip of the cone is at the control point;
      the cone extends, from the cone tip, outward from the user; and
      the cone is centered, from the cone tip to the center of the circular base of the cone, on the casting direction.

4. The non-transitory computer-readable storage medium of claim 1,
   wherein the type of the projection is equivalent to a ray type, specifying that the projection includes a ray; and
   wherein:
      at least one point along the ray corresponds to a hook; and
      each particular one of the multiple objects is identified based on the hook intersecting with that particular object when a selection gesture from the user is identified.

5. The non-transitory computer-readable storage medium of claim 1, wherein:
   the type of the projection is equivalent to a distorted cone type;
   the casting direction is along a line connecting one of the user's eyes to the control point;
   the process further comprises:
      continuously monitoring, according to movements of the control point and the one of the user's eyes, a path of a ray that extends away from the user, begins at the control point, and falls along the line that intersects the control point and the user's dominant eye; and
      identifying a distorted cone formed with a point of the distorted cone at the one of the user's eyes and the sides of the distorted cone extending through the path of the ray; and
   the projection becomes the distorted cone and the multiple objects are identified based on their intersection with at least a part of the distorted cone.

6. The non-transitory computer-readable storage medium of claim 1, wherein the type of the projection is equivalent to a ray type, specifying that the projection includes a line extending from the control point.

7. A method for selecting multiple objects in an artificial reality environment, the method comprising:
   determining a control point and casting direction based on one or more tracked positions of one or more body parts of a user;
   identifying a target object with a corresponding surface type;
   selecting a type of the projection based on mappings between surface types and projection types;
   generating a projection, of the selected type, that begins at the control point and that extends along the casting direction;
   identifying multiple objects that at least partially intersect with at least part of the projection, either simultaneously or at different times; and
   selecting the multiple objects.

8. The method of claim 7, wherein the type of the projection is equivalent to a cylinder type, specifying that the projection includes a cylinder that extends, beginning at the control point, outward from the user and is centered on the casting direction.

9. The method of claim 7,
   wherein the type of the projection is equivalent to a cone type, specifying that the projection includes a cone; and
   wherein:
      the tip of the cone is at the control point;
      the cone extends, from the cone tip, outward from the user; and
      the cone is centered, from the cone tip to the center of the circular base of the cone, on the casting direction.

10. The method of claim 7,
   wherein the type of the projection is equivalent to a ray type, specifying that the projection includes a ray; and
   wherein:

at least one point along the ray corresponds to a hook; and each particular one of the multiple objects is identified based on the hook intersecting with that particular object when a selection gesture from the user is identified.

11. The method of claim 7, wherein:

the type of the projection is equivalent to a distorted cone type;

the casting direction is along a line connecting one of the user's eyes to the control point;

the method further comprises:

continuously monitoring, according to movements of the control point and the one of the user's eyes, a path of a ray that extends away from the user, begins at the control point, and falls along the line that intersects the control point and the user's dominant eye; and identifying a distorted cone formed with a point of the distorted cone at the one of the user's eyes and the sides of the distorted cone extending through the path of the ray; and the projection becomes the distorted cone and the multiple objects are identified based on their intersection with at least a part of the distorted cone.

12. The method of claim 7, wherein the type of the projection is equivalent to a ray type, specifying that the projection includes a line extending from the control point.

13. A computing system for performing an action in relation to multiple objects in an artificial reality environment, the computing system comprising:

one or more processors; and one or more memories storing instructions that, when executed by a computing system, cause the computing system to perform a process comprising:

determining a control point and casting direction based on one or more tracked positions of one or more body parts of a user;

identifying a target object with a corresponding surface type;

selecting a type of the projection based on mappings between surface types and projection types;

generating a projection, of the selected type, that begins at the control point and that extends along the casting direction;

identifying multiple objects that at least partially intersect with at least part of the projection, either simultaneously or at different times; and performing an action in relation to the multiple objects.

14. The computing system of claim 13, wherein the type of the projection is equivalent to a cylinder type, specifying that the projection includes a cylinder that extends, beginning at the control point, outward from the user and is centered on the casting direction.

15. The computing system of claim 13, wherein the type of the projection is equivalent to a cone type, specifying that the projection includes a cone; and wherein:

the tip of the cone is at the control point;

the cone extends, from the cone tip, outward from the user; and the cone is centered, from the cone tip to the center of the circular base of the cone, on the casting direction.

16. The computing system of claim 13, wherein the type of the projection is equivalent to a ray type, specifying that the projection includes a ray; and wherein:

at least one point along the ray corresponds to a hook; and each particular one of the multiple objects is identified based on the hook intersecting with that particular object when a selection gesture from the user is identified.

17. The computing system of claim 13, wherein:

the type of the projection is equivalent to a distorted cone type;

the casting direction is along a line connecting one of the user's eyes to the control point;

the process further comprises:

continuously monitoring, according to movements of the control point and the one of the user's eyes, a path of a ray that extends away from the user, begins at the control point, and falls along the line that intersects the control point and the user's dominant eye; and identifying a distorted cone formed with a point of the distorted cone at the one of the user's eyes and the sides of the distorted cone extending through the path of the ray; and the projection becomes the distorted cone and the multiple objects are identified based on their intersection with at least a part of the distorted cone.

18. The computing system of claim 13, wherein the type of the projection is equivalent to a ray type, specifying that the projection includes a line extending from the control point.

* * * * *